United States Patent
Deshpande

(10) Patent No.: US 10,009,129 B2
(45) Date of Patent: Jun. 26, 2018

(54) SYSTEM WITH A COMPANION DEVICE AND A PRIMARY DEVICE

(71) Applicant: Sharp Kabushiki Kaisha, Sakai, Osaka (JP)

(72) Inventor: Sachin G. Deshpande, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days. days.

(21) Appl. No.: 15/509,300

(22) PCT Filed: Oct. 19, 2015

(86) PCT No.: PCT/JP2015/005264
§ 371 (c)(1),
(2) Date: Mar. 7, 2017

(87) PCT Pub. No.: WO2016/063518
PCT Pub. Date: Apr. 28, 2016

(65) Prior Publication Data
US 2017/0250767 A1    Aug. 31, 2017

Related U.S. Application Data

(60) Provisional application No. 62/066,827, filed on Oct. 21, 2014.

(51) Int. Cl.
*H04W 4/02* (2018.01)
*H04H 20/59* (2008.01)
(Continued)

(52) U.S. Cl.
CPC .......... *H04H 20/59* (2013.01); *H04H 20/08* (2013.01); *H04H 20/93* (2013.01); *H04H 60/27* (2013.01);
(Continued)

(58) Field of Classification Search
CPC ............... H04N 21/4622; H04N 21/84; H04N 21/2387; H04N 21/436; H04N 21/64322;
(Continued)

(56) References Cited

U.S. PATENT DOCUMENTS 5,907,793 A    5/1999    Reams
5,909,439 A    6/1999    Kuwabara et al.
(Continued)

FOREIGN PATENT DOCUMENTS

JP    2010-171896 A    8/2010
WO    01/11874 A1    2/2001
(Continued)

OTHER PUBLICATIONS

Official Communication issued in International Patent Application No. PCT/JP2015/005264, dated Dec. 8, 2015.
(Continued)

*Primary Examiner* — Phuoc H Doan
(74) *Attorney, Agent, or Firm* — Keating & Bennett, LLP

(57) ABSTRACT

The present invention relates to a method for a companion device to receive current service information from a primary device comprising: (a) said companion device receiving from said primary device an emergency alert message including at least one of: (i) an identifier of said emergency alert message that uniquely identifies said emergency alert message; (ii) a date when said emergency alert message was generated together with a time when said emergency alert message was generated; (iii) a content format defining a content type of an initial said emergency alert message; (iv) a content of said emergency alert message received given by initial content element; (v) a URL which provides initial emergency alert message content for accessibility; (vi) an additional URL which provides additional information about said emergency alert message; (vii) a phone number for
(Continued)

obtaining additional information about said emergency alert message; (viii) an e-mail address for obtaining additional information about said emergency alert message; (ix) a received additional emergency alert containing a continuation of another said emergency alert message; (x) a received one of a new or a repeat said emergency alert message; (xi) a received said emergency alert message that is not repeated; (xii) an identifier of said primary device; (xiii) a version of said primary device.

20 Claims, 33 Drawing Sheets

(51) Int. Cl.
| | |
|---|---|
| *H04H 20/93* | (2008.01) |
| *H04W 4/22* | (2009.01) |
| *H04H 20/08* | (2008.01) |
| *H04H 60/27* | (2008.01) |
| *H04W 76/00* | (2018.01) |
| *H04W 4/90* | (2018.01) |
| *H04W 76/50* | (2018.01) |

(52) U.S. Cl.
CPC .............. *H04W 4/22* (2013.01); *H04W 4/90* (2018.02); *H04W 76/007* (2013.01); *H04W 76/50* (2018.02)

(58) Field of Classification Search
CPC .... H04W 4/005; H04W 76/02; H04L 65/1069
USPC ............ 455/422.1; 379/37; 725/33; 340/601
See application file for complete search history.

(56) References Cited

U.S. PATENT DOCUMENTS

| | | |
|---|---|---|
| 2013/0024898 A1 | 1/2013 | Munetsugu et al. |
| 2017/0180803 A1* | 6/2017 | Lee .................... H04N 21/4622 |

FOREIGN PATENT DOCUMENTS

| | | |
|---|---|---|
| WO | 2010/059735 A2 | 5/2010 |
| WO | 2012/011296 A1 | 1/2012 |
| WO | 2015/102395 A1 | 7/2015 |

OTHER PUBLICATIONS

HbbTV Association, "HbbTV 2.0 Specification", Feb. 2, 2015, pp. 1-249.
Mizuyoshi, "HTTP ha sinpuru na purotokoru, telnet de sousa sureba, yoku wakaru", NIKKEI Open Systems, NIKKEI Business Publications, Inc., No. 66, Sep. 15, 1998, 13 pages.
Advanced Television Systems Committee, "ATSC Candidate Standard: Interactive Services Standard (A/105:2014)" Rev. 7, S13-2-389r7, Apr. 24, 2014, 139 pages.

* cited by examiner

SYSTEM WITH A COMPANION DEVICE AND A PRIMARY DEVICE

TECHNICAL FIELD

The present disclosure relates generally to companion devices also known as second screen devices and services.

BACKGROUND ART

Digital media playback capabilities may be incorporated into a wide range of devices, including digital televisions, including so-called "smart" televisions, set-top boxes, laptop or desktop computers, tablet computers, digital recording devices, digital media players, video gaming devices, cellular phones, including so-called "smart" phones, dedicated video streaming devices, and the like. Digital media content (e.g., video and audio) may originate from a plurality of sources including, for example, over-the-air television providers, satellite television providers, cable television providers, online media services, including, so-called streaming services, and the like. Digital media content may be transmitted from a source (e.g., an over-the-air television provider) to a receiver device (e.g., a digital television or set-top box) according to a transmission standard. Examples of transmission standards include Digital Video Broadcasting (DVB) standards, Hybrid Broadcast and Broadband Television (HbbTV) 2.0 standard, and standards developed by the Advanced Television Systems Committee (ATSC), including, for example, the ATSC 2.0 standard. The ATSC is currently developing the so-called ATSC 3.0 standard.

In addition to defining how digital media content may be transmitted from a source to a receiver device, transmission standards may define how data may be transmitted to support so-called second screen applications. Second screen applications may refer to applications operating on a device other than a primary receiver device. For example, it may be desirable for a tablet computer to run an application in conjunction with the media playback on the primary media rendering device, where the application enables an enhanced viewing experience. Current techniques for enabling second screen applications may be less than ideal.

A video service is capable of sending audiovisual content to a receiving device. The receiving audiovisual device typically presents the content to the viewer, such as on a television (TV) device. In some cases, the viewer would like to use their mobile device, such as a mobile phone, to interact with the video content. However, how to most effectively interact with the audiovisual content on the receiving device using the mobile phone tends to be problematic due to synchronization issues. In one case the viewer may want to receive audiovisual content on a receiver such as a television device. At the same time the user may want to receive adjunct associated content on a second screen, e.g. a mobile device such as a smartphone or a tablet. The content received on the second screen device may be same as alternate content associated with the audiovisual content being received on the television. The user may typically like these two contents be presented on the primary and second screen device in a synchronized manner.

As described above, transmission standards may define how data may be provided to a companion device to support second screen applications. ATSC Candidate Standard: Interactive Services Standard (A/105:2014), 513-2-389r7, 12 Dec. 2013, Rev. 7, 24 Apr. 2014 (hereinafter "ATSC 2.0 A105"), specifies services that can be provided by a device configured to receive an ATSC 2.0 transport stream to support the display of content related to an A/V broadcast by applications running on second screen devices. According to ATSC 2.0 A105, an ATSC 2.0 receiver may support the following services for the use by a second screen application: trigger delivery service, two-way communications service, and optionally HTTP proxy server service. In ATSC 2.0 A105, trigger delivery service is limited to an ATSC 2.0 receiver simply passing triggers including limited information to a second screen device. The amount of information that may be included in a trigger is limited. Further, in ATSC 2.0 A105, two-way communications service simply provides a TCP/IP connection for a primary device and a second screen device to communicate. That is, each of the primary device and the second screen device must be configured to transmit and receive data according to a proprietary format. This typically results in devices that have different manufacturers being incompatible. In ATSC 2.0 A105, HTTP proxy server service simply provides a mechanism for a primary device to act as a proxy for a second screen device, e.g., when a second screen device has limited Internet connectivity. Thus, each of the services for supporting second screen applications in ATSC 2.0 A105 are limited and do not provide content information to an application running on a companion device in an efficient manner. ATSC 2.0 A105 does not define actual message content, message formats and various types of message exchanged between a primary device and a companion device. In contrast this disclosure describes this type of information.

As described above, transmission standards may define how data may be provided to a companion device to support second screen applications. Hybrid Broadcast and Broadband Television 2.0 standard: (HbbTV_specification_2_0: 2015), (hereinafter "HbbTV 2.0"), specifies services to support companion screens. The methods to allow for interaction between HbbTV and companion screens are described in HbbTV 2.0. Whilst primarily targeted at iOS and Android devices, the framework described in HbbTV 2.0 should allow companion screens of any type to be used. The HbbTV terminal and the companion screens have to be connected to the same local network, and the local network should be connected to the Internet. Following features are supported by HbbTV 2.0:

An HbbTV application launching a companion screen application

The companion screen application may be an HTML application running in a browser on the companion screen, or may be a native companion screen application. There is also the facility for the HbbTV application to direct the user to the location of a native application in a companion screen's 'store' (so that application can be downloaded) if it isn't already installed on the user's companion screen device.

A companion screen application launching a broadcast independent HbbTV application on an HbbTV terminal.

To allow an HbbTV application and a companion screen application to communicate directly by establishing a communication channel onto which text or binary messages can be exchanged, regardless of the launch methods of either the HbbTV application or the companion screen application.

To enable a companion screen or another HbbTV terminal to locate the services, provided by the HbbTV terminal.

HbbTV 2.0 does not define actual message content, message formats and various types of message exchanged between a primary device and a companion device. In contrast this disclosure describes this type of information.

Additionally in the prior art The Common Alerting Protocol (CAP) (http://docs.oasis-open.org/emergency/cap/v1.2/CAP-v1.2-os.html) provides an open, non-proprietary digital message format for all types of alerts and notifications. It does not address any particular application or telecommunications method. The CAP format is compatible with emerging techniques, such as Web services, as well as existing formats including the Specific Area Message Encoding (SAME) used for the United States' National Oceanic and Atmospheric Administration (NOAA) Weather Radio and the Emergency Alert System (EAS), while offering enhanced capabilities. CAP includes:

Flexible geographic targeting using latitude/longitude shapes and other geospatial representations in three dimensions;
Multilingual and multi-audience messaging;
Phased and delayed effective times and expirations;
Enhanced message update and cancellation features;
Template support for framing complete and effective warning messages;
Compatible with digital signature capability; and,
Facility for digital images and audio.

Key benefits of CAP may include reduction of costs and operational complexity by eliminating the need for multiple custom software interfaces to the many warning sources and dissemination systems involved in all-hazard warning. The CAP message format can be converted to and from the "native" formats of different kinds of sensor and alerting technologies, forming a basis for a technology-independent national and international "warning internet." Where as CAP message format provides a general framework it may be too complex for emergency alert message communication between a primary device and a companion device The proposed protocol in this disclosure related to emergency alert information exchange between is lightweight and efficient.

The foregoing and other objectives, features, and advantages of the invention will be more readily understood upon consideration of the following detailed description of the invention, taken in conjunction with the accompanying drawings.

SUMMARY OF INVENTION

One embodiment of the present invention relates to:

A method for a companion device to receive current service information from a primary device comprising:

(a) said companion device receiving from said primary device an emergency alert message including at least one of:
 (i) an identifier of said emergency alert message that uniquely identifies said emergency alert message;
 (ii) a date when said emergency alert message was generated together with a time when said emergency alert message was generated;
 (iii) a content format defining a content type of an initial said emergency alert message;
 (iv) a content of said emergency alert message received given by initial content element;
 (v) a URL which provides initial emergency alert message content for accessibility;
 (vi) an additional URL which provides additional information about said emergency alert message;
 (vii) a phone number for obtaining additional information about said emergency alert message;
 (viii) an e-mail address for obtaining additional information about said emergency alert message;
 (ix) a received additional emergency alert containing a continuation of another said emergency alert message;
 (x) a received one of a new or a repeat said emergency alert message;
 (xi) a received said emergency alert message that is not repeated;
 (xii) an identifier of said primary device;
 (xiii) a version of said primary device.

Another embodiment of the present invention relates to:

A method for a primary device to provide current service information to a companion device comprising:

(a) said primary device providing from said primary device an emergency alert message to said companion device including at least one of:
 (i) an identifier of said emergency alert message that uniquely identifies said emergency alert message;
 (ii) a date when said emergency alert message was generated together with a time when said emergency alert message was generated;
 (iii) a content format defining a content type of an initial said emergency alert message;
 (iv) a content of said emergency alert message received given by initial content element;
 (v) a URL which provides initial emergency alert message content for accessibility;
 (vi) an additional URL which provides additional information about said emergency alert message;
 (vii) a phone number for obtaining additional information about said emergency alert message;
 (viii) an e-mail address for obtaining additional information about said emergency alert message;
 (ix) an additional emergency alert containing a continuation of another said emergency alert message;
 (x) a one of a new or a repeat said emergency alert message;
 (xi) a said emergency alert message that is not repeated;
 (xii) an identifier of said primary device;
 (xiii) a version of said primary device.

Another embodiment of the present invention relates to:

A method for a companion device to receive current service information from a primary device comprising:

(a) said companion device providing to said primary device a response to an emergency alert message including at least one of:
 (i) an identifier of said emergency alert message that uniquely identifies said emergency alert message;
 (ii) a date when said emergency alert message was generated together with a time when said emergency alert message was generated;
 (iii) an additional content request indicating a request for more information about said emergency alert message.

Another embodiment of the present invention relates to:

A method for a primary device to provide current service information to a companion device comprising:

(a) said primary device receiving from said companion device a response to an emergency alert message including at least one of:
 (i) an identifier of said emergency alert message that uniquely identifies said emergency alert message;
 (ii) a date when said emergency alert message was generated together with a time when said emergency alert message was generated;
 (iii) an additional content request indicating a request for more information about said emergency alert message.

DESCRIPTION OF EMBODIMENTS

Figure 1:
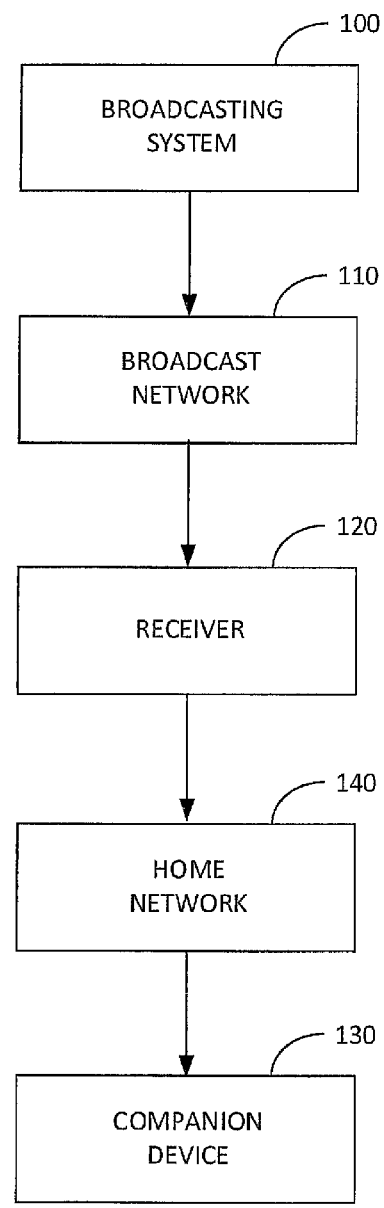
FIG. 1 illustrates a video system.

Referring to FIG. 1, a logical architecture of an audiovisual system is illustrated. The system includes a broadcasting system 100 that provides a source of audiovisual (video and/or audio and/or closed caption) content. The audiovisual content may be provided in any suitable manner and using suitable standards, such as for example, Motion Pictures Experts Group (MPEG) standards, MPEG-2 standards, MPEG-4 standards, and/or ATSC standards. By way of example, the broadcasting system may be provided from a broadcasting antenna, a cable, a network based audiovisual source, a compact disk, a hard drive, a digital video disc, and/or an Internet based audiovisual source. The broadcasting system 100 may provide the content through any suitable broadcast network 110. A receiver 120 receives the audiovisual content together with any other data provided with the audiovisual content, such as digital data, data services, or otherwise. The receiver 120, generally referred to as a PD, is preferably configured to receive the type of content being provided there to. The receiver may be, for example, a television, a laptop, a tablet, a phone, a set-top box device, a streaming receiving device, a computing device, or any other device suitable to receive the content and enable presentation of the audiovisual content to a viewer. The receiver may be typically in a user's home. The receiver may likewise communicate with another display device 130, generally referred to as a CD, through a home network 140. In another example the CD may communicate directly with an outside server to receive audiovisual and/or adjunct content. The home network is preferably a wireless or wired type network, such as for example, WiFi, Ethernet, Third Generation Partnership Project (3GPP), Bluetooth, and/or infra-red. In some cases the home network may be a local area network. In some cases the primary and CDs may be inside a user's home. In other cases, the home network may be an office environment. The CD may include, for example, a mobile phone, a mobile tablet, a laptop, a computer, or other display device. In addition, the receiver may simultaneously communicate with a plurality of CDs 130. Additionally one CD may communicate simultaneously with multiple PDs 120. In some examples the PD may be called a first screen device. In some examples the CD may be called a second screen device. The terms PD and first screen device and receiver may be used interchangeably. The terms second CD and second screen device may be used interchangeably.

Figure 2:
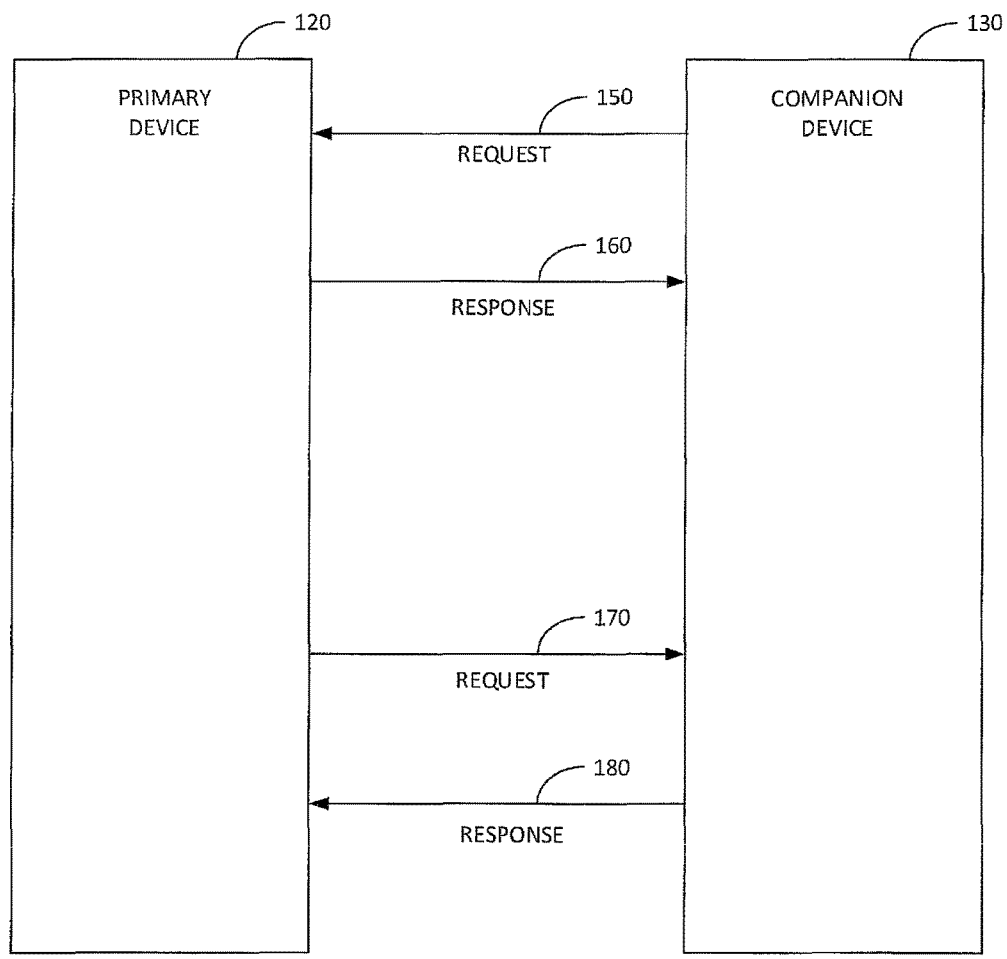
FIG. 2 illustrates a primary device (PD) and a companion device (CD) system.

Referring to FIG. 2, it is often desirable that the PD 120 is capable of providing information to the CD 130. In addition, the CD 130 may provide information to the PD 120. Often, the CD 130 makes a request 150 to the PD 120, which in response thereto provides a response 160 to the CD 130. In other cases, the PD 120 makes a request 170 to the CD 130, which in response thereto provides a response 180 to the PD 120. This permits the PD 120 to display content thereon, and the CD 130 may likewise interact with the PD 120. For example, it may be desirable that whatever is being presented on the PD 120 is simultaneously being presented on the CD 130, which may include for example, audio and/or video content. For example, it may be desirable to present a primary view of the video content on the PD 120 and simultaneously present an alternative view of the same or similar scene of the video content on the CD 130. For example, it may be desirable to present audiovisual content on the PD 120 and simultaneously interact with an associated application that is started (or automatically started) on the CD 130. In this case typically the content being presented on the PD and the CD should be synchronized. The synchronization refers to displaying the data corresponding to the same or approximately same time instance on the primary and the CD.

Figure 3:
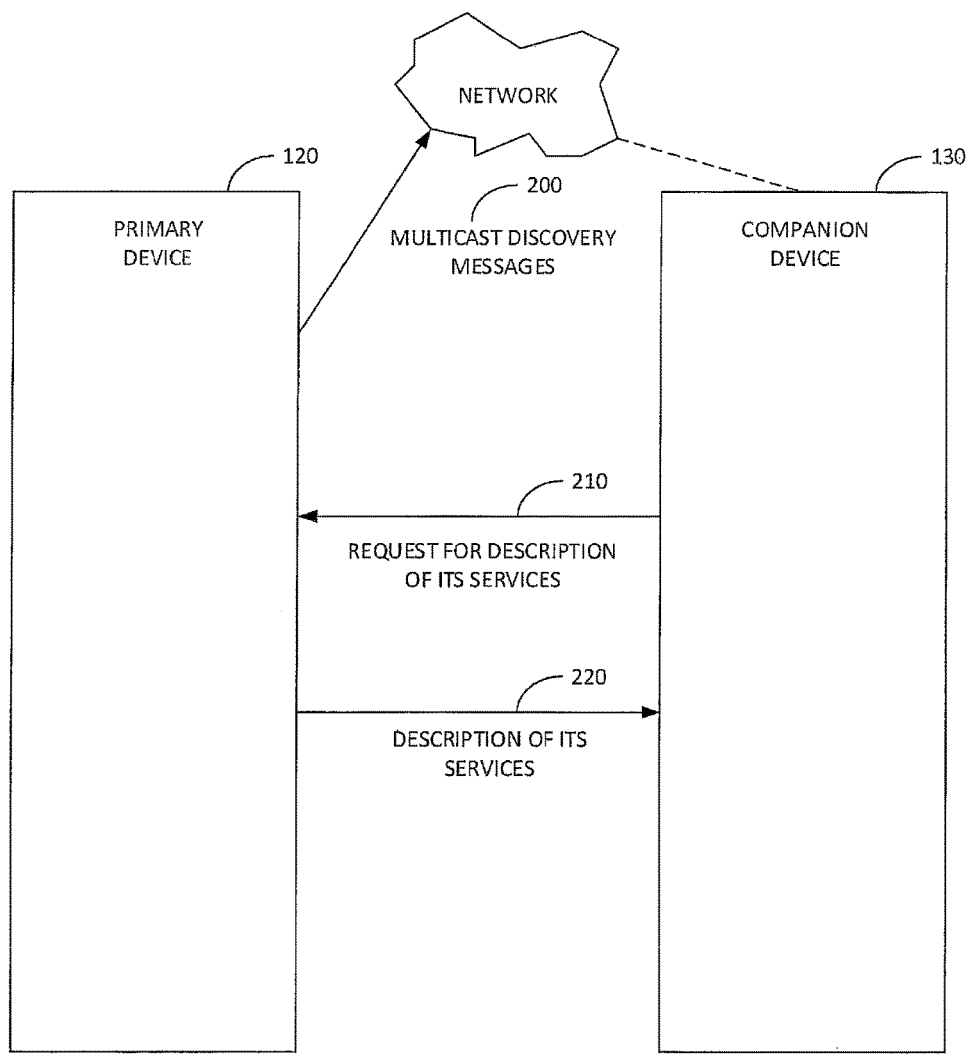
FIG. 3 illustrates another primary device and a companion device system.

Referring to FIG. 3, by way of example, the user may have CD 130 with an ATSC compliant application running thereon when PD 120 (e.g., a television) joins the network. This may occur, for example, when the receiver is turned on or its network interface is enabled. The PD 120 may be capable of providing services for the CD 130. The PD 120 may multicast discovery messages 200 to advertise second screen support services. The CD 130 receives the multicast discovery messages and sends PD 120 a request for descriptions of its services 210. The PD 120 responds to this request with a description of its services 220. The CD 130 uses the information provided in the descriptions to access the appropriate services and provide an interactive experience synchronized with the programming on the PD 120.

Figure 4:
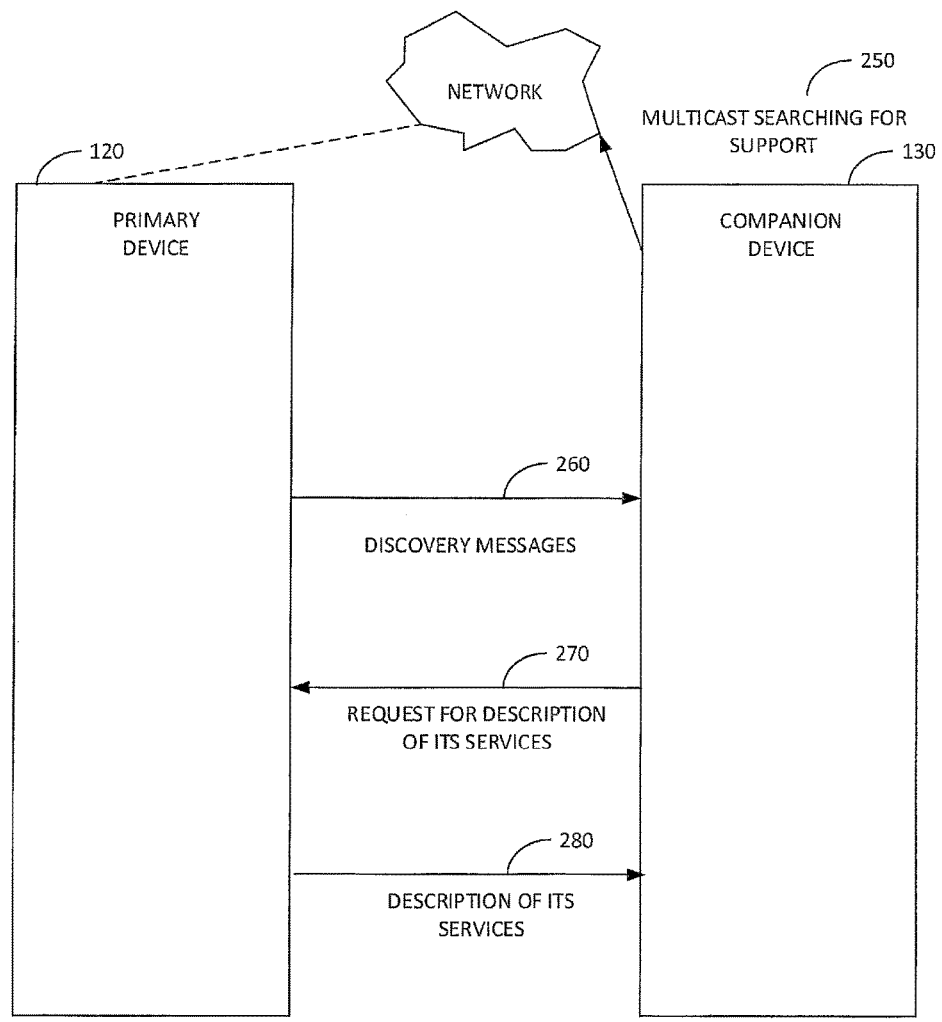
FIG. 4 illustrates another primary device and a companion device system.

Referring to FIG. 4, by way of example, the user may not have an CD 130 with an ATSC compliant application running thereon when the PD 120 (e.g., television) joins the network. The audiovisual content being viewed on the PD 120 may enter a program segment that offers CD 130 support. This may occur, for example, when the receiver is turned on or its network interface is enabled, or when a channel change goes from a channel that does not offer the CD 130 with another that does offer support for the CD 130, or when the channel being viewed goes from a program segment that does not offer support for the CD 130 to a segment that does offer support for the CD 130. This viewing change causes the PD 120 to inform the viewer in some manner that CD 130 support is available. For example, a small icon may be presented in the corner of the PD 120. If the viewer decides to take advantage of the second screen support and activate a compliant application on the CD 130, then the CD 130 may multicast a message 250 searching for devices that offer CD 130 support or service. The PD 120 may respond to this message with discovery messages 260. When the CD 130 receives the discovery messages, it sends the PD 120 a request for descriptions of its services 270. The PD 120 responds with description of its services 280. The CD 130 uses the information given in the descriptions to access the appropriate services and provide an interactive experience synchronized with the audiovisual content.

Figure 5:
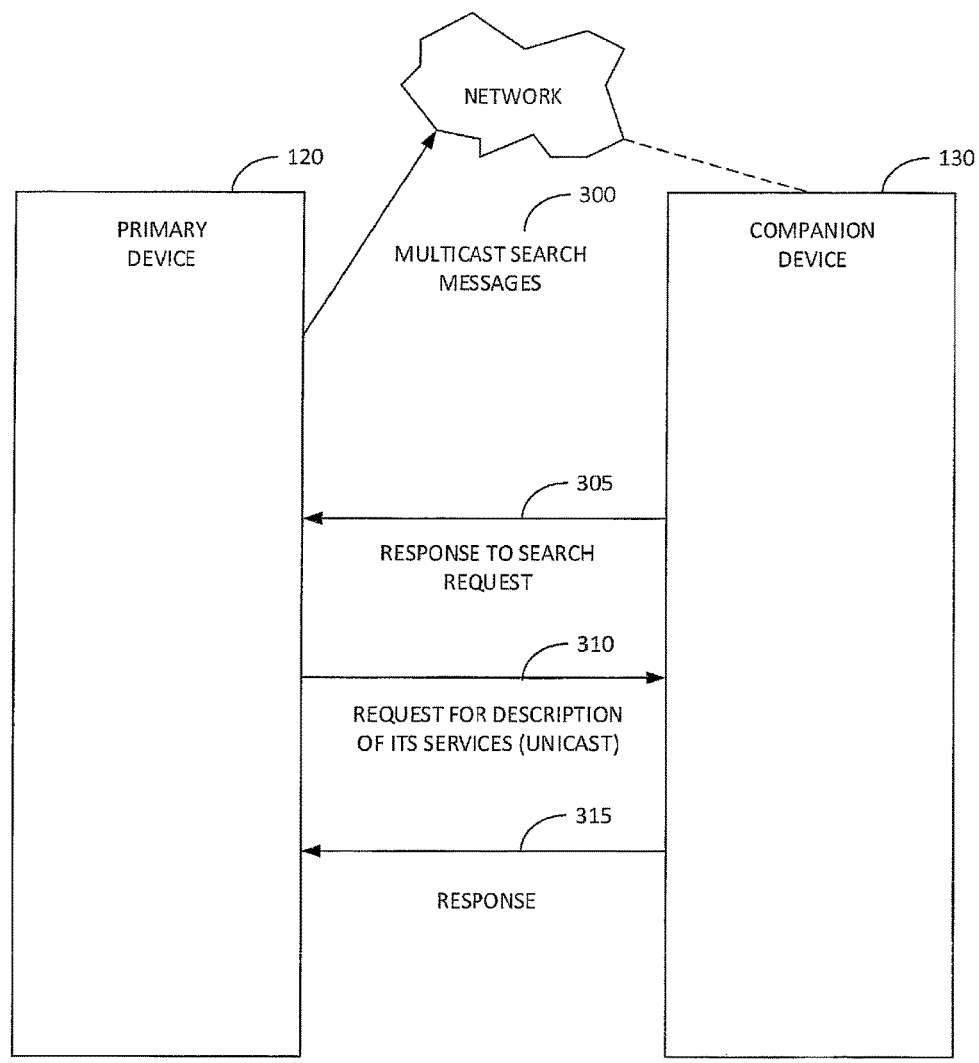
FIG. 5 illustrates another primary device and a companion device system.

Referring to FIG. 5, by way of example, the viewer has an ATSC compliant CD application running when the PD joins the network (e.g., when the PD is turned on or the network interface is enabled). The PD 120 desires to discover one or more CDs 130 on the network. The PD 120 joins the network and multicasts it search messages 300 seeking CDs 130. The CD 130 running an ATSC application receives the multicast search message and in response sends the PD 120 a response indicating its presence 305. On receiving this response the PD 120 may send a request 310 for the description of services that CD offers to PD. The request 310 may be sent via a unicast technique, rather than a multicast technique. On receiving the request 310 the CD responds with a description of its services by sending a message 315 to the PD. The PD 120 receives the message 315 and uses the information given in the service descriptions to access the appropriate services and to understand the capabilities of the CD 130.

Figure 6:
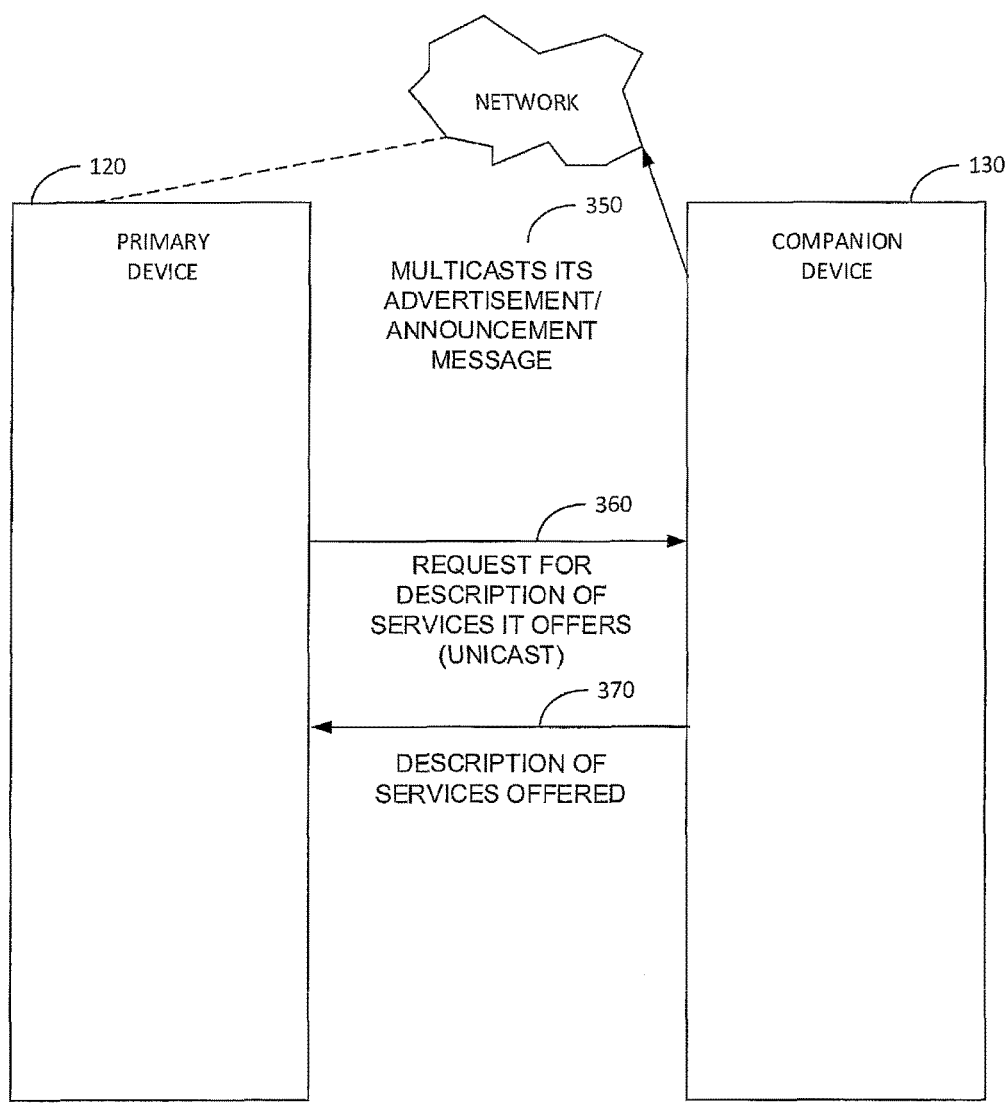
FIG. 6 illustrates another primary device and a companion device system.

Referring to FIG. 6, by way of example, a CD 130 joins the network or an application is started on a CD 130. The PD 120 is already on the network. The CD 130 multicasts its advertisement/announcement message 350 that announces the CD 130 and its available services. The PD 120 receives the multicast advertisement message from the CD 130 via network and sends the CD 130 a request for descriptions of the services it offers 360. The message may be sent via unicast, rather than multicast. The CD receives the message and responds with a description of the services it offers 370 to the PD 120. The PD 120 uses the information given in the service descriptions to access the appropriate services and to understand the capabilities of the CD.

As illustrated in FIGS. 3-6, the household may have more than one CD on the home network and the household may have more than one PD on the network. In this case each CD would receive lookup messages from multiple different PDs via network. Also multiple PDs will receive announcement messages from multiple CDs via network.

As noted above, in some environments, there may be more than one PD 120, especially when using the home network. In this case, the CD 130 may receive discovery messages from the multiple PDs 120 via network. If that happens the CD 130 may ask the user which of the PDs 120 to interact with.

A typical application on the CD 130 may operate as follows. A control point or service on the CD 130 subscribes to a packaged apps service on the PD 120. A packaged app may be an application on the device offering service. A viewer starts the packaged app on the PD 120 The packaged app makes the name of application on the CD 130 and the uniform resource locator (URL) of the application on the CD 130 available to the packaged app service. The control point on the CD 130 receives the companion application name and URL. The control point sets a marker on the CD 130 indicating that viewer action is needed. The viewer reviews the companion application name and selects it. The control point launches the indicated application on the CD 130 as indicated by ATSC Candidate Standard: Interactive Services Standard (A/105:2014), Apr. 24, 2014 (513-2-389r7), incorporated by reference herein in its entirety.

Figure 7:
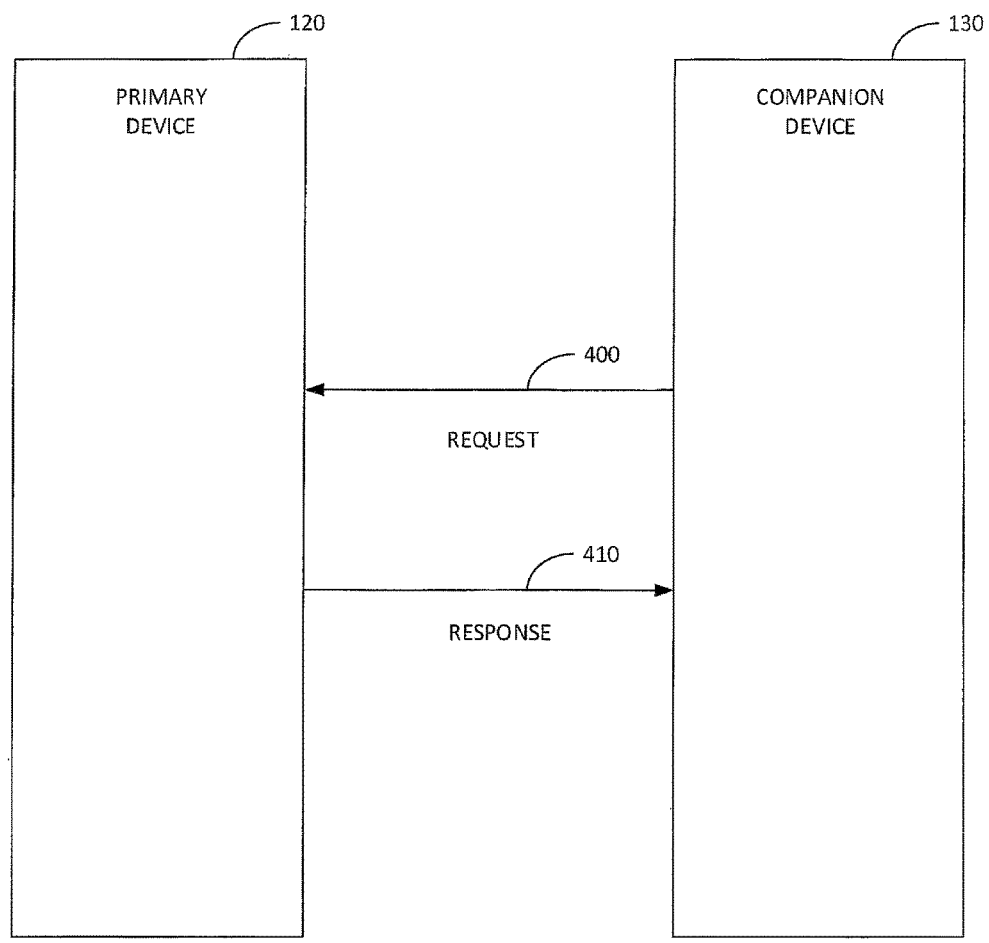
FIG. 7 illustrates another primary device and a companion device system.

Referring to FIG. 7, it is desirable for the CD 130 to request information from the PD 120 about the current audiovisual content being presented on the PD. While the CD 130 may make a request to subscribe to the receive the information about content being presented the PD 120 which provides a response with an ID for the content, and then make a request for the content based upon the ID, this is a cumbersome process. In addition, in the event that the content being displayed on the PD 120 changes, then the ID provided by the CD 130 that was previously received will refer to different content than that currently being presented on the PD causing a disrupted experience for the viewer using the CD 130. To alleviate the concern about receiving a response that does not correspond to the currently displayed audiovisual content, the CD 130 preferably makes a single request 400 to the PD 120 for information about the currently running service, program and/or show, and/or segment without having to provide an identification of the currently running service, show, and/or segment. The PD 120, in response to receiving the request 400, provides a response 410 with the desirable information. The desirable information may include, for example, an electronic service guide type information about the content currently being presented on the PD For example the CD 130 may make a request to the PD 120 to receive current service information. This may be invoked at any time when needed by the application. The input parameters for this request may include one or more of the following:

Companion Device ID
Companion Device Application ID
Companion Device Application Version
Current information requested may include one or more of following:
    Request for current show information (e.g., electronic service guide information for the current show being presented on the PD);

Request for currently available components for the current show being presented on the PD (e.g., video, audio, closed captioning, main camera view, alternative camera view, etc. for the content being presented on the PD);

Request for currently available files and/or non-real-time content for the current show being presented on the PD;

Optionally the request may include a filtering criterion which may be used to limit the amount of information being requested in response thereto.

An example of the filtering criterion may be e.g., standard definition video only, high definition video or ultra high definition video, black/white video, color video, 5.1 channel audio, or stereo audio etc.

For example the PD 120 may send a response to the CD 130 after receiving the above request. This may preferably be sent upon receiving a service information request. The response 410 may include one or more of the following parameters:

Primary Device ID

Requested information about the current show may include one or more of following:

Current show information (e.g., electronic service guide);

Information about currently available components for the current show (e.g., video, audio, closed captioning, main camera view, alternative camera view);

Currently available files and/or non-real-time content for the current show.

Figure 8:
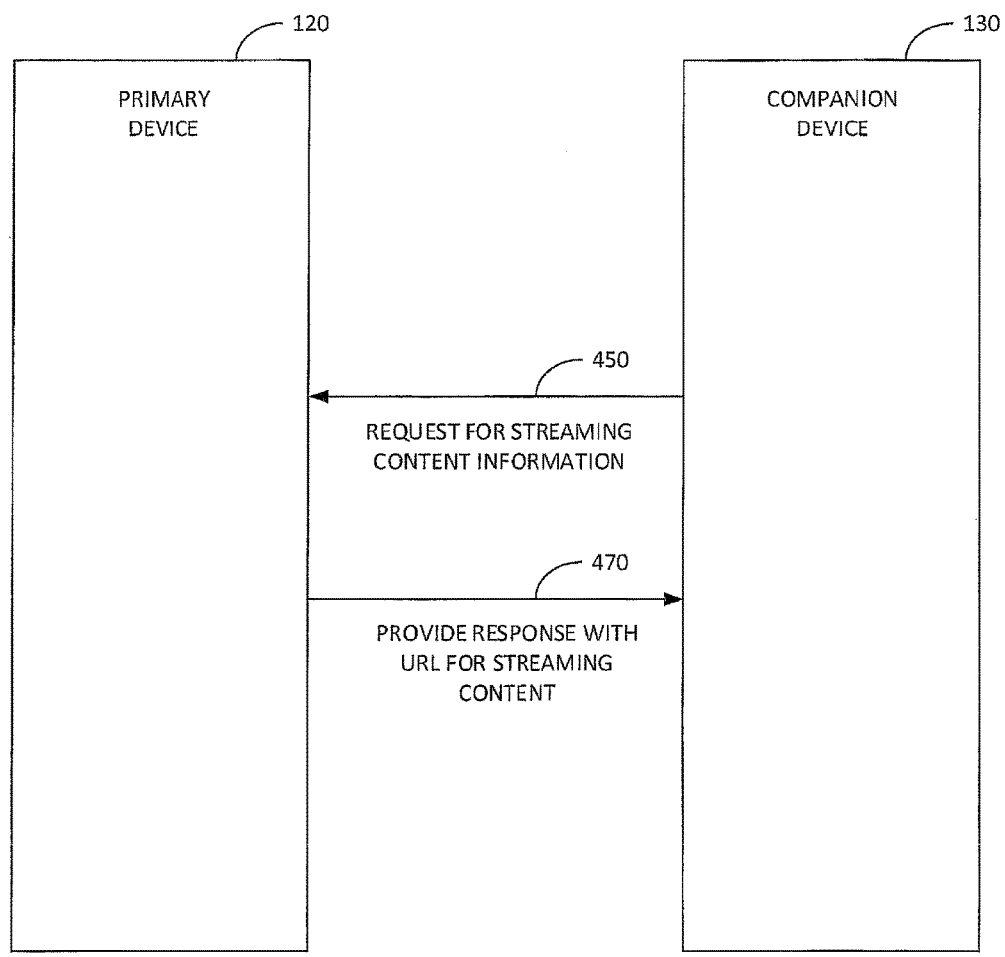
FIG. 8 illustrates another primary device and a companion device system.

Referring to FIG. 8, when the CD 130 is accessing audiovisual information from the PD 120 and when the CD 130 is accessing audiovisual information from another source, such as the Internet or a network location, it is desirable that both sources of such audiovisual information are addressed and obtained in a similar manner. The request for streaming content information 450 from the CD may result in a description of the streaming content 470, that includes a location identification for the audiovisual content whether the location of the audiovisual information is from the PD 120 or from another location, such as the Internet or a network.

For example the CD 130 may make a request to the PD 120 to receive service information. This may be invoked at any time when needed by the application or otherwise to continuously receive the streaming information. The input parameters may include one or more of the following:

Companion Device ID

Companion Device Application ID

Companion Device Application Version

Current information requested may include one or more of following:

Request for current show information (e.g., electronic service guide information for the current show being presented on the PD);

Request for currently available components for the current show being presented on the PD (e.g., video, audio, closed captioning, main camera view, alternative camera view, etc. for the content being presented on the PD);

Request for currently available files and/or non-real-time content for the current show being presented on the PD;

Optionally the request may include a filtering criterion which may be used to limit the amount of information being requested in response thereto.

An example of the filtering criterion may be e.g., standard definition video only, high definition video or ultra high definition video, black/white video, color video, 5.1 channel audio, or stereo audio etc.

For example the PD 120 may send a response to the CD 130 after receiving the above request. This may preferably be sent upon receiving a service information request. The response parameters may include one or more of the following:

Primary Device ID

Requested information about the current show may include one or more of following:

Current show information (e.g., electronic service guide)

Information about currently available components for the current show with URLs (which include information about protocol, Internet Protocol (IP) address, port, etc.) for accessing the streaming data for each component (e.g., video, audio, closed captioning, main camera view, alternative camera view)

Currently available files and/or non-real-time content for the current show

Figure 9:
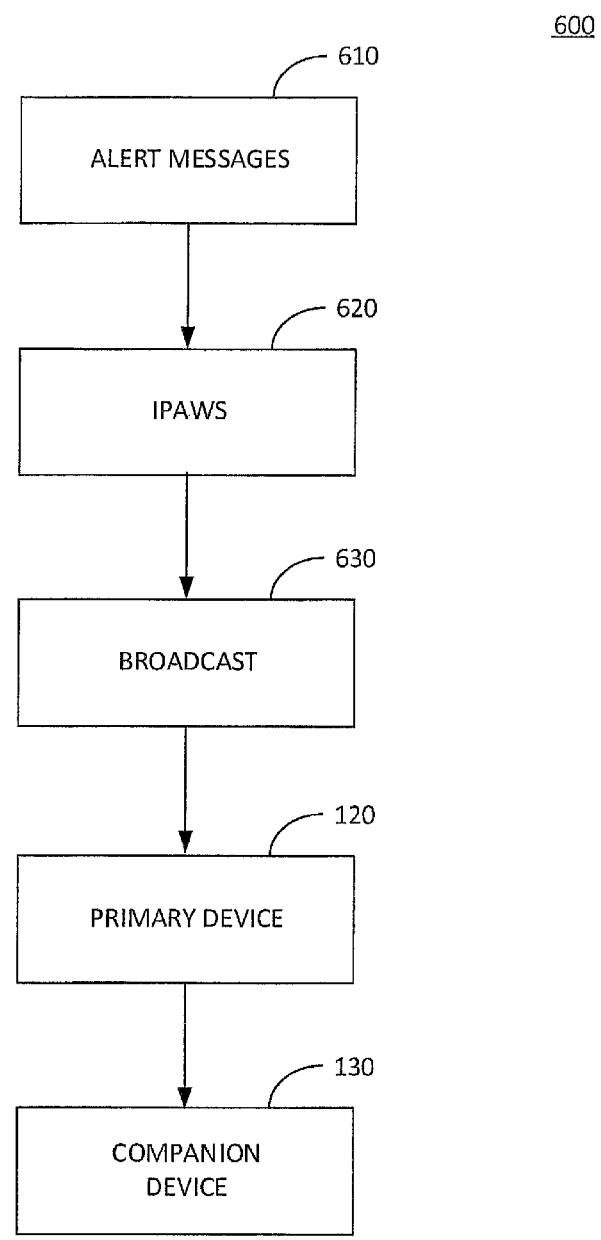
FIG. 9 illustrates an emergency alert system.

Referring to FIG. 9, an emergency alert system 600 may include alert message files 610 formatted in a common alerting protocol and further constrained by a profile of an integrated public alert and warning system (IPAWS) 620. These formatted and constrained alert message files may be issued by a suitable party, such as a federal or state agency. The alert message is broadcast by a broadcaster 630. The PD 120 may receive these alert messages and selectively provide them to one or more of the CDs 130.

Figure 10:
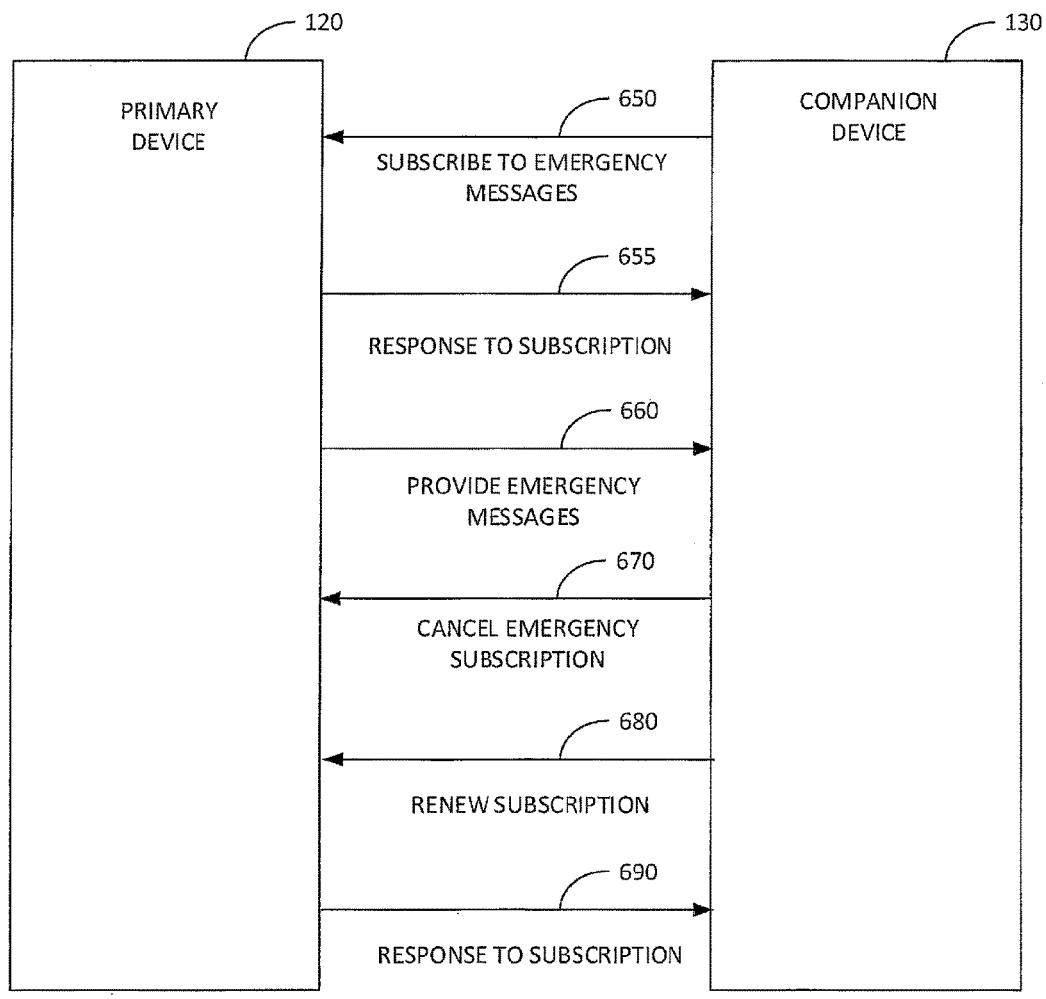
FIG. 10 illustrates another primary device and a companion device system.

Referring to FIG. 10, the CD 130 subscribes to emergency messages 650 from the PD 120. The subscription request preferably includes a callback URL. The PD accepts the subscription and sends a response to subscription 655 to the CD 130 including a subscription ID. When an emergency message is received by the PD 120, the PD 120 provides emergency message 660 to the CD 130 that has subscribed to the emergency messages using the callback URL previously provided with the subscription. The emergency message 660 may be provided as a notification message.

The CD 130 may make the subscription to emergency messages when the CD 130 joins the network or when an emergency message application is started on the CD 130. The input parameters may include one or more of the following:

Companion Device ID

Companion Device Application ID

Companion Device Application Version

Subscription callback URL information

Optional: emergency message filtering criteria (e.g., geographic location filtering to provide emergency messages corresponding to only the specified location).

For example the PD 120 may provide the emergency message subscription response to the CD 130. This may be sent preferably upon receiving the subscription information. The subscription response may include one or more of the following:

Primary Device ID

Subscription ID

Subscription duration (e.g., so that the emergency messages are not provided indefinitely, but rather for a reasonable duration that may be appropriate, such as 12 hours)

The CD 130 may send a message to the PD 120 to cancel the emergency subscription 670. Based upon the subscription duration, the CD 130 may send a message to the PD 120 to subscribe to emergency messages 650 (or otherwise renew a subscription 680). The parameters provided for the renewal of a subscription may include one or more of the following:
- Companion Device ID
- Companion Device Application ID
- Companion Device Application Version
- Subscription ID In this case, the PD already has the callback URL and geographic filtering information, and the renewed subscription is based upon the subscription ID.

Figure 10A:
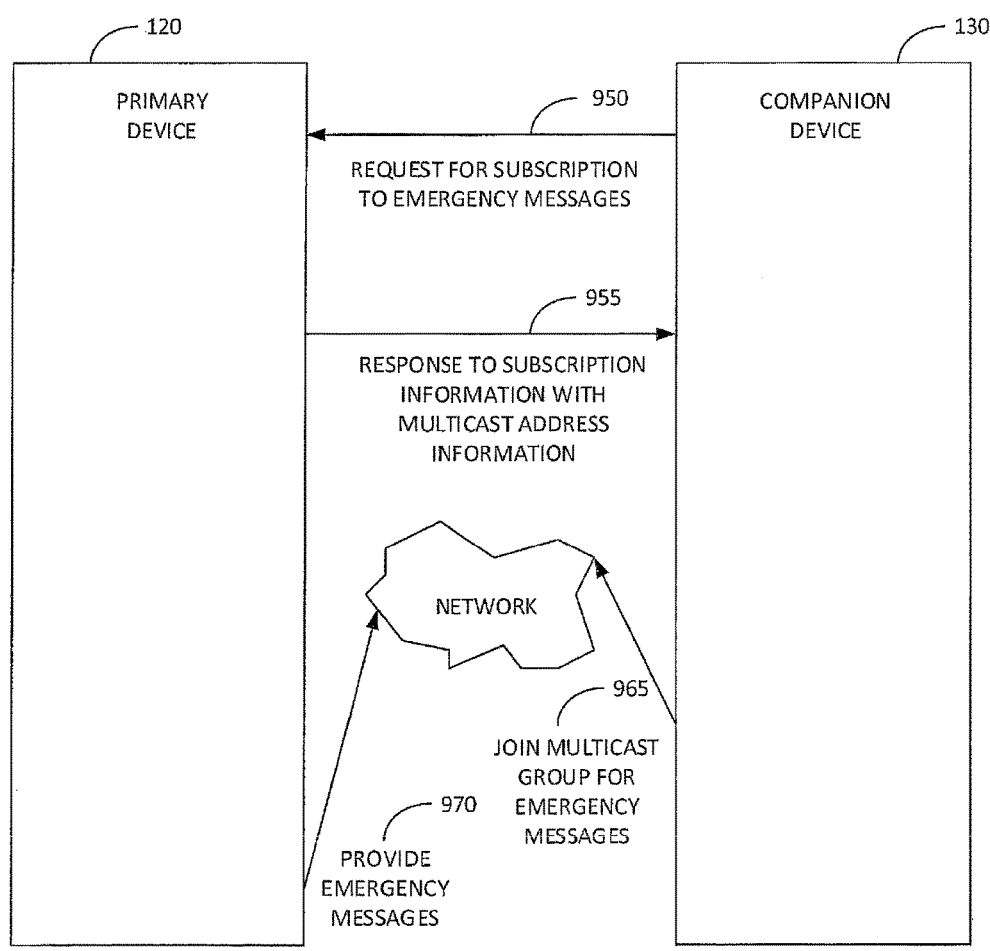
FIG. 10A illustrates another primary device and a companion device system.

When the PD 120 receives a subscription renewal or a subscription stop request it may provide a response to subscription 690 to the CD 130, if desired. The response may include one or more of the following:
- Principal Device ID
- Subscription ID,
- Subscription Duration for subscription renewal request
- Success or Failure for subscription stop request Referring to FIG. 10A, the CD 130 requests information about subscription for emergency messages 950 from the PD 120. The PD accepts the request and sends a subscription information response to the CD 955 including a multicast address information where the emergency alert message (EAM) and/or emergency alert messages (EAMs) are sent. The multicast address information may include one or more of the following information:
- Multicast group address
- Multicast port
- Protocol information
- Additional multicast related information for emergency messages The CD 130 may join 965 the multicast group for EAMs using the multicast address information. The input parameters when joining the multicast group may include zero or more of the following:
- Companion Device ID
- Companion Device Application ID
- Companion Device Application Version
- Optional: emergency message filtering criteria (e.g., geographic location filtering to provide emergency messages corresponding to only the specified location).

When an emergency message is received by the PD 120, the provided emergency message(s) may be provided on the multicast group for EAMs.

The provided emergency message(s) 970 may include one or more of the following:
- Primary Device ID
- Basic and/or initial contents of EAM
- Pointer (e.g. location information or URL) for additional information about the EAM The CD 130 that has joined the multicast group for EAMs may receive the EAMs from the multicast group. The provided emergency message(s) 970 may be a notification message.

Figure 11:
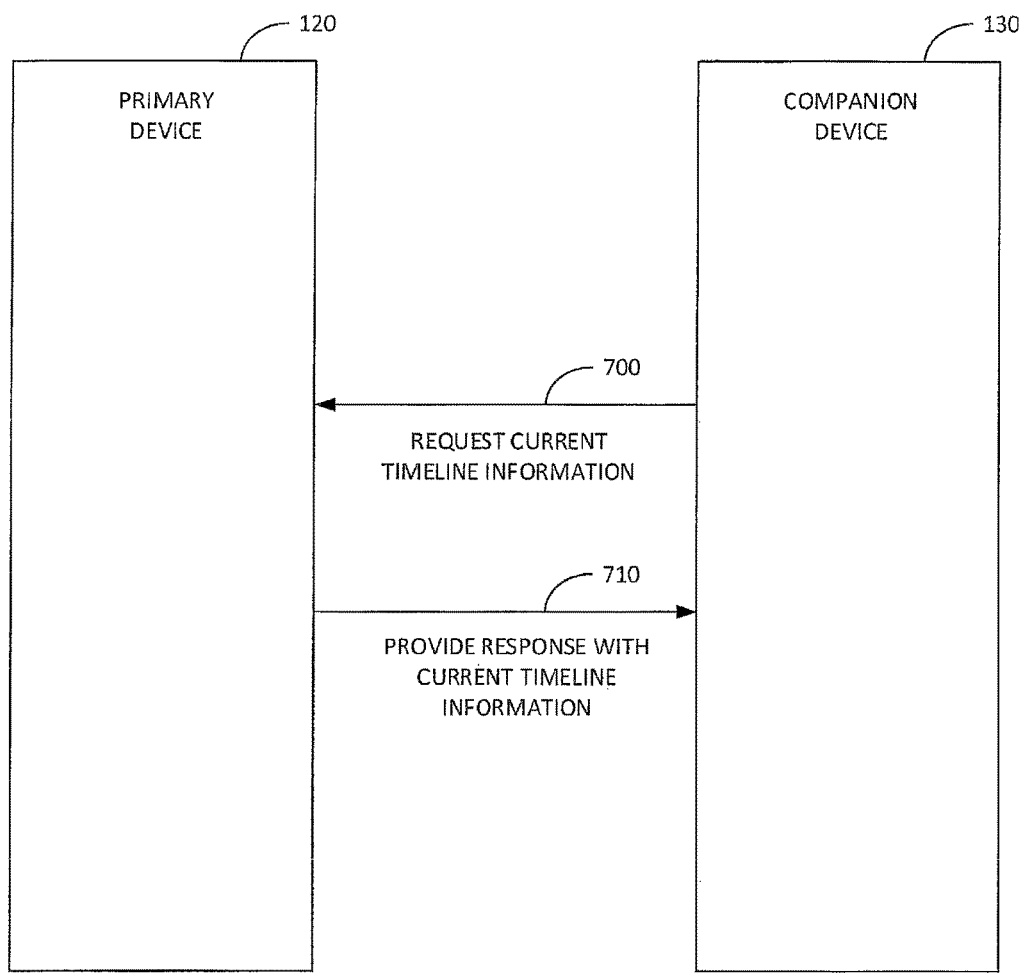
FIG. 11 illustrates another primary device and a companion device system.

Referring to FIG. 11, in some examples it is desirable to include a single transaction request response technique to receive timeline location information by the CD 130 from the PD 120. This facilitates the synchronization of the audiovisual content being displayed on the PD 120 and the CD 130.

For example the CD 130 may make a request to the PD 120 to receive the current timeline information 700. This may be invoked at any time when needed by the application. The input parameters may include one or more of the following:
- Companion Device ID
- Companion Device Application ID
- Companion Device Application Version
- The URL and/or the ID for which the current timeline information is requested or current show being viewed.

For example the PD 120 may make a response to the CD 130 with the current timeline information. This may be preferably sent upon receiving the request for the current timeline information. The response parameters may include one or more of the following:
- Primary Device ID
- Current timeline location information for the requested URL and/or program ID.

Figure 12:
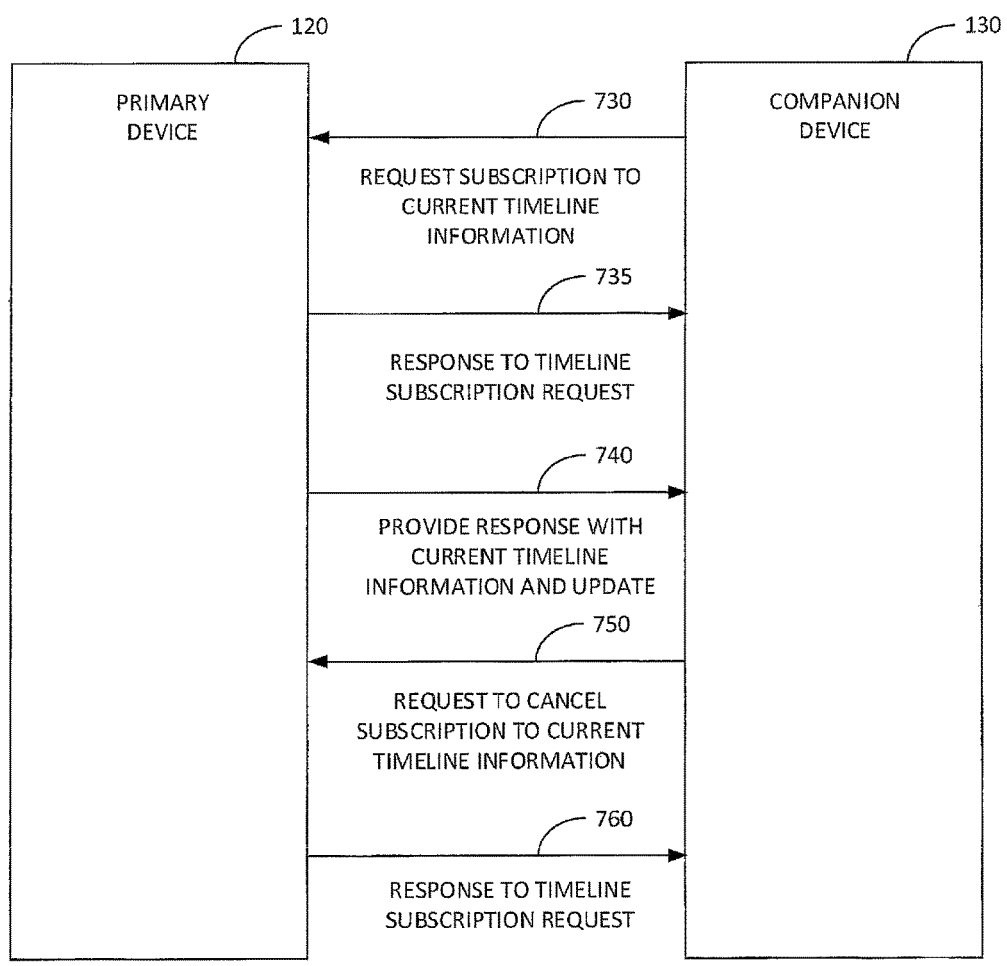
FIG. 12 illustrates another primary device and a companion device system.

Referring to FIG. 12, in some examples it is desirable to include a subscription request response technique to receive timeline information by the CD 130 from the PD 120. This facilitates the synchronization of the audiovisual content being displayed on the PD 120 and the CD 130.

For example the CD 130 may make a request to the PD 120 to subscribe to the current timeline information 730. This may be invoked at any time when needed by the application. The input parameters may include one or more of the following:
- Companion Device ID
- Companion Device Application ID
- Companion Device Application Version
- The URL and/or the ID for which the current timeline information is requested or current show being viewed
- Timeline subscription callback URL information The PD 120 may send a response to the CD 130 in response to receiving the timeline subscription response 735. The response parameters may include one or more of the following:
- Primary Device ID
- Timeline subscription ID.

The timeline subscription ID may be used to uniquely identify this particular timeline subscription. Thus assigning a timeline subscription ID for each timeline subscription is preferred. This can allow a CD to request multiple timeline information from PD at the same time. It can also allow different CDs to request information about different timelines from different PDs.

For example the PD 120 may make a notification to the CD 130 with the current timeline information that is updated on a regular basis 740. This may be invoked at any time to convey the current timeline information. The response parameters may include one or more of the following:
- Primary Device ID
- Current timeline location information for the requested URL and/or program ID.
- URL and/or program ID The CD 130 may cease receiving the subscription timeline information after a predetermined period of time and/or sending a request to cancel the subscription to current timeline information 750 to the PD 120. The request to cancel the subscription to current timeline information 750 may include the subscription ID to uniquely identify the timeline subscription being cancelled. The PD may send a response to timeline subscription request 760 upon receiving a request to cancel the subscription indicating success or failure.

A similar request to cancel the subscription to current timeline information 750 and response to timeline subscription request 760 may be exchanged between the PD and the CD to renew the timeline subscription. In this case the request may include the timeline subscription Id to uniquely identify the timeline subscription being renewed.

Figure 12A:
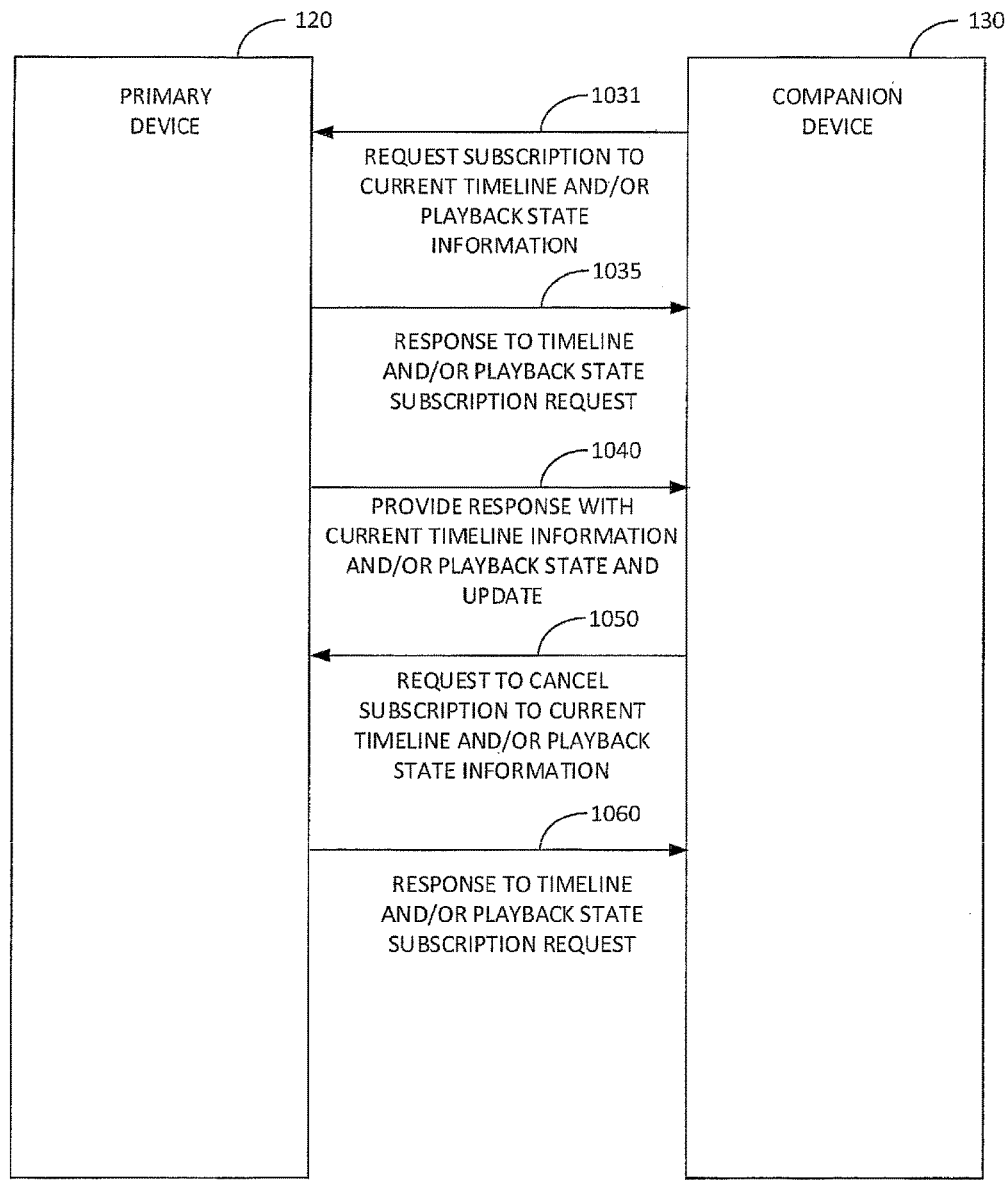
FIG. 12A illustrates another primary device and a companion device system.

Referring to FIG. 12A, in some examples it is desirable to include a subscription request response technique to receive timeline and/or media playback state information by the CD 130 from the PD 120. This facilitates the synchronization of the audiovisual content being displayed on the PD 120 and the CD 130.

For example the CD 130 may make a request to the PD 120 to subscribe to the current timeline and/or current media playback information 1031 on PD 120. This may be invoked at any time when needed by the application. The input parameters may include one or more of the following:

Companion Device ID
Companion Device Application ID
Companion Device Application Version
The URL and/or the ID for which the current timeline and/or current media playback information is requested or for the current show being viewed
Timeline and playback state subscription callback URL information
Optional: filter (send only media timeline information, or send only media playback state information, or send both media timeline and media playback state information)
Optional: Desired frequency at which to receive the notification about media timeline and/or media playback state information The PD 120 may send a response to the CD 130 in response to receiving the timeline and/or media playback state subscription response 1035. The response parameters may include one or more of the following:

Primary Device ID
Timeline and/or playback state subscription ID
Subscription duration The Timeline and/or playback state subscription ID may be used to uniquely identify this particular subscription. Thus assigning a timeline and/or playback state subscription ID for each timeline and/or playback state subscription is preferred. This can allow a CD to request multiple timeline and playback state information from PD at the same time. It can also allow different CDs to request information about different timelines and playback states from different PDs.

For example the PD 120 may make a notification to the CD 130 with the current timeline and/or media playback state information that is updated on a regular basis 1040. This may be invoked at any time to convey the current timeline and/or media playback state information. The response parameters may include one or more of the following:

Primary Device ID
Subscription ID
Current timeline location information for the requested Subscription ID.
Current media playback state information for the Subscription ID. This media playback state may include, for example, playing, paused, stopped, fast forward, speed of fast forward, fast backward, speed of fast backward, and buffering.

The CD 130 may cease receiving the subscription timeline and/or media playback state information after a predetermined period of time and/or by sending a request to cancel the subscription 1050 to the PD 120. The PD may send a response 1060 upon receiving a request to cancel the subscription indicating success or failure.

A similar request to cancel the subscription 1050 and response 1060 may be exchanged between the PD and the CD to renew the timeline and/or media playback state subscription. In this case the request may include the timeline and/or media playback state subscription ID to uniquely identify the timeline and/or media playback state subscription being renewed.

Figure 12B:
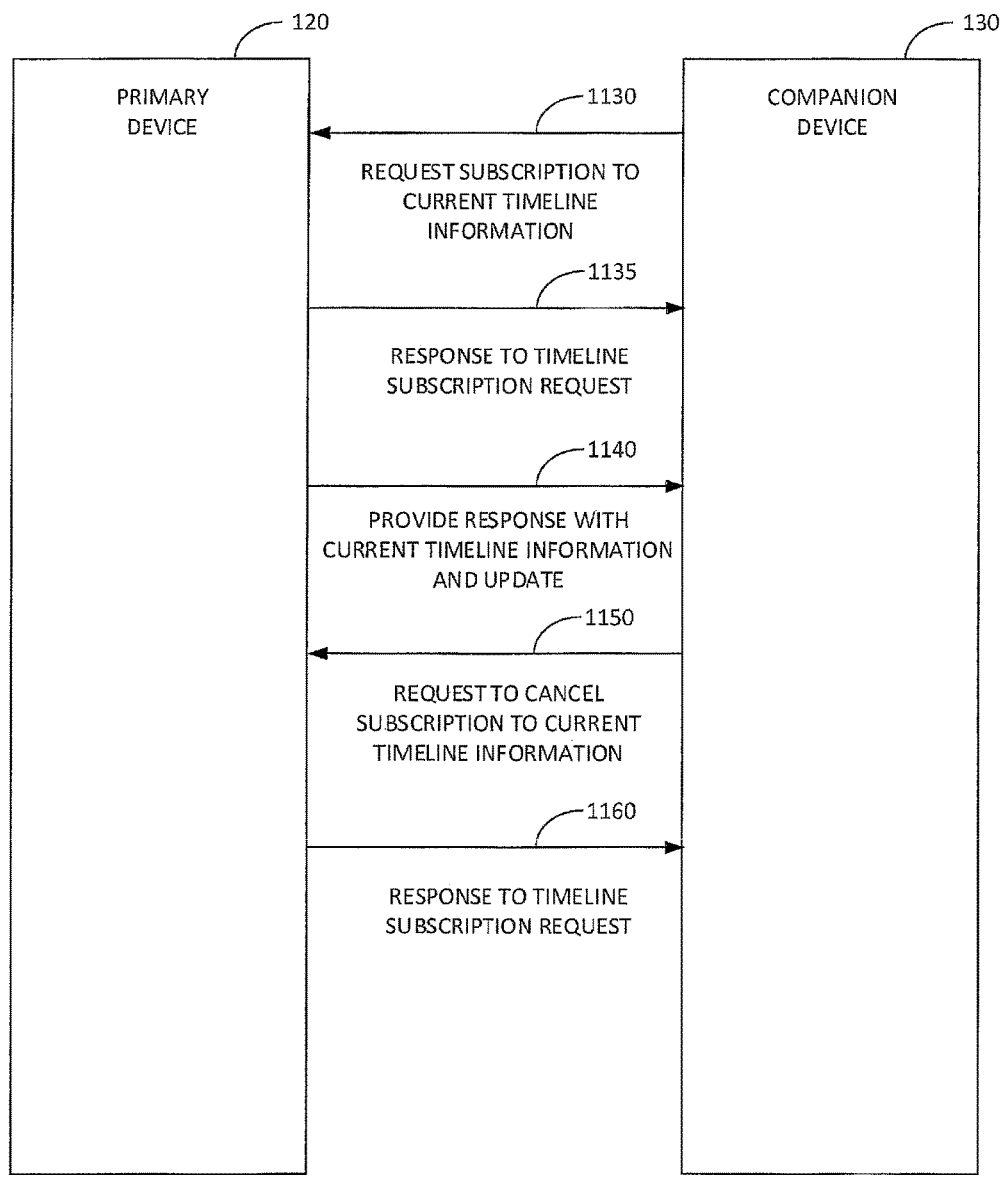
FIG. 12B illustrates another primary device and a companion device system.

Referring to FIG. 12B, in some examples it is desirable to include a subscription request response technique to receive timeline information by the CD 130 from the PD 120. This facilitates the synchronization of the audiovisual content being displayed on the PD 120 and the CD 130.

For example the CD 130 may make a request to the PD 120 to subscribe to the current timeline information 1130. This may be invoked at any time when needed by the application. The input parameters may include one or more of the following:

Companion Device ID
Companion Device Application ID
Companion Device Application Version
The URL and/or the ID for which the current timeline information is requested or for the current show being viewed
Timeline subscription callback URL information The PD 120 may send a response to the CD 130 in response to receiving the timeline subscription response 1135. The response parameters may include one or more of the following:

Primary Device ID
Timeline subscription ID.

The timeline subscription ID may be used to uniquely identify this particular timeline subscription. Thus assigning a timeline subscription ID for each timeline subscription is preferred. This can allow a CD to request multiple timeline information from PD at the same time. It can also allow different CDs to request information about different timelines from different PDs.

For example the PD 120 may make a notification to the CD 130 with the current timeline information that is updated on a regular basis 1140. Thus the current timeline information may be sent periodically. Additionally the timeline information may be sent from PD 120 to CD 130 whenever the timeline on the PD changes nonlinearly. This non-linear timeline change based notification is described later with respect to FIG. 12C and FIG. 12D. This may be invoked at any time to convey the current timeline information. The response parameters may include one or more of the following:

Primary Device ID
Current timeline location information for the requested URL and/or program ID.
URL and/or program ID The CD 130 may cease receiving the subscription timeline information after a predetermined period of time and/or by sending a request to cancel the subscription 1150 to the PD 120. The request to cancel the subscription 1150 may include the subscription ID to uniquely identify the timeline subscription being cancelled. The PD may send a response 1160 upon receiving a request to cancel the subscription indicating success or failure.

A similar request to cancel the subscription 1150 and response 1160 may be exchanged between the PD and the CD to renew the timeline subscription. In this case the request may include the timeline subscription ID to uniquely identify the timeline subscription being renewed.

Figure 12C:
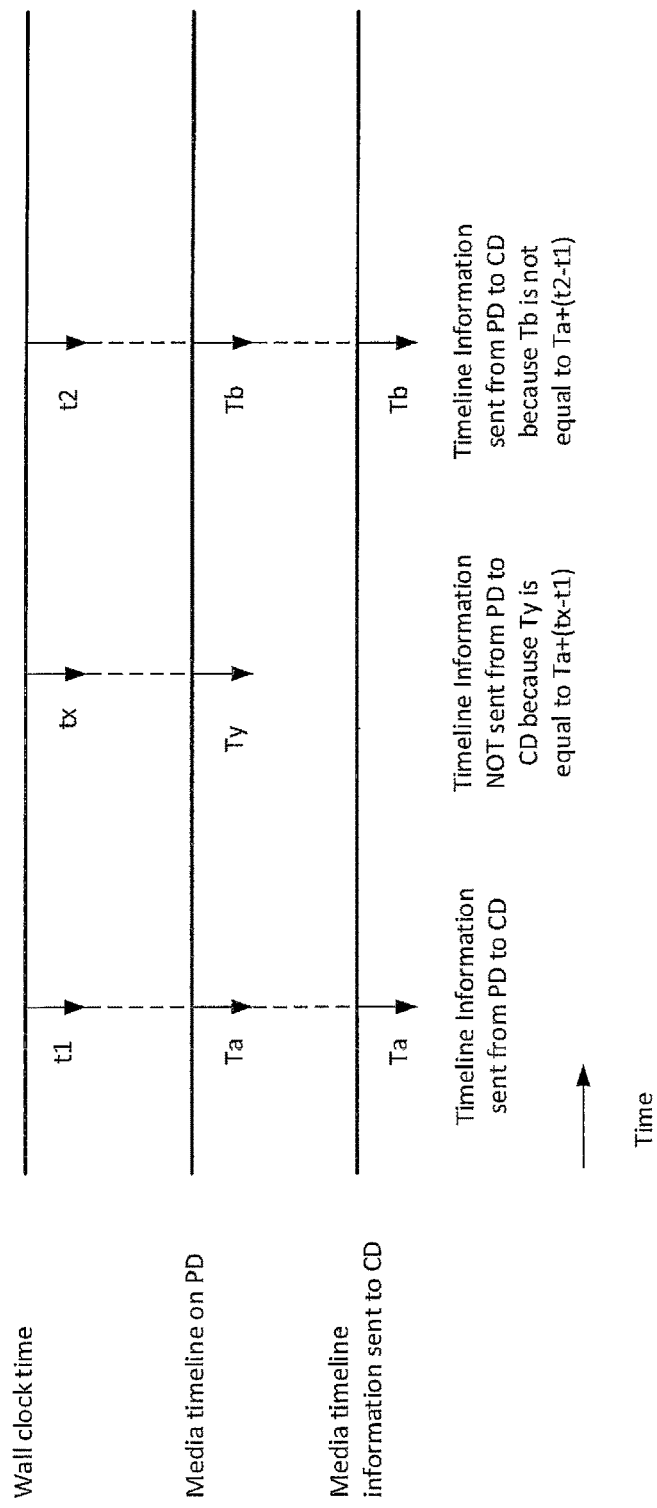
FIG. 12C illustrates a non-linear timeline change based event notification.
Figure 12D:
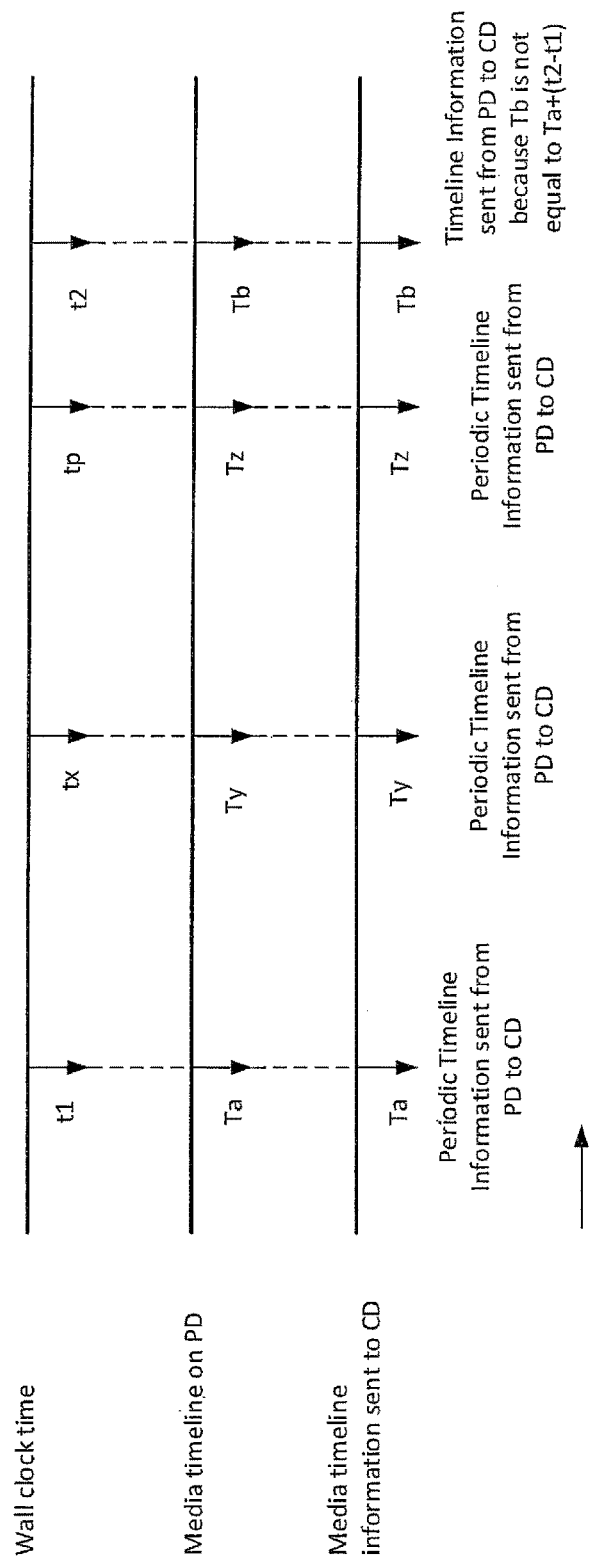
FIG. 12D illustrates another non-linear timeline change based event notification.

The non-linear timeline change based notification is described with respect to FIG. 12C and FIG. 12D. A non-linear timeline change may be detected when during certain wall-clock time period the media timeline changes by a duration different than the wall-clock time duration. As an example if timeline information was communicated by PD to CD at wall-clock time t1, when the media timeline communicated was Ta. Then at a subsequent wall-clock time t2 (with t2>=t1) if the media timeline information Tb is such that Tb is not equal to (or approximately) equal to Ta+(t2−t1) or is not equal to Ta−(t2−t1) or is not equal to Ta+x*(t2−t1) where x is a real number then the media timeline information Tb may be communicated from PD to CD at wall-clock time t2. These scenarios are illustrated further in FIG. 12C and FIG. 12D.

In FIG. 12C PD after sending the media timeline information Ta to CD for the first time, does not send media timeline information to CD unless non-linear timeline change happens. Thus at wall-clock time tx, when the media timeline information on PD is equal to Ty, since Ty is equal to Ta+(tx−t1), the media timeline information Ty is not sent from PD to CD. This is because in this case a clock running on CD could automatically derive the value Tb. At wall-clock time t2, when the media timeline information on PD is equal to Tb, since Tb is not equal to Ta+(t2−t1), the media timeline information Tb is sent from PD to CD.

In FIG. 12D in addition to sending the non-linear timeline change event information from PD to CD; timeline information is also sent periodically from PD to CD. Thus periodically at wall-clock time t1, tx, tp respectively the media timeline information Ta, Ty, Tz respectively is sent from PD to CD. At wall-clock time t2, when the media timeline information on PD is equal to Tb, since Tb is not equal to Ta+(t2−t1), the media timeline information Tb is sent from PD to CD. It should be also noted that Tb is not equal to Tz+(t2−tp) and Tb is also not equal to Ty+(t2−tx).

In one particular example of the non-linear timeline change event, the timeline information is communicated from PD to CD when a program (or show) completes playback on PD and a new program (or show) playback starts. Another example is when a service or channel change occurs on PD.

Figure 13:
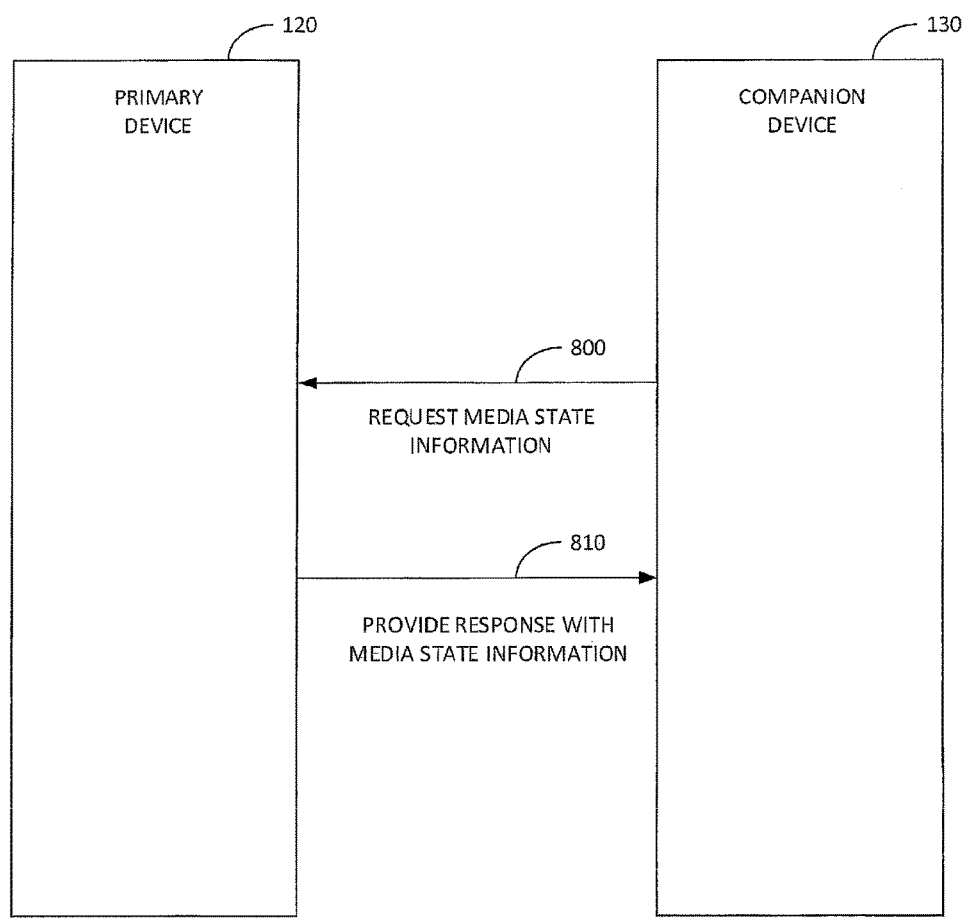
FIG. 13 illustrates another primary device and a companion device system.

Referring to FIG. 13, in some examples it is desirable to convey the media playback state of the media (e.g., a service, program, show, and/or segment) being played back on the PD 120 to the CD 130. This information is especially useful for the CD 130 if it desires to stay in synchronization with the PD 120. This facilitates the synchronization of the audiovisual content being displayed on the PD 120 and the CD 130.

For example the CD 130 may make a request to the PD 120 to receive the media state information 800. This may be invoked at any time when needed by the application. The input parameters may include one or more of the following:
  Companion Device ID
  Companion Device Application ID
  Companion Device Application Version
  The URL and/or the ID for which the media playback state is requested.

For example the PD 120 may make a response to the CD 130 with the media state information 810. This may be preferably sent upon receiving the request for the media state information. The response parameters may include one or more of the following:
  Primary Device ID
  Current media playback state information for the requested URL and/or ID. This current media playback state may include, for example, playing, paused, stopped, fast forward, speed of fast forward, fast backward, speed of fast backward, and buffering.

Figure 14:
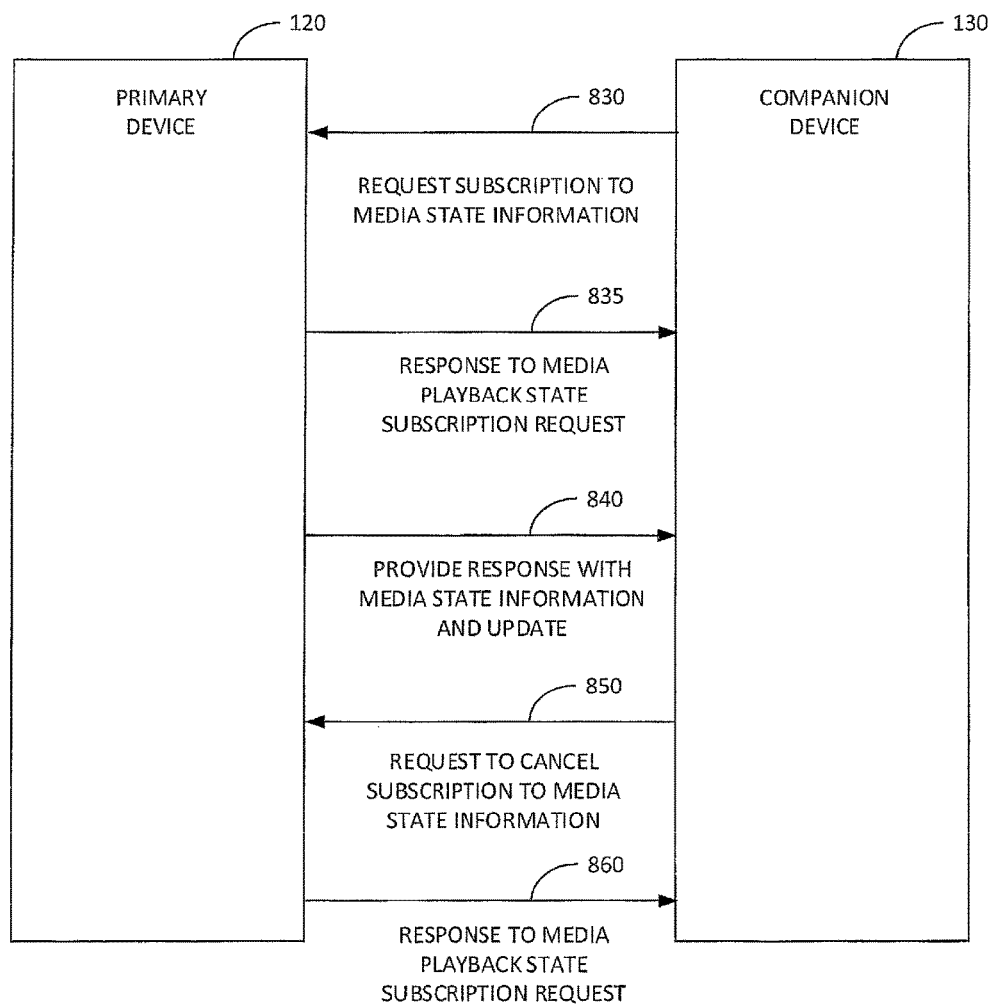
FIG. 14 illustrates another primary device and a companion device system.

Referring to FIG. 14, in some examples it is desirable to include a subscription request response technique to receive the media state information by the CD 130 from the PD 120. This facilitates the synchronization of the audiovisual content being displayed on the PD 120 and the CD 130.

For example the CD 130 may make a request to the PD 120 to subscribe to the media playback state information 830. This may be invoked at any time when needed by the application. The input parameters may include one or more of the following:
  Companion Device ID
  Companion Device Application ID
  Companion Device Application Version
  The URL and/or the ID for which the media playback state is requested
  Media state subscription callback URL information The PD 120 may send a response to the CD 130 in response to receiving the media playback state subscription response. The response parameters may include one or more of the following:
  Primary Device ID
  Media playback state subscription ID.

The media playback state subscription ID may be used to uniquely identify this particular media playback state subscription. Thus assigning a media playback state subscription ID for each media playback state subscription is preferred. This can allow a CD to request multiple media playback state information from the PD at the same time. It can also allow different CDs to request information about different media playback states from different PDs.

For example the PD 120 may send a notification to the CD 130 with the current media playback state information that is updated on a regular basis 840. This may be invoked at any time to convey the media playback state information. In one example the notification may be sent every time the media playback state changes. For example if the viewer pauses the presentation on the PD. Then a media playback state notification indicating the "Paused" state will be sent from the PD to the secondary device. Then later when the viewer resumes play on the PD a media playback state notification indicating the "Playing" state will be sent from the PD to the secondary device. This can allow the CD to playback media synchronized with the PD. In one example CD may automatically change its own media playback state when it receives a notification message indicating the change in the media playback state of the PD. Thus the response parameters may include one or more of the following:
  Primary Device ID
  Media state subscription ID information for the requested URL and/or program ID
  Current media playback state information for the subscription ID. This may include, for example, playing, paused, stopped, fast forward, speed of fast forward, fast backward, speed of fast backward, and buffering.

The CD 130 may cease receiving the media state subscription information after a predetermined period of time and/or sending a request to cancel the subscription 850 to the PD 120. The PD may send a response 860 upon receiving a request to cancel the subscription indicating success or failure.

A similar request response as 850 and 860 may be exchanged between the PD and the CD to renew the media playback state subscription. In this case the request preferably includes the media playback state subscription ID to uniquely identify the media playback state subscription being renewed.

In some examples, there may be multiple audiovisual content being displayed each having their own timeline, which is managed by the CD. In this manner, the CD can simultaneously display more than one audiovisual content and/or switch between different audiovisual content, while being in synchronization with the corresponding PD. In addition, by subscribing to the media playback state information, the PD 120 may notify the media playback state to the CD 130 when events occur, such as for example, stopping the audiovisual content, pausing the audiovisual content, fast forwarding the audiovisual content, rewinding the audiovisual content, skipping forward and/or backward in the audiovisual content, or otherwise.

As previously described for example in relation with FIG. 5 and FIG. 6, the CD 130 may be made discoverable from the PD 120.

For example the CD 130 may advertise or announce a message to help its discovery by the PD 120. This may be invoked at any time when needed by the application, such as starting the application and/or joining the network using a multicast message, or when the PD sends a multicast search request for device and/or service types of the CD (for example a unicast message from CD). The input parameters may include one or more of the following:

Companion Device ID
Companion Device Application ID
Companion Device Application Version
Human readable name of CD
CD services (service types) supported For example the PD 120 may send a multicast message to the network to discover the CD 130. Thus the PD may send a multicast search message looking for device type and/or service type of CD(s). The search message parameters may include one or more of the following:

Primary Device ID
Primary Device type
Primary Device version
Human readable name of PD
CD type and/or CD service type being looked up It is to be understood that the system may be reconfigured, as desired. It is to be understood that the system may include additional elements and/or fewer elements, as desired. It is to be understood that some of the message sequence may be altered such that a message 1 shown to be sent before message 2 may instead be sent after message 2.

Figure 15:
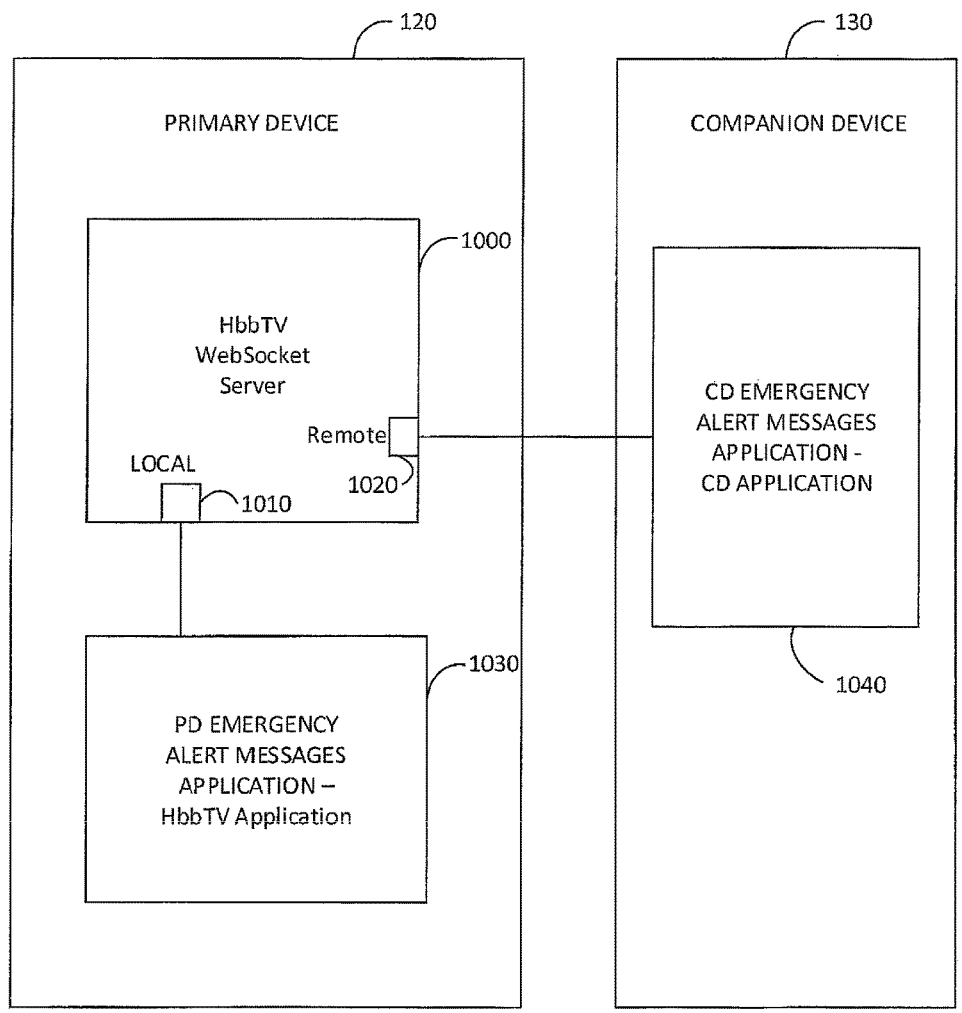
FIG. 15 illustrates a primary device and a companion device, each with an application.

Referring to FIG. 15, an exemplary PD 120 is illustrated together with an exemplary
CD 130. The PD 120 may include a HbbTV WebSocket server 1000 that includes a local service end-point 1010 and a remote service end-point 1020. HbbTV is a standard for the delivery of broadcast TV and broadband TV principally to the home, through a single user interface which is suitable for operating over different broadcasting technologies, such as for example, satellite, cable, terrestrial, and/or IP based networks. HbbTV may be defined by a Technical Specification (TS) of the European Telecommunications Standards Institute (ETSI). For example, HbbTV may be define by one or more of the following, HbbTV 2.0 Working Draft HbbT-Vworking-draft_ts_102796v010301p_draft_23-non-etsi-branding.pdf, ETSI TS 102 796 v1.1.1 in June 2010, and ETSI TS 102 796 v1.2.1 Nov. 2012, both of which are incorporated by reference herein in their entirety. The HbbTV WebSocket server 1000 may include the local service end-point 1010 that provides interconnection to a PD EAMs application 1030 that is HbbTV compliant. In this manner, the system is suitable for readily including more than one PD EAMs application 1030, through the use of multiple local service end-point 1010 connections, while maintaining the same HbbTV WebSocket server 1000. The CD 130 may include a CD EAMs application 1040. The CD EAMs application 1040 may interconnect with the HbbTV WebSocket server 1000 through the use of the remote service end-point 1020. In this manner, the system is suitable for readily including more than one CD EAMs application 1040 and/or is suitable for readily including more than one CD EAMs application 1040, each with a different CD 130.

Figure 16:
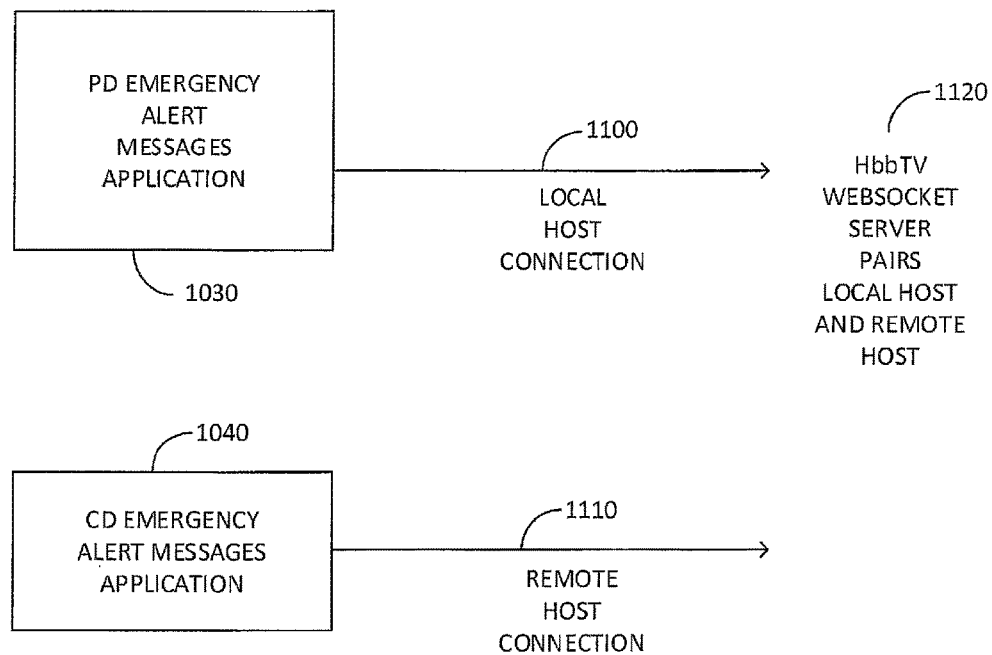
FIG. 16 illustrates primary device and companion device messages.

The communication between the PD 120 and the CD 130 may establish the EAMs communication. Referring also to FIG. 16, the PD EAMs application 1030, acting as a client, makes a connection 1100 to the local service end-point 1010 of the HbbTV WebSocket server 1000 on PD 120 using a base url resource (e.g., /hbbtv/) and with app-endpoint (e.g., "org.atsc.pdcdeas"). In this manner, the PD EAMs application identifies both the resource requested and the type of service with a two part identifier, namely, "/hbbtv" and "org.atsc.pdcdeas". Other identification mechanisms may likewise be used, if desired. Also the exact string used for each of the two part identifiers may be different than those described above. The CD EAMs application 1040 acting as a client makes a connection 1110 to the remote service end-point 1020 of the HbbTV WebSocket server 1000 on PD 120 with a base url resource (e.g., /hbbtv/) and with the same app end-point (e.g., "org.atsc.pdcdeas"). In this manner, the CD EAM application identifies both the resource requested and the type of service with a two part identifier. Other identification mechanisms may likewise be used, if desired. The HbbTV WebSocket server 1000, upon receiving a connection from the remote service end-point 1020 and a connection from the local service end-point 1010, both of which having a matching base url resource with the same app end-point, are paired 1120 by the HbbTV WebSocket server 1000 as they are both waiting on connections. After pairing, the PD EAMs application 1030 and the CD EAMs application 1040, may communicate with each other, either directly or through the HbbTV WebSocket server 1000, using an EAMs protocol.

Figure 17:
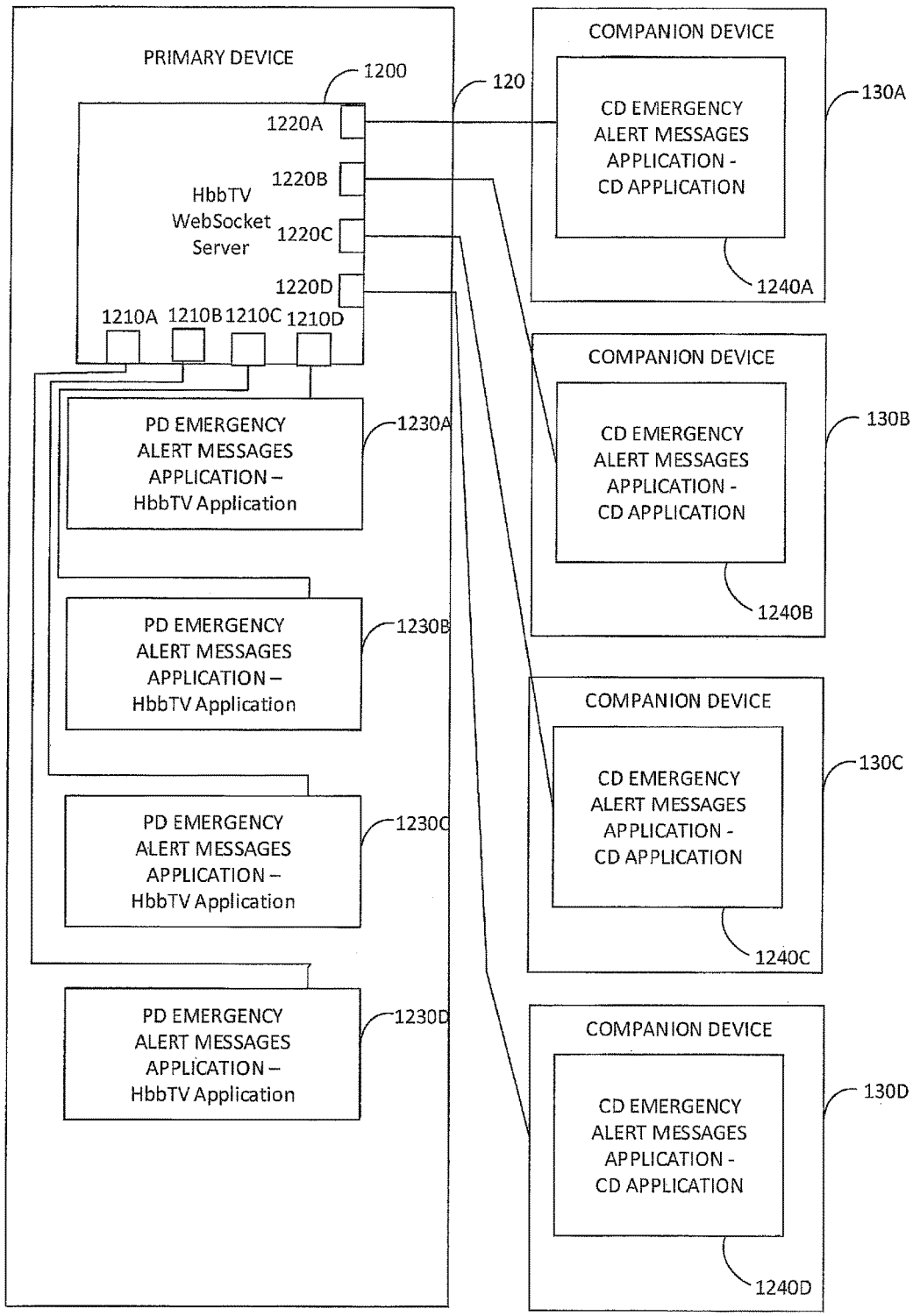
FIG. 17 illustrates another primary device and companion devices.

Referring to FIG. 17, in another example the PD 120 includes a HbbTV WebSocket server 1200 together with a plurality of local service end-points 1210A-1210D. A plurality of PD EAMs applications 1230A-1230D may be included within the same PD 120 which communicate with the HbbTV WebSocket server 1200 through a respective local service end-points 1210A-1210D. Each of the respective PD EAMs applications 1230A-1230D may be different instantiations of the same application or may be different applications suitable to communicate different emergency messages from the same and/or different sources. The HbbTV WebSocket server 1200 may include a plurality of remote service end-points 1220A-1220D. A plurality of CDs 130A-130D may each include a corresponding CD EAMs application 1240A-1240D. In this manner, each of the PD EAMs applications 1230A-1230D may communicate with a respective one or more of the CD EAMs application 1240A-1240D. In some cases, two or more PD EAMs applications 1230A-1230D may communicate with the same CD EAMs application 1240A-1240D. This provides flexibility in the configuration of the PD EAMs applications 1230A-1230D communicating with the CD EAMs applications 1240A-1240D.

Figure 18:
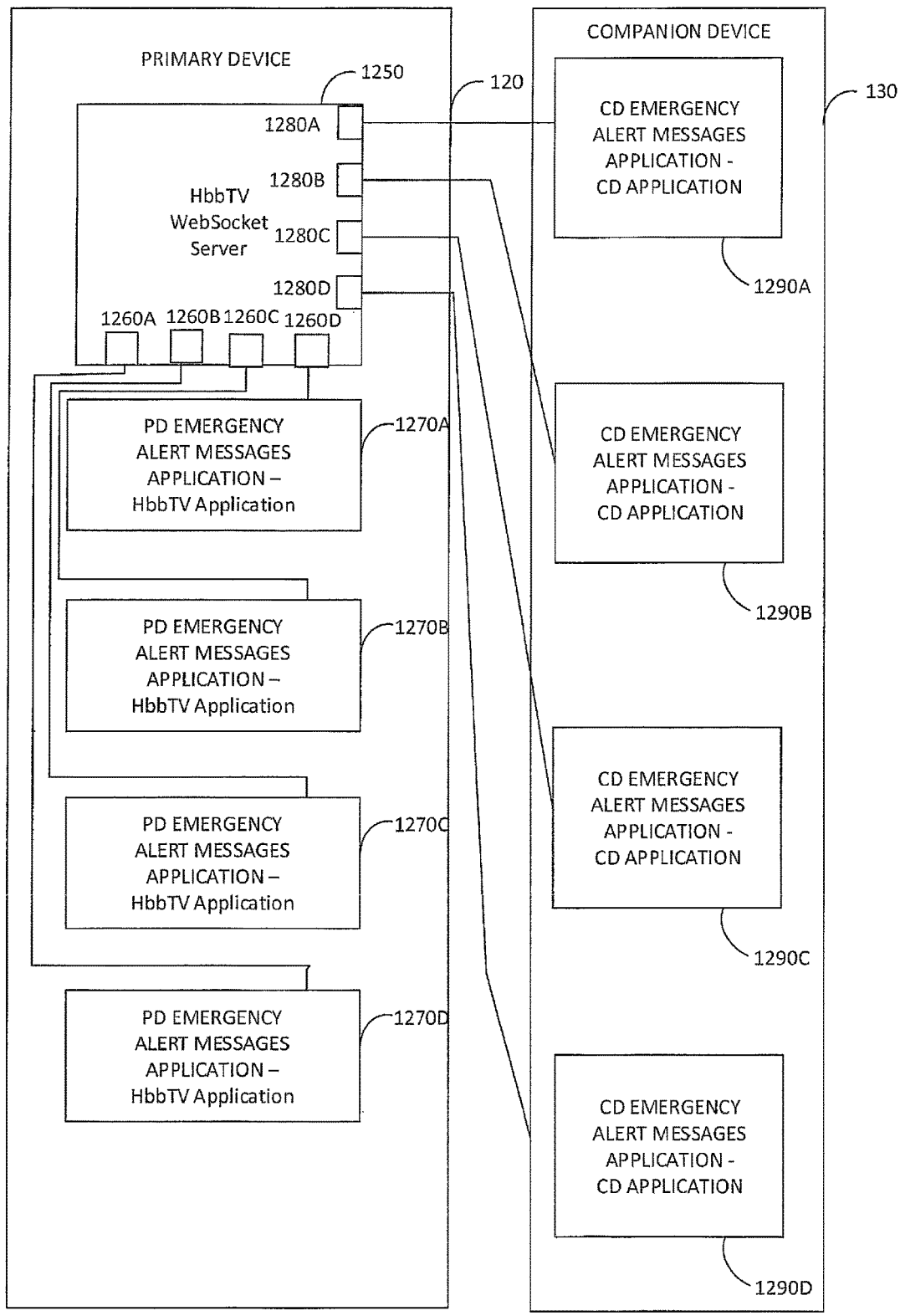
FIG. 18 illustrates another primary device and a companion device.

Referring to FIG. 18, another example the PD 120 includes a HbbTV WebSocket server 1250 together with a plurality of local service end-points 1260A-1260D. A plurality of PD EAMs applications 1270A-1270D may be included within the same PD 120 which communicate with the HbbTV WebSocket server 1250 through a respective local service end-points 1260A-1260D. Each of the respective PD EAMs applications 1270A-1270D may be different instantiations of the same application or may be different applications suitable to communicate different emergency messages from the same and/or different sources. The HbbTV WebSocket server 1250 may include a plurality of remote service end-points 1280A-1280D. A CD 130 may include a plurality of CD EAMs application 1290A-1290D. In this manner, each of the PD EAMs applications 1270A-1270D may communicate with a respective one or more of the CD EAMs applications 1290A-1290D. In some cases, two or more PD EAMs applications 1270A-1270D may communicate with the same CD EAMs applications 1290A-1290D. This provides flexibility in the configuration of the PD EAMs applications 1270A-1270D communicating with the CD EAMs application 1290A-1290D.

In other examples, the HbbTV WebSocket server may be any other type of server that is capable of communicating with one or more PD EAMs applications. The communication between the server and the PD EAMs applications may likewise be provided using any suitable technique. The communication between the server and the CD 130 and/or one or more CD EAM applications may be provided using any suitable technique.

The PD 120 or the CD 130 may initiate the closure of the connection with the other by sending WebSocket protocol Close frame. WebSocket protocol is described in RFC 6455 http://www.ietf.org/rfc/rfc6455.tx and close frame is described in RFC 6455 WebSocket protocol, both of which are incorporated by reference. Alternatively, the PD 120 or the CD 130 may close the connection with the other without sending WebSocket protocol's Close frame. In this case HbbTV WebSocket server 1000 on the PD may initiate the process of disconnection by sending WebSocket protocol's Close frame to the PD EAM application 1030 and/or the CD EAM application 1040 and/or CD 130.

In some examples, it is desirable to include additional security in the communication between the PD 120 and the CD 130. To improve security, the PD 120 and the CD 130 may communicate using port 443 for WebSocket connections tunneled over a Transport Layer Security (TLS) protocol. In an example, this may be achieved using a Uniform Resource Identifier (URI). In an example, this may be achieved by using a wss-URI scheme for WebSocket URIs as defined in a Request for Comments (RFC) of the Internet Engineering Task Force (IETF). For example, a wss-URI scheme for WebSocket URIs is defined in section 3 of IETF RFC 6455 (2011) incorporated by reference herein in its entirety. The HbbTV WebSocket server may use a client authentication mechanism available to a HyperText Transfer Protocol (HTTP) server. For example, this may be one or more of (1) cookies, (2) HTTP authentication, and/or (3) TLS authentication.

In one example, the client authentication may be done for both the PD EAMs application 1030 running on the PD 120 and CD EAMs application 1040 running on the CD 130.

In one example, a protocol may be defined for the PD 120 and the CD 130 EAM communication using Sec-Web-Socket-Protocol header of WebSocket Protocol. In this case, the HbbTV mechanism may be modified by requiring that the terminal (e.g. PD and/or CD) support Sec-WebSocket-Protocol header as defined in clause 11.3.4 of WebSocket protocol RFC 6455, incorporated by reference herein it its entirety. In this case, an application protocol (or subprotocol) between the PD 120 and the CD 130 for EAMs communication when using WebSocket may be indicated with a string. For example, the string 'PDCDEAS" may be used for the subprotocol signaled via SecWebSocket-Protocol, such as Sec-WebSocket-Protocol: PDCDEAS. In this case, when the PD 120 and the CD 130 both include the same designated subprotocol then they can effectively communicate and exchange EAMs.

Figure 19:
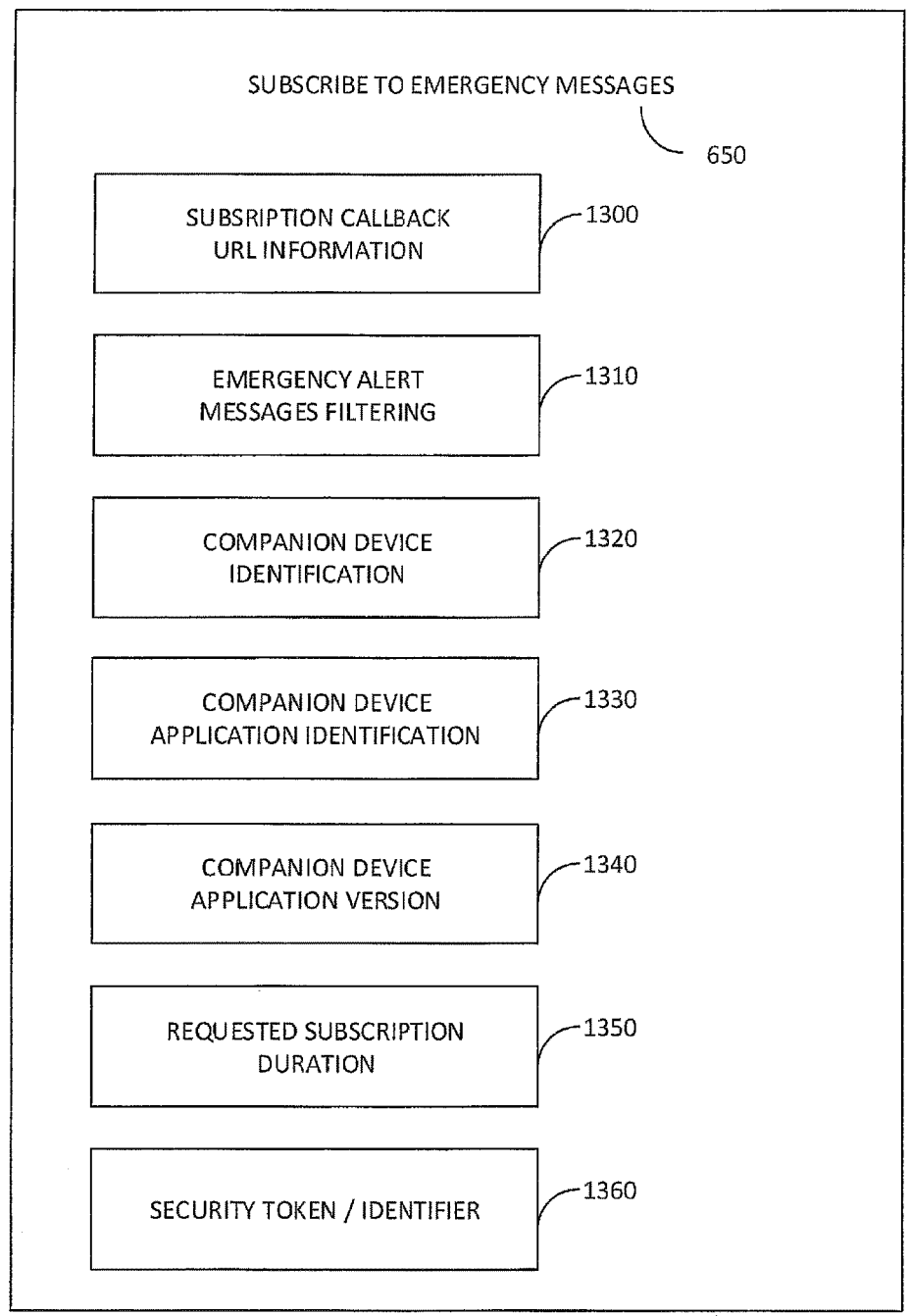
FIG. 19 illustrates a subscribe to emergency messages request.

Referring to FIG. 19, the subscribe to emergency messages 650 from the CD 130 to the PD 120 may make the request for subscription to emergency messages when the CD 130 joins the network or when an emergency message application is started on the CD 130 or at any other time desired by the CD. The input parameters may include subscription callback URL information 1300 that identifies how the PD 120 can send an EAM to the CD 130. The input parameters may include EAMs filtering 1310 that identifies criteria to determine when to send a message to the CD 130. For example, one suitable filtering criteria may be the geo-location of the CD 130. In some cases, it may be desirable to receive emergency messages for other geographic locations such as for emergency messages for a user's beach house located in a distant location, or such as emergency messages for a user's current location. For example, one suitable filtering criteria may be a time-of-day, a day-of-week, a month-of-year, a season-of-year, an age of the user, and/or a holiday based criteria. In some cases, it may be desirable to only receive messages during certain defined temporal time periods. For example, one suitable filtering criteria may be the particular viewer using the CD. For example, it may be undesirable to receive amber alert messages if the viewer is a minor. The input parameters may include CD identification 1320 which identifies the CD. For example, the CD identification preferably uses a string identification (e.g., preferably a unique string identification). The input parameters may include CD application identification 1330. For example, the CD application identification identifies the particular application, among a plurality of such applications if present, on the CD used for exchanging emergency messages. The input parameters may include CD application version 1340. For example, the CD application version more specifically identifies the attributes and/or capabilities of the particular application. The input parameters may include a requested subscription duration 1350. For example, the CD may request the subscription to last for 3000 seconds, 4000 seconds, or another suitable duration. In this manner the duration for such emergency messages will not be indefinite and controllable, at least to the extent the requested duration is honored by the PD, by the CD. In some example a special value may be assigned to indicate a request for "infinite" duration subscription. For example a value of "−1" as requested subscription duration may indicate desire to receive EAMs indefinitely (e.g., forever, for infinite time, and/or always). A security token or identifier 1360 may be included in input parameters. The security token may have been obtained by the CD by some external means and may help to identify the CD. For example it may establish authentication of security device as a trusted device. Additional or fewer input parameters may be used, as desired.

In one example various elements that may be carried in subscription request for emergency messages from CD to PD and their description may be as shown in the Table: "Elements of the subscription to emergency messages" below.

TABLE

Elements of the subscription to emergency messages

| Element Name | Description |
|---|---|
| SubscriptionCallbackURL | URL location to send EAMs. |
| SubscriptionDuration | Requested duration in number of milliseconds (or seconds) until the subscription expires. A special value of −1 indicates "Infinite" duration. |
| geo-loc | Geographical location for which the EAMs are requested. |
| CDDevID | Device identifier for CD |
| CDAppID | Application identifier for CD |
| CDAppVersion | Version for CD |

In one example, the subscription to emergency messages 650 may be achieved using a JavaScript Object Notation (JSON) to carry the subscription request message from the CD 130 to the PD 120 to potentially receive EAMs.

In one example the JSON schema for the CD subscribe to emergency messages 650 may be as follows:

```
{
"id": "http://atsc.org/version/3.0/cd/sub_req_cd2pd#",
"$schema": "http://json-schema.org/draft-04/schema#",
"title": "ATSC Subscription Request from CD to PD",
    "description": "Subscription Request from CD to PD Schema as
defined in ATSC    3.0 (c) 2014 atsc.org - All rights reserved.",
"type": "object",
"properties": {
"required": ["SubscriptionRequestfromCDtoPD"],
"SubscriptionRequestfromCDtoPD": {
    "type": "object",
    "properties": {
        "SubscriptionCallbackURL": {
            "type": "string",
            "format": "uri"
        },
        "SubscriptionDuration": {
            "type": "number"
        },
        "geo-loc": {
            "type": "string"
        },
        "CDInfo": {
            "type": "object",
            "properties": {
                "CDDevID": {
                    "type": "string"
                },
                "CDAppID": {
                    "type": "string"
                },
                "CDAppVersion":{
                    "type": "number"
                }
            }
        }
    },
    "required": ["SubscriptionCallbackURL","SubscriptionDuration"],
    "additionalProperties": false },
    "maxProperties": 1
}
}
```

An exemplary format for the above JSON payload may be as follows:

```
{
"SubscriptionRequestfromCDtoPD": {
    "SubscriptionCallbackURL": "http://192.168.0.100/CD/CB01",
    "SubscriptionDuration": 3600,
    "Geo-loc": "90210",
    "CDInfo": {
        "CDDevID": "CDDevId01",
        "CDAppID": "ID01",
        "CDAppVersion": 0.9
    }
  }
}
```

In another example, a eXtensible Markup Language (XML) format may be used to carry the subscription request message from the CD to the PD to receive EAMs. The XML schema for the CD subscription request to the PD to receive EAMs may be as follows:

```
<?xml version="1.0" encoding="UTF-8"?>
<!-- Subscription request from CD to PD-->
<xs:schema xmlns:xs="http://www.w3.org/2001/XMLSchema" >
    <xs:element name="SubscriptionRequestfromCDtoPD"
type="SubscriptionRequestType" />
    <xs:complexType name="SubscriptionRequestType">
        <xs:all>
            <xs:element name="SubscriptionCallbackURL"
type="xs:anyURI" minOccurs="1"/>
            <xs:element name="SubscriptionDuration"
type="xs:float" minOccurs="1"/>
        <xs:element name="Geo-loc" type="xs:string" minOccurs="0"
maxOccurs="1"/>
            <xs:element name="CDInfo" type="CDInfoType"
minOccurs="0" maxOccurs="1"/>
        </xs:all>
    </xs:complexType>
    <xs:complexType name="CDInfoType">
        <xs:all>
            <xs:element name="CDDevID" type="xs:string"
minOccurs="0" maxOccurs="1"/>
            <xs:element name="CDAppID" type="xs:string"
minOccurs="0" maxOccurs="1"/>
            <xs:element name="CDAppVersion" type="xs:float"
minOccurs="0" maxOccurs="1"/>
        </xs:all>
    </xs:complexType>
</xs:schema>
```

In another example, the geo-location may be represented as "zip" code field which may be included in the JSON schema as follows:

```
"Zip": {
        "type": "number"
    },
```

In yet another example, the geo-location may be represented in the JSON schema as follows:

```
{
    "description": "A geographical location coordinate",
    "type": "object",
    "properties": {
        "latitude": { "type": "number" },
        "longitude": { "type": "number" }
    }
}
```

In one example, the geo-location information may be expressed in XML format conforming to the XML schema with the XML element 'Geo-loc' conforming to the following schema:

```
<xs:element name='Geo-loc'>
    <xs:complexType>
        <xs:sequence minOccurs='0'>
            <xs:element name='accuracy' minOccurs='0' type='xs:decimal'/>
            <xs:element name='alt' minOccurs='0' type='xs:decimal'/>
            <xs:element name='area' minOccurs='0' type='xs:string'/>
            <xs:element name='bearing' minOccurs='0' type='xs:decimal'/>
            <xs:element name='building' minOccurs='0' type='xs:string'/>
            <xs:element name='country' minOccurs='0' type='xs:string'/>
            <xs:element name='countrycode' minOccurs='0' type='xs:string'/>
            <xs:element name='datum' minOccurs='0' type='xs:string'/>
            <xs:element name='description' minOccurs='0' type='xs:string'/>
            <xs:element name='error' minOccurs='0' type='xs:decimal'/>
            <xs:element name='floor' minOccurs='0' type='xs:string'/>
            <xs:element name='lat' minOccurs='0' type='xs:decimal'/>
            <xs:element name='locality' minOccurs='0' type='xs:string'/>
            <xs:element name='lon' minOccurs='0' type='xs:decimal'/>
            <xs:element name='postalcode' minOccurs='0' type='xs:string'/>
            <xs:element name='region' minOccurs='0' type='xs:string'/>
            <xs:element name='room' minOccurs='0' type='xs:string'/>
            <xs:element name='speed' minOccurs='0' type='xs:decimal'/>
            <xs:element name='street' minOccurs='0' type='xs:string'/>
            <xs:element name='text' minOccurs='0' type='xs:string'/>
                <xs:element name='timestamp' minOccurs='0' type='xs:dateTime'/>
                <xs:element name='tzo' minOccurs='0' type='xs:string'/>
                <xs:element name='uri' minOccurs='0' type='xs:anyURI'/>
        </xs:sequence>
        <xs:attribute ref='xml:lang' use='optional'/>
    </xs:complexType>
</xs:element>
```

The semantic definition of above elements may be as defined in XEP-0080: user location which defines an Extensible Messaging and Presence Protocol (XMPP) protocol extension for communicating information about the current geographical or physical location of an entity as defined at http://www.xmpp.org/extensions/xep-0080.html which is incorporated here by reference.

In one example, a REST mechanism may be used for the CD subscription request to the PD to receive EAMs.

In one example, this may be done by sending a request to a defined end-point on the PD from the CD.

In one example, a HTTP GET request may be sent from the CD to the PD as follows:
   http://192.168.0.200/PD/EAM/
      subReq_CD2PD?SubseriptionCallbackURL=
      http%3A%2F%2F192.168.0.100%2FCD%2FCB01&
      SubscriptionDuration=3600
which can also be represented as

```
GET
/PD/EAM/subReq_CD2PD?SubscriptionCallbackURL=
http%3A%2F%2F192.168.0.100%2FCD%2FCB01&Subscription-
Duration=3600 HTTP/1.1
   host: http://192.168.0.200
```

In the aforementioned http:// request 192.168.0.200 references the PD by its IP address, EAM references the end point, subReq_CD2PD references the type of subrequest, SubscriptionCallbackURL=http%3A%2F%2F192.168.0.100%2FCD%2FCB01 references query parameters, and SubscriptionDuration=3600 references the subscription duration. Also 192.168.0.100 references CD by its IP address. Other request structures may be used, as desired.

In the aforementioned GET request, the PD references the PD, EAM references the end point, subReq_CD2PD references the type of sub-request, SubscriptionCallbackURL=http%3A%2F%2F192.168.0.100%2FCD%2FCB01 references query parameters, SubscriptionDuration=3600 references the subscription duration, and HTTP/1.1 host: http://192.168.0.200 references the PD by its IP address.

As illustrated, the value of SubscriptionCallbackURL may be a url encoded when putting it in the HTTP GET query parameters.

In another example, a HTTP POST request may be sent from the CD to the PD as follows:
   POST/PD/EAM/subReq_CD2PD HTTP/1.1
   host: http://192.168.0.200
   content-type:application/x-www-form-urlencoded;
      charset=utf-8
   content-length: <content length of request>
   SubscriptionCallbackURL=
      http%3A%2F%2F192.168.0.
      100%2FCD%2FCB01&SubscriptionDuration=3600

The SubscriptionCallbackURL and Subscription duration may be url encoded when putting it in the HTTP POST query parameters.

Figure 20:
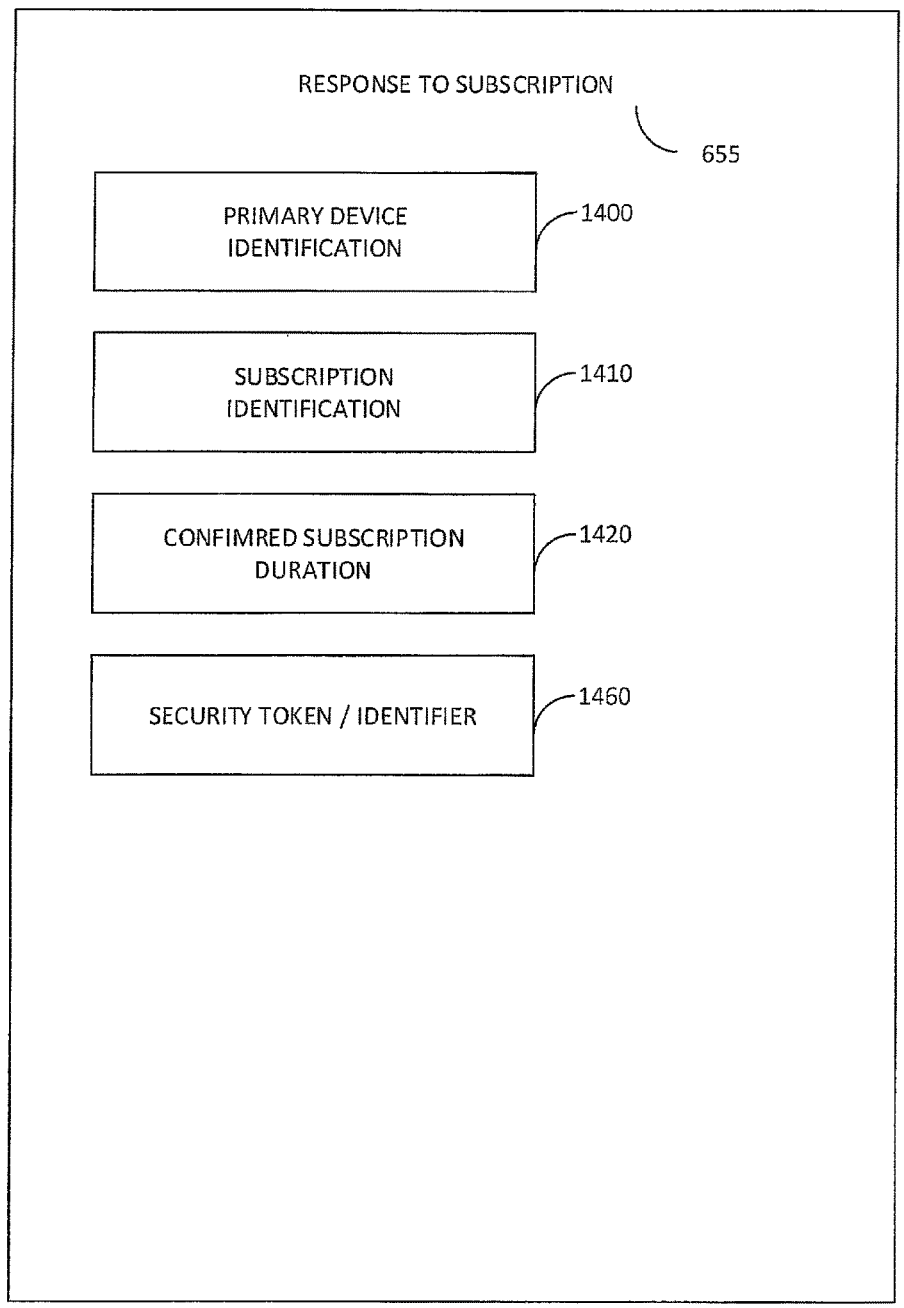
FIG. 20 illustrates a response to subscription.

Referring to FIG. 20, the response to subscription 655 from the PD 120 to the CD 130 is preferably sent upon receiving the subscription information. The response may be based upon the subscription callback URL information 1300 to provide the message. In addition, the response may be based upon the particular CD identification 1320, the CD application identification 1330, the CD application version 1340, security token or identifier 1360, and/or requested subscription duration 1350. The output parameters may include a PD identification 1400 which identifies the PD. For example, the PD identification preferably uses a string identification. In this manner, the CD may distinguish between a plurality of different PDs to which it is, or may be, connected to. In some cases the PD ID may include a user friendly name such as "John's Television". In some case this friendly name may be a separate parameter "primary device name" different than the PD identification 1400. The output parameters may include a subscription identification 1410 which identifies a particular subscription to services between the particular PD and the particular CD. For example, the subscription identification may be a unique identification to that particular session so that subsequent messages and communications may be tailored for the particular CD. Moreover, the subscription identification 1410 may be used to distinguish among a plurality of PD EAMs applications and/or among a plurality of CD EAMs applications. The subscription identification 1410 may be used to uniquely identify this subscription from CD to the PD for subsequent message exchanges between those two devices. The output parameters may include a confirmed subscription duration 1420 indicating the duration of the subscription. For example, the subscription duration may confirm the duration requested in the subscribe to emergency messages 650 e.g. in parameter requested subscription duration 1350. For example, the subscription duration may confirm a different duration to that requested in the subscribe to emergency messages 650. The different confirmed subscription duration 1420 may be smaller than or equal to the requested subscription duration 1350. For example, the subscription duration may confirm a duration of 0 seconds, which indicates that the requested subscription is unavailable to the particular CD, to that requested in the subscribe to emergency messages 650. In this manner, the subscription will have a limited time duration and thus not be indefinite in duration which provides an improved user experience. A security token or identifier 1460 may be included in output parameters. For example it may establish authentication of security device as a trusted device. The security token or identifier 1460 may be same as security token or identifier 1360. In other examples the security token or identifier 1460 may be different than the security token or identifier 1360.

In one example various elements that may be carried in response to subscription request from PD to CD and their description may be as shown in the Table: "Response to subscription request" below.

TABLE

Response to subscription request

| Element Name | Description |
| --- | --- |
| SubscriptionID | The subscription identifier for this EAM subscription. SubscriptionID may be used to uniquely identify this subscription from CD to the PD. |
| SubscriptionTimeoutDuration | Actual duration in number of milliseconds (or seconds) until the subscription expires. A special value of −1 indicates "Infinite" duration. |
| PDDevID | Device identifier for PD |
| PDVersion | Version of the PD |

In one example, JSON may be used to carry the subscription response for EAMs from the PD to the CD. For example, the JSON schema for the PD subscription response to CD may be as follows:

```
{
    "id": "http://atsc.org/version/3.0/cd/sub_resp_pd2cd#",
    "$schema": "http://json-schema.org/draft-04/schema#",
    "title": "ATSC Subscription Response from PD to CD",
    "description": "Subscription Response from PD to CD
Schema as defined in ATSC 3.0 (c) 2014 atsc.org - All rights reserved.",
    "type": "object",
    "properties": {
    "required": ["SubscriptionResponsefromPDtoCD"],
    "SubscriptionResponsefromPDtoCD": {
        "type": "object",
        "properties": {
```

-continued

```
            "SubscriptionID": {
                "type": "string"
            },
            "SubscriptionTimeoutDuration": {
                "type": "number"
            },
            "PDInfo": {
                "type": "object",
                "properties": {
                    "PDDevID": {
                        "type": "string"
                    },
                    "PDVersion":{
                        "type": "number"
                    }
                }
            }
        },
        "required": ["SubscriptionID",-
"SubscriptionTimeoutDuration"],
        "additionalProperties": false },
        "maxProperties": 1
    }
}
```

In one example, the format of this JSON payload may be as follows:

```
{
    "SubscriptionResponsefromPDtoCD": {
            "SubscriptionID": "C034587",
            "SubscriptionTimeoutDuration": 3600,
        "PDInfo": {
            "PDDevID": "PDDevId01",
                                    "PDVersion": 1.0
        }
    }
}
```

In one example, the XML format may be used to carry the subscription response for EAMs from the PD to the CD. For example, the XML schema for the PD subscription response to the CD may be as follows:

```
<?xml version="1.0" encoding="UTF-8"?>
<!-- Subscription response from PD to CD-->
<xs:schema xmlns:xs="http://www.w3.org/2001/XMLSchema" >
    <xs:element name="SubscriptionResponsefromCDtoPD"
type="SubscriptionResponseType" />
        <xs:complexType name="SubscriptionResponseType">
            <xs:all>
                <xs:element name="SubscriptionID" type="xs:anyURI"
minOccurs="1"/>
                <xs:element name="SubscriptionTimeoutDuration"
type="xs:float" minOccurs="1"/>
                <xs:element name="PDInfo" type="PDInfoType"
minOccurs="0" maxOccurs="1"/>
            </xs:all>
        </xs:complexType>
        <xs:complexType name="PDInfoType">
            <xs:all>
                <xs:element name="PDDevID" type="xs:string"
minOccurs="0" maxOccurs="1"/>
                <xs:element name="PDAppID" type="xs:string"
minOccurs="0" maxOccurs="1"/>
                <xs:element name="PDVersion" type="xs:float"
minOccurs="0" maxOccurs="1"/>
            </xs:all>
        </xs:complexType>
</xs:schema>
```

In one example, the REST mechanism may be used for the PD subscription response to the CD. This may be done in response to HTTP GET or HTTP POST REST request from the CD to the PD for subscription.

In one example, this may be done by sending a HTTP response to the CD. For example, a HTTP response may be sent from the PD to the CD as follows:

```
HTTP/1.1 200 OK
content-type:application/json
content-length: <content length of response>
{
        "SubscriptionID": "C034587",
        "SubscriptionTimeoutDuration": 3600,
    "PDInfo": {
        "PDDevID": "PDDevId01",
              "PDVersion": 1.0
        }
}
```

In this example, the HTTP response body may include JSON data which conforms to the JSON schema. In another example instead of JSON, JSON with padding (JSONP) data may be used. In another case the HTTP response body may send the same data in another format such as XML, CSV, BNF, or ABNF, Extended Backus-Naur Form (ENBF), or any other suitable format. For example, if XML format is used in the HTTP response body then the content may conform to the XML schema for the response.

Figure 21:
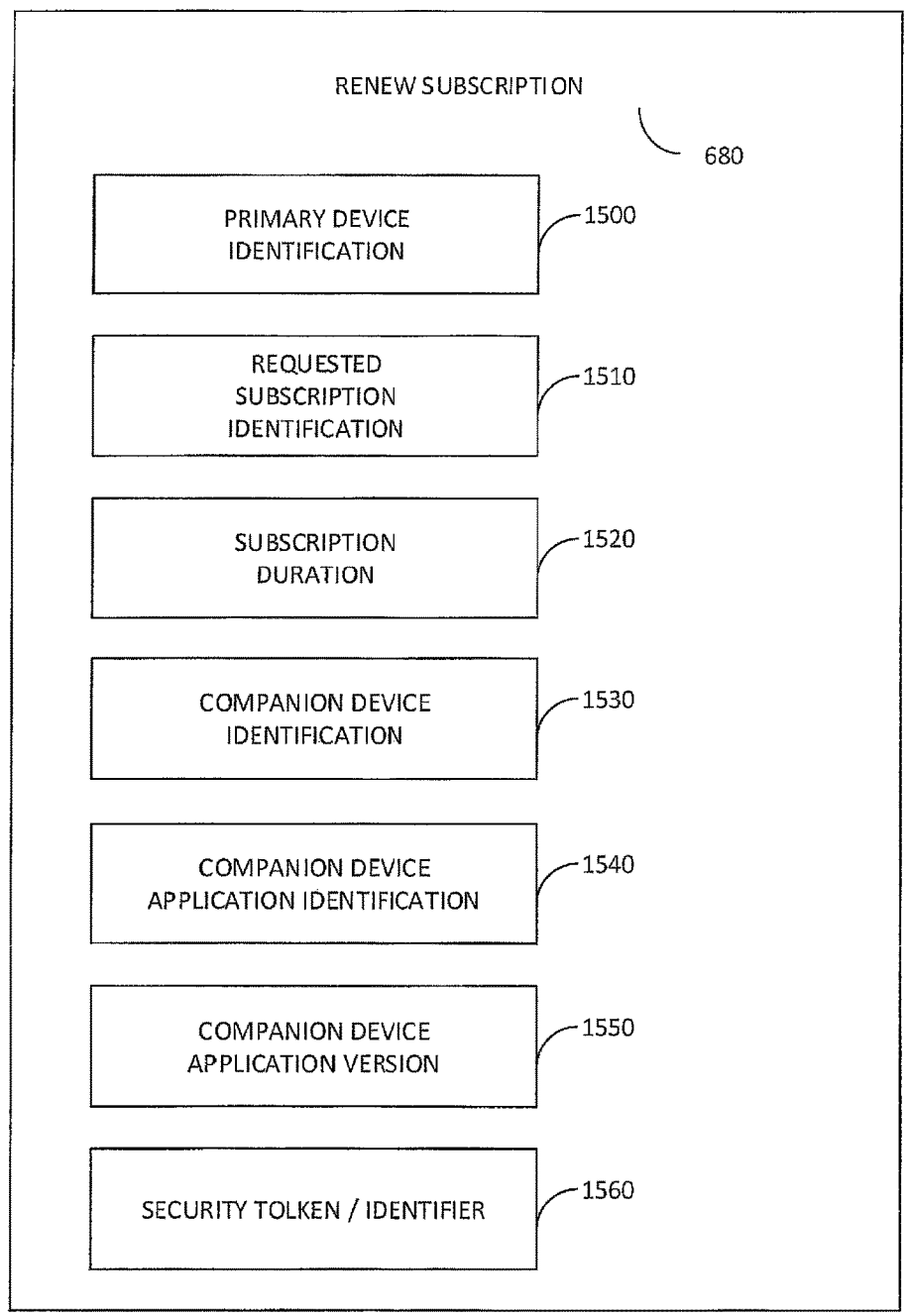
FIG. 21 illustrates a renew subscription.

Referring to FIG. 21, the renew subscription 680 from the CD 130 to the PD 120 is preferably sent any time at or before the current subscription times out to renew the current subscription or otherwise after the current subscription times out to renew the previous subscription. In some cases, the renew subscription 680 from the CD 130 to the PD 120 is sent out for a particular subscription among a plurality of current subscriptions for the CD, such that some of the current subscriptions of the CD 130 may be permitted to be terminated while renewing one or more other subscriptions. In this manner, only a selected set of subscriptions are renewed while other subscriptions are not renewed, thus alleviating the need to expressly cancel the other subscriptions. In some cases, the renew subscription 680 from the CD 130 to the PD 120 may be for all subscriptions of a plurality of current subscriptions of the CD. In this manner, all of the current subscriptions may be effectively renewed with a reduced amount of data communications and without the need to expressly identify all the current subscriptions.

The renew subscription 680 may be based upon the PD identification 1500 which identifies the PD. For example, the PD identification preferably uses a string identification. In this manner, the CD may distinguish between a plurality of different PDs to which it is, or may be, connected to. The input parameters may include the subscription identification 1510 which identifies a particular subscription to services between the particular PD and the particular CD. For example, the subscription identification may be a unique identification to that particular session so that subsequent messages and communications may be tailored for the particular CD. Moreover, the subscription identification 1510 may be used to distinguish among a plurality of PD EAMs applications and/or among a plurality of CD EAMs applications. In the case that the subscription identification 1510 for the renew subscription 680 is received by the PD 120 prior to the termination of the current subscription, the existing subscription may be extended. In the case that the subscription identification 1510 for the renew subscription 680 is received by the PD 120 after the termination of the current subscription, the PD 120 may use its past history to determine the characteristics of the previous subscription, and provide a new subscription based upon the previous subscription. In some cases the subscription identification 1510 may be the same as subscription identification 1410. The input parameters may include a requested subscription duration 1520. indicating the duration of the renew subscription. For example, the CD may request the renew subscription to last for 3000 seconds, 4000 seconds, or another suitable duration. In this manner the duration for such emergency messages will not be indefinite and controllable, at least to the extent the requested duration is honored by the PD, by the CD. The input parameters may include CD identification 1530 which identifies the CD. For example, the CD identification preferably uses a string identification. The input parameters may include CD application identification 1540. For example, the CD application identification identifies the application, and among a plurality of such applications if present, on the CD used for exchanging emergency messages. The input parameters may include CD application version 1550. For example, the CD application version identifies the attributes and/or capabilities of the particular application. In some examples, no callback information is necessary, since this information is already available to the PD because it may be linked with the subscription information. A security token or identifier 1560 may be included in input parameters. The security token or identifier may have been obtained by the CD by some external means and may help to identify the CD. For example it may establish authentication of security device as a trusted device. The security token or identifier 1560 may be same as security token or identifier 1360. In other examples the security token or identifier 1560 may be different than the security token or identifier 1360.

In one example various elements that may be carried in renew subscription from CD to PD and their description may be as shown in the Table: "Elements of the renew subscription" below.

TABLE

Elements of the renew subscription

| Element Name | Description |
| --- | --- |
| SubscriptionID | The subscription identifier for this EAM subscription. SubscriptionID may be used to uniquely identify this subscription from CD to the PD. |
| SubscriptionDuration | Requested duration in number of milliseconds (or seconds) until the renewed subscription expires. A special value of −1 indicates "Infinite" duration. |
| CDDevID | Device identifier for CD |
| CDAppID | Application identifier of the CD |
| CDAppVersion | Version of the CD |

In one example JSON may be used to carry the subscription renewal request message from the CD to the PD to continue receiving EAMs. The JSON schema for the CD subscription renew request to the PD to continue and renew receiving EAMs may be as follows:

```
{
    "id": "http://atsc.org/version/3.0/cd/
    sub_renew_req_cd2pd#",
    "$schema": "http://json-schema.org/draft-04/schema#",
    "title": "ATSC Subscription Renew Request from CD to PD",
    "description": "Subscription Renew Request from CD to
```

PD Schema as defined in ATSC 3.0 (c) 2014 atsc.org - All rights reserved.",
            "type": "object",
            "properties": {
            "required": ["SubscriptionRenewRequestfromCDtoPD"],
            "SubscriptionRenewRequestfromCDtoPD": {
                "type": "object",
                "properties": {
                    "SubscriptionID": {
                        "type": "string"
                    },
                    "SubscriptionDuration": {
                        "type": "number"
                    },
                    "CDInfo": {
                        "type": "object",
                        "properties": {
                            "CDDevID": {
                                "type": "string"
                            },
                            "CDAppID": {
                                "type": "string"
                            },
                            "CDAppVersion":{
                                "type": "number"
                            }
                        }
                    }
                },
                "required": ["SubscriptionID","SubscriptionDuration"],
                "additionalProperties": false },
                "maxProperties": 1
            }
        }

In one example, the format of this JSON payload may be as follows:

```
{
    "SubscriptionRenewRequestfromCDtoPD": {
            "SubscriptionID": "C034587",
            "SubscriptionDuration": 7200,
        "CDInfo": {
            "CDDevID": "CDDevId01",
                    "CDAppID": "ID01",
                            "CDAppVersion": 0.9
        }
    }
}
```

In one example, the XML format may be used to carry the subscription renewal request message from the CD to the PD to continue or renew receiving EAMs. The XML schema for the CD subscription renew request to the PD to continue or renew receiving EAMs may be as follows:

```
<?xml version="1.0" encoding="UTF-8"?>
<!-- Subscription renew request from CD to PD-->
<xs:schema xmlns:xs="http://www.w3.org/2001/XMLSchema" >
    <xs:element name="SubscriptionRenewRequestfromCDtoPD" type="SubscriptionRenewRequestType" />
        <xs:complexType name="SubscriptionRenewRequestType">
            <xs:all>
                <xs:element name="SubscriptionID" type="xs:string" minOccurs="1"/>
                <xs:element name="SubscriptionDuration" type="xs:float" minOccurs="1"/>
                <xs:element name="CDInfo" type="CDInfoType" minOccurs="0" maxOccurs="1"/>
            </xs:all>
        </xs:complexType>
    <xs:complexType name="CDInfoType">
        <xs:all>
            <xs:element name="CDDevID" type="xs:string" minOccurs="0" maxOccurs="1"/>
            <xs:element name="CDAppID" type="xs:string" minOccurs="0" maxOccurs="1"/>
            <xs:element name="CDAppVersion" type="xs:float" minOccurs="0" maxOccurs="1"/>
        </xs:all>
    </xs:complexType>
</xs:schema>
```

In another example, the JSON schema for the CD subscription renew request to the PD to continue to receive EAMs may be defined as follows:

```
{
    "id": "http://atsc.org/version/3.0/cd/sub_renew_req_cd2pd#",
    "$schema": "http://json-schema.org/draft-04/schema#",
    "title": "ATSC Subscription Renew Request from CD to PD",
    "description": "Subscription Renew Request from CD to PD Schema as defined in ATSC 3.0 (c) 2014 atsc.org - All rights reserved.",
        "type": "object",
        "properties": {
        "required": ["SubscriptionRenewRequestfromCDtoPDVariant"],
        "SubscriptionRenewRequestfromCDtoPDVariant": {
            "type": "object",
            "properties": {
                "SubscriptionID": {
                    "type": "string"
                },
                "SubscriptionCallbackURL": {
                    "type": "string",
                    "format": "uri"
                },
                "SubscriptionDuration": {
                    "type": "number"
                },
                "CDInfo": {
                    "type": "object",
                    "properties": {
                        "CDDevID": {
                            "type": "string"
                        },
                        "CDAppID": {
                            "type": "string"
                        },
                        "CDAppVersion":{
                            "type": "number"
                        }
                    }
                }
            },
            "required": ["SubscriptionID","SubscriptionDuration"],
            "additionalProperties": false },
            "maxProperties": 1
        }
}
```

In another example, the format of this renewal request JSON payload may be as follows:

```
{
    "SubscriptionRenewRequestfromCDtoPDVariant": {
            "SubscriptionID": "C034587",
            "SubscriptionCallbackURL":
            "http://192.168.0.100/CD/CB01",
            "SubscriptionDuration": 7200,
```

-continued

```
    "CDInfo": {
        "CDDevID": "CDDevId01",
        "CDAppID": "ID01",
                "CDAppVersion": 0.9
        }
    }
}
```

In another example, the XML schema for the CD subscription renew request to the PD to continue to receive EAMs may be defined as follows:

```
<?xml version="1.0" encocling="UTF-8"?>
<!-- Subscription renew request from CD to PD-->
<xs:schema xmlns:xs="http://www.w3.org/2001/XMLSchema" >
    <xs:element name="SubscriptionRenewRequestfromCDtoPD"
type="SubscriptionRenewRequestType" />
        <xs:complexType name="SubscriptionRenewRequestType">
            <xs:all>
                <xs:element name="SubscriptionID" type="xs:string"
minOccurs="1"/>
                <xs:element name="SubscriptionCallbackURL"
type="xs:anyURI" minOccurs="1"/>
                <xs:element name="SubscriptionDuration" type="xs:float"
minOccurs="1"/>
                <xs:element name="CDInfo" type="CDInfoType"
minOccurs="0" maxOccurs="1"/>
            </xs:all>
        </xs:complexType>
        <xs:complexType name="CDInfoType">
            <xs:all>
                <xs:element name="CDDevID" type="xs:string"
minOccurs="0" maxOccurs="1"/>
                <xs:element name="CDAppID" type="xs:string"
minOccurs="0" maxOccurs="1"/>
                <xs:element name="CDAppVersion" type="xs:float"
minOccurs="0" maxOccurs="1"/>
            </xs:all>
        </xs:complexType>
</xs:schema>
```

In one example, the REST mechanism may be used for the CD subscription renew request to the PD to continue to receive EAMs.

In one example, this may be done by sending a request to a defined end-point on the PD from the CD.

In one example, a HTTP GET request may be sent from the CD to the PD as follows:
http://192.168.0.200/PD/EA_M/
sub_renew_req_CD2PD?SubscriptionID=
C034587&SubscriptionDuration=7200
which can also be represented as

```
        GET
    /PD/EAM/sub_renew_req_CD2PD?SubscriptionID=C034587&-
    SubscriptionDuration=7200
        HTTP/1.1
        host: http://192.168.0.200
```

Figure 22:
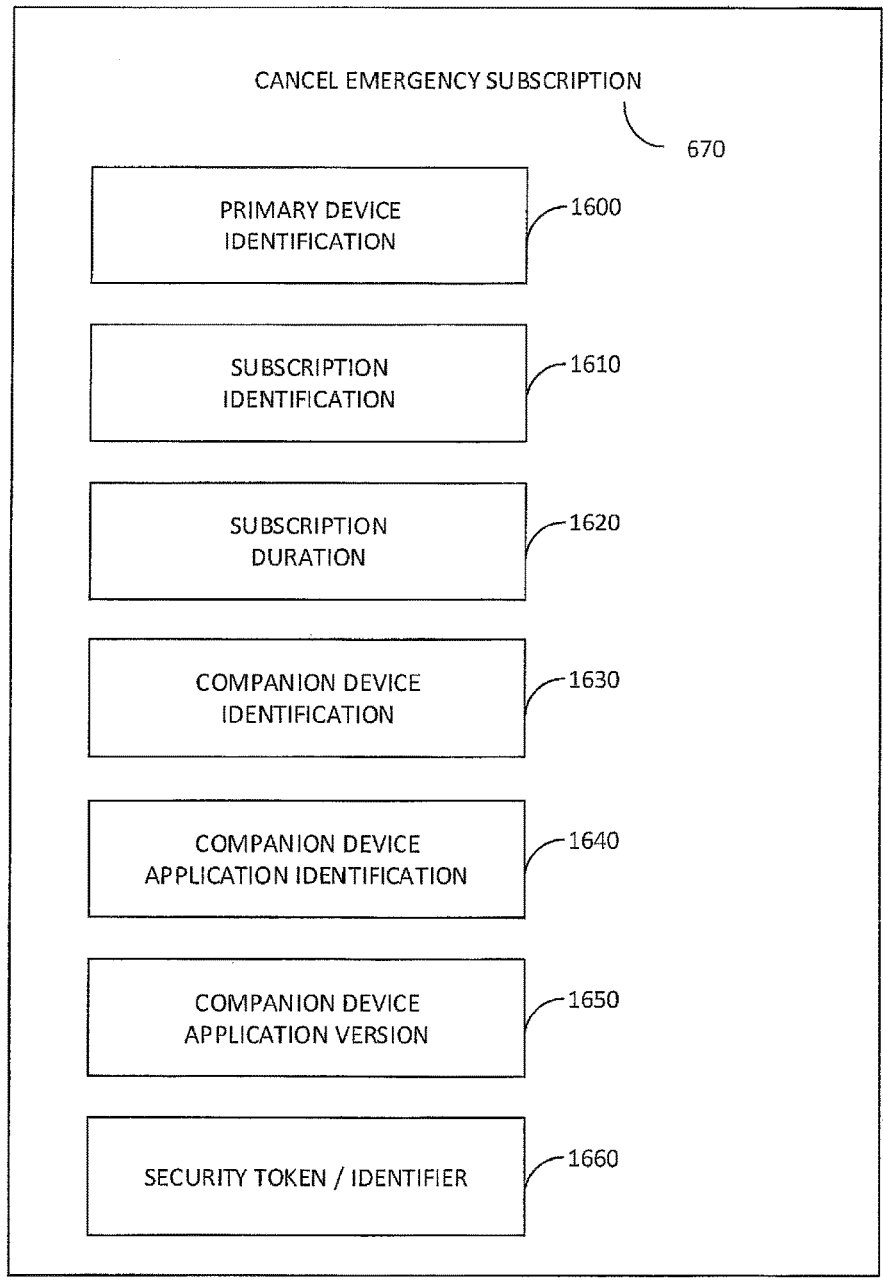
FIG. 22 illustrates a cancel emergency subscription.

In another example, a HTTP POST request may be sent from the CD to the PD as follows:
POST/PD/EAM/sub_renew_req_CD2PD HTTP/1.1
host: http://192.168.0.200
content-type:application/x-www-form-urlencoded;
charset=utf-8
content-length: <content length of request>
SubscriptionID=C034587&SubscriptionDuration=7200
Referring to FIG. 22, the cancel emergency subscription 670 from the CD 130 to the PD 120 is preferably sent any time before the current subscription times out to renew the current subscription or otherwise after the current subscription times out to renew the previous subscription to confirm the subscription is canceled or at any time in general. In some cases, the cancel emergency subscription 670 from the CD 130 to the PD 120 is sent out for a particular subscription among a plurality of current subscriptions for the CD, such that some of the current subscriptions of the CD 130 may be permitted to be terminated while maintaining one or more other subscriptions. In this manner, only a selected set of subscriptions are maintained while other subscriptions are canceled, thus alleviating the need to expressly maintain the other subscriptions. This is preferable to alternatively canceling all the subscriptions and then subscribing to the desirable subscriptions, thereby effecting the canceling of the undesired subscription(s). In some cases, the cancel emergency subscription 670 from the CD 130 to the PD 120 may be for all subscriptions of a plurality of current subscriptions of the CD. In this manner, all of the current subscriptions may be effectively canceled with a reduced amount of data communications and without the need to expressly identify all the current subscriptions.

The cancel emergency subscription 670 may be based upon the PD identification 1600 which identifies the PD. For example, the PD identification preferably uses a string identification. In this manner, the CD may distinguish between a plurality of different PDs to which it is, or may be, connected to. The input parameters may include the subscription identification 1610 which identifies a particular subscription to services between the particular PD and the particular CD. For example, the subscription identification may be a unique identification to that particular session so that subsequent messages and communications may be tailored for the particular CD, such as not sending additional EAMs. Moreover, the subscription identification 1610 may be used to distinguish among a plurality of PD EAMs applications and/or among a plurality of CD EAMs applications. In the case that the subscription identification 1610 for the cancel emergency subscription 670 is received by the PD 120 prior to the termination of the current subscription, the existing subscription may be terminated. In the case that the subscription identification 1610 for the cancel emergency subscription 670 is received by the PD 120 after the termination of the current subscription, the PD 120 may use its past history to ensure that the subscription is terminated. The input parameters may include a subscription duration 1620 indicating the duration of the canceled subscription for purposes of confirmation, if desired. The input parameters may include CD identification 1630 which identifies the CD. For example, the CD identification preferably uses a string identification. The input parameters may include CD application identification 1640. For example, the CD application identification identifies the application, and among a plurality of such applications if present, on the CD used for exchanging emergency messages. The input parameters may include CD application version 1650. For example, the CD application version identifies the attributes and/or capabilities of the particular application. In some examples, no callback information is necessary, since this information is already available to the PD because it may be liked with the subscription information. A security token or identifier 1660 may be included in input parameters. The security token or identifier may have been obtained by the CD by some external means and may help to identify the CD. For example it may establish authentication of security device as a trusted device. The security token or identifier 1660 may be same as security token or identifier 1360. In other examples the security token or identifier 1660 may be different than the security token or identifier 1360.

In one example various elements that may be carried in cancel emergency message subscription from CD to PD and their description may be as shown in the Table: "Elements of cancel emergency message subscription" below.

TABLE

Elements of cancel emergency message subscription

| Element Name | Description |
| --- | --- |
| SubscriptionID | The subscription identifier for this EAM subscription. SubscriptionID may be used to uniquely identify this subscription from CD to the PD. |
| CDDevID | Device identifier for CD |
| CDAppID | Application identifier of the CD |
| CDAppVersion | Version of the CD |

In one example, JSON may be used to carry the subscription cancel request message from the CD to the PD to discontinue receiving EAMs. The JSON schema for the CD subscription cancel request to the PD to discontinue to receive EAMs may be defined as follows:

```
{
    "id": "http://atsc.org/version/3.0/cd/
        sub_cancel_req_cd2pd#",
    "$schema": "http://json-schema.org/draft-04/schema#",
    "title": "ATSC Subscription Cancel Request from CD to
        PD",
    "description": "Subscription Cancel Request from CD to
PD Schema as defined in ATSC 3.0 (c) 2014 atsc.org - All rights
reserved.",
    "type": "object",
    "properties": {
    "required": ["SubscriptionCancelRequestfromCDtoPD"],
    "SubscriptionCancelRequestfromCDtoPD": {
        "type": "object",
        "properties": {
            "SubscriptionID": {
                "type": "string"
            },
            "CDInfo": {
                "type": "object",
                "properties": {
                    "CDDevID": {
                        "type": "string"
                    },
                    "CDAppID": {
                        "type": "string"
                    },
                    "CDAppVersion":{
                        "type": "number"
                    }
                }
            }
        },
        "required": ["SubscriptionID"],
        "additionalProperties": false },
        "maxProperties": 1
    }
}
```

In one example, the format of this JSON payload may be as follows:

```
{
    "SubscriptionCancelRequestfromCDtoPD": {
        "SubscriptionID": "C034587",
        "CDInfo": {
            "CDDevID": "CDDevId01",
            "CDAppID": "ID01",
            "CDAppVersion": 0.9
        }
    }
}
```

In one example, the XML format may be used to carry the subscription cancel request message from the CD to the PD to discontinue receiving EAMs. The XML schema for the CD subscription cancel request to the PD to discontinue to receive EAMs may be defined as follows:

```
<?xml version="1.0" encoding="UTF-8"?>
<!-- Subscription cancel request from CD to PD-->
<xs:schema xmlns:xs="http://www.w3.org/2001/XMLSchema" >
    <xs:element name="SubscriptionCancelRequestfromCDtoPD"
type="SubscriptionCancelRequestType" />
    <xs:complexType name="SubscriptionCancelRequestType">
        <xs:all>
            <xs:element name="SubscriptionID" type="xs:string"
                minOccurs="1"/>
            <xs:element name="CDInfo" type="CDInfoType"
minOccurs="0" maxOccurs="1"/>
        </xs:all>
    </xs:complexType>
    <xs:complexType name="CDInfoType">
        <xs:all>
            <xs:element name="CDDevID" type="xs:string"
minOccurs="0" maxOccurs="1"/>
            <xs:element name="CDAppID" type="xs:string"
minOccurs="0" maxOccurs="1"/>
            <xs:element name="CDAppVersion" type="xs:float"
minOccurs="0" maxOccurs="1"/>
        </xs:all>
    </xs:complexType>
</xs:schema>
```

In another example, the JSON schema for the CD subscription cancel request to the PD to discontinue to receive EAMs may be defined as follows:

```
{
    "id": "http://atsc.org/version/3.0/cd/sub_cancel_req_cd2pd#",
    "$schema": "http://json-schema.org/draft-04/schema#",
    "title": "ATSC Subscription Cancel Request from CD to PD",
    "description": "Subscription Cancel Request from CD to PD
Schema as defined in ATSC 3.0 (c) 2014 atsc.org - All rights reserved.",
    "type": "object",
    "properties": {
    "required": ["SubscriptionCancelRequestfromCDtoPD"],
    "SubscriptionCancelRequestfromCDtoPD": {
        "type": "object",
        "properties": {
         "SubscriptionID": {
           "type": "string"
         },
         "SubscriptionDuration": {
           "type": "number"
         },
         "CDInfo": {
           "type": "object",
           "properties": {
             "CDDevID": {
               "type": "string"
             },
             "CDAppID": {
               "type": "string"
             },
             "CDAppVersion":{
               "type": "number"
             }
           }
         }
        }
    },
```

```
        "required": ["SubscriptionID"],
        "additionalProperties": false },
      "maxProperties": 1
    }
  }
```

In another example, the format of this cancel request JSON payload may be as follows:

```
{
    "SubscriptionCancelRequestfromCDtoPDVariant": {
        "SubscriptionID": "C034587",
        "SubscriptionDuration": 0,
        "CDInfo": {
            "CDDevID": "CDDevId01",
            "CDAppID": "ID01",
            "CDAppVersion": 0.9
        }
    }
}
```

In another example, the XML schema for the CD subscription cancel request to the PD to discontinue to receive EAMs may be as follows:

```
<?xml version="1.0" encoding="UTF-8"?>
<!-- Subscription cancel request from CD to PD-->
<xs:schema xmlns:xs="http://www.w3.org/2001/XMLSchema" >
    <xs:element name="SubscriptionCancelRequestfromCDtoPD"
type="SubscriptionCancelRequestType" />
    <xs:complexType name="SubscriptionCancelRequestType">
        <xs:all>
            <xs:element name="SubscriptionID" type="xs:string"
                minOccurs="1"/>
            <xs:element name="SubscriptionDuration" type="xs:float"
minOccurs="1"/>
            <xs:element name="CDInfo" type="CDInfoType"
minOccurs="0" maxOccurs="1"/>
        </xs:all>
    </xs:complexType>
    <xs:complexType name="CDInfoType">
        <xs:all>
            <xs:element name="CDDevID" type="xs:string"
minOccurs="0" maxOccurs="1"/>
            <xs:element name="CDAppID" type="xs:string"
minOccurs="0" maxOccurs="1"/>
            <xs:element name="CDAppVersion" type="xs:float"
minOccurs="0" maxOccurs="1"/>
        </xs:all>
    </xs:complexType>
</xs:schema>
```

In yet another example, the JSON schema for the CD subscription cancel request to the PD to discontinue to receive EAMs may be defined as follows:

```
{
    "id": "http://atsc.org/version/3.0/cd/sub_cancel_req_cd2pd#",
    "$schema": "http://json-schema.org/draft-04/schema#",
    "title": "ATSC Subscription Cancel Request from CD to PD",
    "description": "Subscription Cancel Request from CD to PD
Schema as defined in ATSC 3.0 (c) 2014 atsc.org - All rights reserved.",
    "type": "object",
    "properties": {
        "required": ["SubscriptionCancelRequestfromCDtoPD"],
        "SubscriptionCancelRequestfromCDtoPD": {
            "type": "object",
            "properties": {
                "SubscriptionID": {
                    "type": "string"
                }
```

```
            }
        },
        "required": ["SubscriptionID"],
        "additionalProperties": false },
      "maxProperties": 1
    }
}
```

In another example, the format of this cancel request JSON payload may be as follows:

```
{
    "SubscriptionCancelRequestfromCDtoPDVariant": {
        "SubscriptionID": "C034587"
    }
}
```

In another example, the XML schema for the CD subscription cancel request to the PD to discontinue to receive EAMs may be defined as follows:

```
<?xml version="1.0" encoding="UTF-8"?>
<!-- Subscription cancel request from CD to PD-->
<xs:schema xmlns:xs="http://www.w3.org/2001/XMLSchema" >
    <xs:element name="SubscriptionCancelRequestfromCDtoPD"
type="SubscriptionCancelRequestType" />
    <xs:complexType name="SubscriptionCancelRequestType">
        <xs:all>
            <xs:element name="SubscriptionID" type="xs:string"
                minOccurs="1"/>
        </xs:all>
    </xs:complexType>
</xs:schema>
```

In one example, the REST mechanism may be used for the CD subscription cancel request to the PD to discontinue to receive EAMs. In one example this may be done by sending a request to a defined end-point on the PD from the CD.

In one example, a HTTP GET request may be sent from the CD to the PD as follows:
http://192.168.0.200/PD/EAM/
sub_cancel_req_CD2PD?SubscriptionID=C034587
which can also be represented as
GET/PD/EAM/
sub_renew_req_CD2PD?SubscriptionID=C034587
HTTP/1.1
host: http://192.168.0.200

In another example, a HTTP POST request may be sent from the CD to the PD as follows:
POST/PD/EAM/sub_cancel_req_CD2PD HTTP/1.1
host: http://192.168.0.200
content-type:application/x-www-form-urlencoded;
charset=utf-8
content-length: <content length of request>
SubscriptionID=C034587

Figure 23:
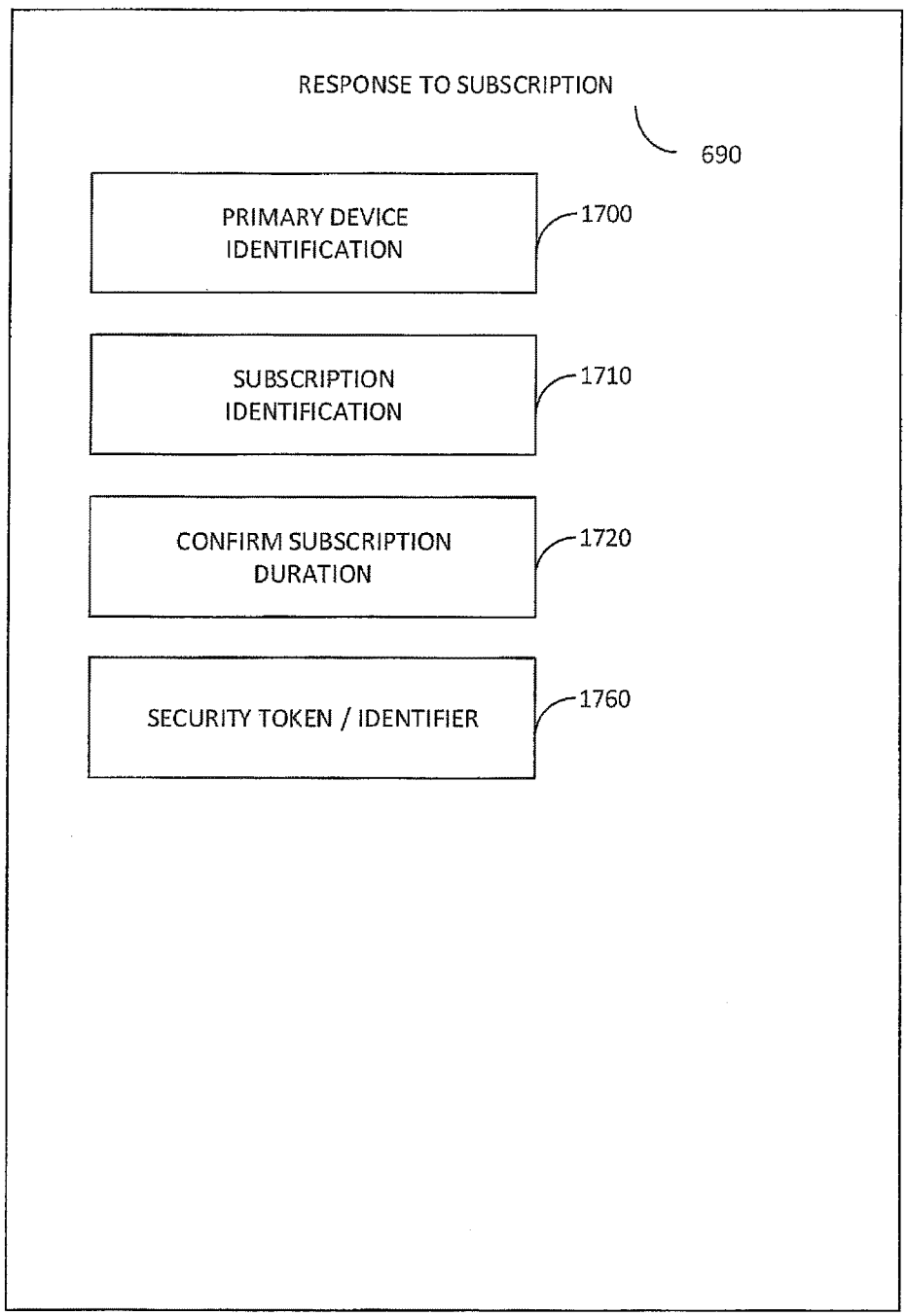
FIG. 23 illustrates a response to subscription.

Referring to FIG. 23, the response to subscription 690 from the CD 130 to the PD 120 is preferably sent in response to a request from the CD 130 and/or CD EAMs application(s). In this manner, the confirmation may be directed to a particular CD 130 and/or one or more particular EAMs applications on the CD. In some cases, the response to subscription 690 from the CD 130 to the PD 120 may be for all subscriptions of a plurality of current subscriptions of the CD. In this manner, all of the current subscriptions may be effectively confirmed with a reduced amount of data communications and without the need to expressly identify all the current subscriptions. The response to subscription 690 may be sent from PD to CD in response to receiving a renew subscription 680 request from CD. The response to subscription 690 may be sent from PD to CD in response to receiving a cancel emergency subscription 670 from CD.

The response to subscription 690 may be based upon the PD identification 1700 which identifies the PD. For example, the PD identification preferably uses a string identification. In this manner, the CD may distinguish between a plurality of different PDs to which it is, or may be, connected to. The output parameters may include the subscription identification 1710 which identifies a particular subscription to services between the particular PD and the particular CD. For example, the subscription identification may be a unique identification to that particular session so that subsequent messages and communications may be tailored for the particular CD. Moreover, the subscription identification 1710 may be used to distinguish among a plurality of PD EAMs applications and/or among a plurality of CD EAMs applications. In the case that the subscription identification 1710 for the response to cancel emergency subscription 670 is sent by the PD 120 so that the renew subscription 680 and/or cancel emergency subscription 670 may be confirmed. The output parameters may include a confirm subscription duration 1720 indicating the duration of the subscription for purposes of confirmation, if desired. The confirm subscription duration 1720 may be the same as the requested duration or may be different from the requested duration. A security token or identifier 1760 may be included in output parameters. For example it may establish authentication of security device as a trusted device. The security token or identifier 1760 may be same as security token or identifier 1560 or 1660. In other examples the security token or identifier 1760 may be different than the security token or identifier 1560 or 1660.

In one example various elements that may be carried in response to renew subscription request from PD to CD and their description may be as shown in the Table:

"Elements of the response to renew subscription" below.

TABLE

Elements of the response to renew subscription

| Element Name | Description |
| --- | --- |
| SubscriptionID | The subscription identifier for this EAM subscription. SubscriptionID may be used to uniquely identify this subscription from CD to the PD. |
| SubscriptionTimeoutDuration | Actual duration in number of milliseconds (or seconds) until the subscription expires. A special value of −1 indicates "Infinite" duration. |
| PDDevID | Device identifier for PD |
| PDVersion | Version of the PD |

In one example various elements that may be carried in response to cancel subscription request from PD to CD and their description may be as shown in the Table: "Elements of the response to cancel subscription" below.

TABLE

Elements of the response to cancel subscription

| Element Name | Description |
| --- | --- |
| CancelStatusCode | A success or failure indication status code indicating the status of cancel subscription request |
| CancelStatusString | A success or failure indication status string indicating the status of cancel subscription request |
| PDDevID | Device identifier for PD |
| PDVersion | Version of the PD |

In one example, JSON may be used to carry the response to subscription renewal request for EAMs from the PD to the CD. The JSON schema for the PD subscription renew response to CD may be as follows:

```
{
    "id": "http://atsc.org/version/3.0/cd/sub_renew_resp_pd2cd#",
    "$schema": "http://json-schema.org/draft-04/schema#",
    "title": "ATSC Subscription Renew Response from PD to CD",
    "description": "Subscription Renew Response from PD to CD
Schema as defined in ATSC 3.0 (c) 2014 atsc.org - All rights reserved.",
    "type": "object",
    "properties": {
    "required": ["SubscriptionRenewResponsefromPDtoCD"],
    "SubscriptionRenewResponsefromPDtoCD": {
        "type": "object",
        "properties": {
            "SubscriptionID": {
                "type": "string"
            },
            "SubscriptionTimeoutDuration": {
                "type": "number"
            },
            "PDInfo": {
                "type": "object",
                "properties": {
                    "PDDevID": {
                        "type": "string"
                    },
                    "PDVersion":{
                        "type": "number"
                    }
                }
            }
        }
    },
    "required": ["SubscriptionID","SubscriptionTimeoutDuration"],
    "additionalProperties": false },
    "maxProperties": 1
  }
}
```

In one example, the format of this JSON payload may be as follows:

```
{
    "SubscriptionRenewResponsefromPDtoCD": {
        "SubscriptionID": "C034587",
        "SubscriptionTimeoutDuration": 7200,
      "PDInfo": {
          "PDDevID": "PDDevId01",
                            "PDVersion": 1.0
      }
    }
}
```

In one example, the XML format may be used to carry the response to subscription renewal request for EAMs from the PD to the CD. The XML schema for the PD subscription renew response to CD may be defined as follows:

```
<?xml version="1.0" encoding="UTF-8"?>
<!-- Subscription renew response from PD to CD-->
<xs:schema xmlns:xs="http://www.w3.org/2001/XMLSchema" >
    <xs:element name="SubscriptionRenewResponsefromCDtoPD"
type="SubscriptionRenewResponseType" />
    <xs:complexType name="SubscriptionRenewResponseType">
        <xs:all>
            <xs:element name="SubscriptionID" type="xs:anyURI"
               minOccurs="1"/>
            <xs:element name="SubscriptionTimeoutDuration"
type="xs:float" minOccurs="1"/>
            <xs:element name="PDInfo" type="PDInfoType"
minOccurs="0" maxOccurs="1"/>
        </xs:all>
    </xs:complexType>
    <xs:complexType name="PDInfoType">
        <xs:all>
            <xs:element name="PDDevID" type="xs:string"
minOccurs="0" maxOccurs="1"/>
            <xs:element name="PDVersion" type="xs:float"
minOccurs="0" maxOccurs="1"/>
        </xs:all>
    </xs:complexType>
</xs:schema>
```

In one example, the REST mechanism may be used for the PD subscription renewal response to the CD. This may be done in response to HTTP GET or HTTP POST REST subscription renewal request from the CD to the PD as described previously.

In one example, this may be done by sending a HTTP response to the CD.

In another example, a HTTP response may be sent from the PD to the CD as follows:

```
HTTP/1.1 200 OK
content-type:application/json
content-length: <content length of response>
{
    "SubscriptionID": "C034587",
    "SubscriptionTimeoutDuration": 7200,
    "PDInfo": {
        "PDDevID": "PDDevId01",
                "PDVersion": 1.0
    }
}
```

In this case, the HTTP response body include JSON data which may conform to the JSON schema defined previously. In another example, instead of JSON, JSONP data may be used. In another case, the HTTP response body may send the same data in another format such as XML, CSV, BNF, ABNF, ENBF, or any other suitable format. For example if XML format is used in HTTP response body then the content may conform to the XML schema for the response defined above.

In one example, JSON may be used to carry the response to subscription cancel request for EAMs from the PD to the CD.

In one example, the JSON schema for the PD subscription cancel response to the CD may be defined as follows:

```
{
    "id": "http://atsc.org/version/3.0/cd/sub_cancel_resp_pd2cd#",
    "$schema": "http://json-schema.org/draft-04/schema#",
    "title": "ATSC Subscription Cancel Response from PD to CD",
    "description": "Subscription Cancel Response from PD to CD
Schema as defined in ATSC 3.0 (c) 2014 atsc.org - All rights reserved.",
    "type": "object",
    "properties": {
```

-continued

```
    "required": ["SubscriptionCancelResponsefromPDtoCD"],
    "SubscriptionCancelResponsefromPDtoCD": {
        "type": "object",
        "properties": {
            "CancelStatusCode": {
                "type": "number"
            },
            "CancelStatusString": {
                "type": "string"
            },
    "PDInfo": {
        "type": "object",
        "properties": {
            "PDDevID": {
                "type": "string"
            },
            "PDVersion":{
                "type": "number"
            }
        }
    }
},
"required": ["CancelStatusCode","CancelStatusString"],
"additionalProperties": false },
"maxProperties": 1
}
}
```

In one example, the format of this JSON payload may be as follows:

```
{
    "SubscriptionCancelResponsefromPDtoCD": {
        "CancelStatusCode": "200",
        "CancelStatusString": "OK",
        "PDInfo": {
            "PDDevID": "PDDevId01",
                    "PDVersion": 1.0
        }
    }
}
```

In one example, the XML format may be used to carry the response to the subscription cancel request for EAMs from the PD to the CD. The XML schema for the PD subscription cancel response to the CD may be as follows:

```
<?xml version="1.0" encoding="UTF-8"?>
<!-- Subscription cancel response from PD to CD-->
<xs:schema xmlns:xs="http://www.w3.org/2001/XMLSchema" >
    <xs:element name="SubscriptionCancelResponsefromCDtoPD"
type="SubscriptionCancelResponseType" />
    <xs:complexType name="SubscriptionCancelResponseType">
        <xs:all>
            <xs:element name="CancelStatusCode" type="xs:int"
               minOccurs="1"/>
            <xs:element name="CancelStatusString" type="xs:string"
minOccurs="1"/>
            <xs:element name="PDInfo" type="PDInfoType"
minOccurs="0" maxOccurs="1"/>
        </xs:all>
    </xs:complexType>
    <xs:complexType name="PDInfoType">
        <xs:all>
            <xs:element name="PDDevID" type="xs:string"
minOccurs="0" maxOccurs="1"/>
            <xs:element name="PDVersion" type="xs:float"
minOccurs="0" maxOccurs="1"/>
        </xs:all>
    </xs:complexType>
</xs:schema>
```

In another example, the JSON schema for the PD subscription cancel response to CD may be as follows:

```
{
    "id": "http://atsc.org/version/3.0/cd/sub_cancel_resp_pd2cd#",
    "$schema": "http://json-schema.org/draft-04/schema#",
    "title": "ATSC Subscription Cancel Response from PD to CD",
    "description": "Subscription Cancel Response from PD to CD
Schema as defined in ATSC 3.0 (c) 2014 atsc.org - All rights reserved.",
    "type": "object",
    "properties": {
    "required": ["SubscriptionCancelResponsefromPDtoCD"],
    "SubscriptionCancelResponsefromPDtoCD": {
        "type": "object",
        "properties": {
            "CancelStatusCode": {
                "type": "number"
            },
            "CancelStatusString": {
                "type": "string"
            },
        },
        "required": ["CancelStatusCode","CancelStatusString"],
        "additionalProperties": false },
        "maxProperties": 1
    }
}
```

In another example, a format of this cancel response JSON payload may be as follows:

```
{
    "SubscriptionCancelResponsefromPDtoCD": {
        "CancelStatusCode": "200",
        "CancelStatusString": "OK"
    }
}
```

In another example, the XML schema for the PD subscription cancel response to CD may be defined as follows:

```
<?xml version="1.0" encoding="UTF-8"?>
<!-- Subscription cancel response from PD to CD-->
<xs:schema xmlns:xs="http://www.w3.org/2001/XMLSchema" >
    <xs:element name="SubscriptionCancelResponsefromCDtoPD"
type="SubscriptionCancelResponseType" />
    <xs:complexType name="SubscriptionCancelResponseType">
        <xs:all>
            <xs:element name="CancelStatusCode" type="xs:int"
            minOccurs="1"/>
            <xs:element name="CancelStatusString" type="xs:string"
minOccurs="1"/>
        </xs:all>
    </xs:complexType>
</xs:schema>
```

In one example, the REST mechanism may be used for the PD subscription cancel response to the CD. This may be done in response to HTTP GET or HTTP POST REST subscription cancel request from the CD to the PD as described previously.

In one example, this may be done by sending a HTTP response to CD.

In another example, a HTTP response may be sent from the PD to the CD as follows:

HTTP/1.1 200 OK

In this case, in another example the HTTP response body may include some data. For example the response may be sent as follows:

```
HTTP/1.1 200 OK
content-type:application/json
content-length: <content length of response>
```

```
{
    "PDInfo": {
        "PDDevID": "PDDevId01",
        "PDVersion": 1.0
    }
}
```

The JSON data which may conform to the JSON schema defined previously. In another example, instead of JSON, JSONP data may be used. In another case, the HTTP response body may send the same data in another format such as XML, CSV, BNF, ABNF, ENBF, or any other suitable format. For example, if XML format is used in HTTP response body then the content may conform to the XML schema for the response defined above.

Figure 24:
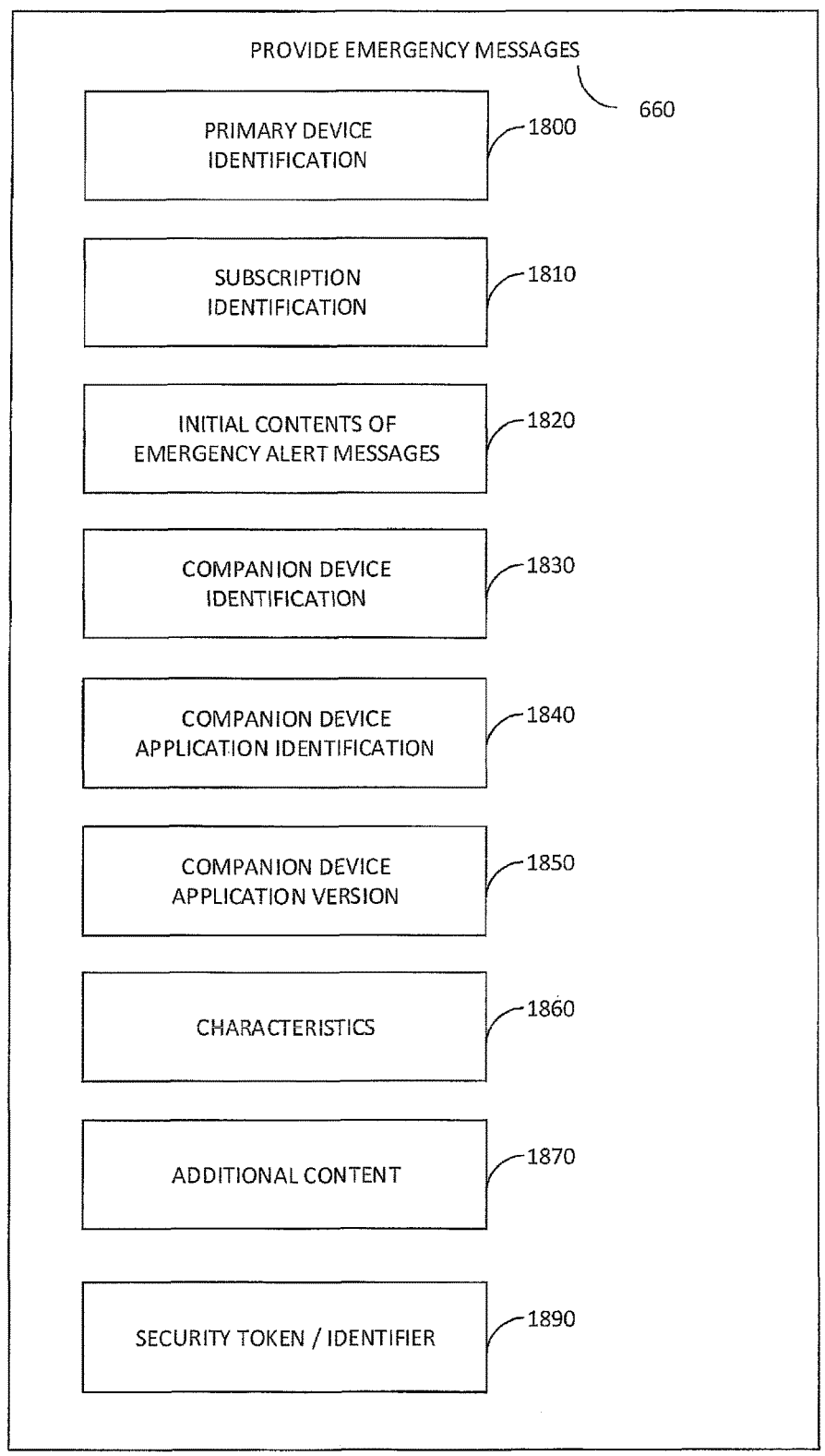
FIG. 24 illustrates providing an emergency message.

Referring to FIG. 24, the provide emergency message 660 from the PD 120 to the CD 130 is preferably sent in response to when an EAM needs to be communicated from PD 120 to CD 130. In this manner, the emergency messages may be directed to a particular CD 130 and/or one or more particular EAMs applications on the CD. In some cases, the provided emergency message 660 from the PD 120 to the CD 130 may be for all subscriptions of a plurality of current subscriptions of the CD. In this manner, all of the current subscriptions may be effectively confirmed with a reduced amount of data communications and without the need to expressly identify all the current subscriptions.

The provide emergency message 660 may be based upon the PD identification 1800 which identifies the PD. For example, the PD identification preferably uses a string identification. In this manner, the CD may distinguish between a plurality of different PDs to which it is, or may be, connected to. The notification message parameters may include the subscription identification 1810 which identifies a particular subscription to services between the particular PD and the particular CD. For example, the subscription identification may be a unique identification to that particular session so that the emergency message may be tailored for the particular CD. Moreover, the subscription identification 1810 may be used to distinguish among a plurality of PD EAMs applications and/or among a plurality of CD EAMs applications. The input parameters may include initial contents of the EAMs 1820 indicating the textual information of the emergency alert. In some cases, all or part of the EAMs 1820 may include textual content, other content, and/or control codes. The control codes may be used to indicate particular standard messages that are known by the CD and thus do not need to be expressly provided. The input parameters may include CD identification 1830 which identifies the CD. For example, the CD identification preferably uses a string identification. The input parameters may include CD application identification 1840. For example, the CD application identification identifies the application, and among a plurality of such applications if present, on the CD used for exchanging emergency messages. The input parameters may include CD application version 1850. For example, the CD application version identifies the attributes and/or capabilities of the particular application. In some examples the CD identification 1830, CD application identification 1840 and CD application version 1850 preferably may not be present in the provided emergency message 660. The input parameters may include characteristics 1860 of the initial contents of the EAMs 1820. The characteristics 1860 may indicate, for example, whether the message is a new message. In the event that the message is not a new message, it may be desirable to determine whether the message has been previously provided to the particular CD in which case it may be selectively not provided to the CD again, if desired. In the event the message is a new message, it is desirable to provide the new message to the CD. The characteristics 1860 may indicate, for example, whether the message is a one-time-message that is not to be repeated. In the event that the message is a one-time-message, it is desirable to provide the one-time-message to the CD. In some cases to ensure that the message is properly received by the CD, the one-time-message may be sent more than once to the CD even though the one-time-message was only received once by the PD. In the event that the message is a continual message, the message may be provided to the CD each time it is received by the PD. In the event that the message is a continual message, the message may be selectively provided to the CD each time it is received by the PD. In the event that the message is a continual message, the message may be selectively not provided to the CD. The characteristics 1860 may indicate, for example, the type of the message. The type of the message may include, for example, a textual message, mixed-media message, a video message, an audio message, a HTML message, etc. The characteristic 1860 may indicate, for example, the priority of the message. For example, a 1 may include a low priority message, a 5 may include a medium priority message, and a 10 may include a high priority message. The input parameters may include additional content 1870 which indicates whether additional content is available or will soon be available. The additional content 1870 may indicate a location, such as a URI, where additional information may be found by the CD. The additional content 1870 may indicate whether or not a subsequent message can be expected that includes additional information related to the current provided emergency message 660. In this manner, a first emergency message may indicate that a second emergency message will have additional information related to the first emergency message, the second emergency message may indicate that a third emergency message will have additional information related to the first and/or second emergency message, and the third emergency message may indicate that there are not additional messages related to the first, second, or third emergency messages. In this manner, any size or content related limitations to the emergency messages may be overcome by the use of multiple emergency messages. Also, in this manner, the first emergency message may be provided before the remaining emergency messages are received by the PD or otherwise available to be provided to the PD. A Timestamp may be included in the message to identify when the message was generated. A security token or identifier 1890 may be included in output parameters. For example it may establish authentication of security device as a trusted device. The security token or identifier 1890 may be same as security token or identifier 1560 or 1660. In other examples the security token or identifier 1890 may be different than the security token or identifier 1560 or 1660.

In one example various elements that may be carried in EAM from PD to CD and their description may be as shown in the Table: "Elements of the emergency alert message" below.

TABLE

| Elements of the EAM | |
| --- | --- |
| Element Name | Description |
| SubscriptionID | The subscription identifier for this EAM subscription. SubscriptionID may be used to uniquely identify this subscription from CD to the PD. |
| EAMID | Identifier of the EAM. The identifier uniquely identifies the EAM. |
| Timestamp | Date and time when the EAM was generated |
| ContentFormat | Content type of the initial EAM (InitialEAMContent element) |
| InitialEAMContent | Initial EAM content. The content-type of this element is given by the ContentFormat element. |
| InitialEAMContentAccessibilityURL | URL which provides initial EAM content for accessibility. The InitialEAMContentAccessibilityURL may point to secondary audio stream, which will facilitate the provision of emergency information. This may be done as required by Federal Communications Commission (FCC) rules. |
| AddlEAMURL | URL which provides additional information about this EAM. The URL provides more information than what is included in the InitialEAMContent element. |
| AddlEAMPhone | Phone number for obtaining more information about this EAM |
| ContactEmail | Email address which can provide more information regarding this EAM |
| Continuation | If Continuation is true then this EAM is a continuation of one or more previous EAMs with the same EAMID value, If Continuation is false then this EAM is a not a continuation of any previous EAM |

TABLE-continued

Elements of the EAM

| Element Name | Description |
| --- | --- |
| NewMsg | If NewMsg is true then this EAM is a new message, If NewMsg is false then this EAM is a repeat of a previous EAM |
| OneTimeMsg | If OneTimeMsg is true then this EAM is sent only one time and may not be repeated. If OneTimeMsg is false this EAM may be sent more than one time. |
| PDDevID | Device identifier for PD |
| PDVersion | Version of the PD |

In one example JSON may be used to carry the notification EAM from the PD to the CD. The JSON schema for the PD notification of EAM to the CD may be as follows:

```
{
  "id": "http://atsc.org/version/3.0/cd/initial_eam_pd2cd#",
  "$schema": "http://json-schema.org/draft-04/schema#",
  "title": "ATSC Emergency Alert Message Notification from PD to CD",
  "description": "Emergency Alert Message Notification from PD to CD
Schema as defined in ATSC 3.0 (c) 2014 atsc.org - All rights reserved.",
  "type": "object",
  "properties": {
  "required": ["EmergencyAlertMessageNotificationfromPDtoCD"],
  "EmergencyAlertMessageNotificationfromPDtoCD": {
    "type": "object",
    "properties": {
      "SubscriptionID": {
        "type": "stripe"
      },
      "EAMID": {
        "type": "string"
      },
      "Timestamp": {
        "format": "date-time",
        "type": "string",
        "description": "Timestamp of EAM"
      },
      "ContentFormat": {
        "type": "string",
        "format": "uri"
      },
      "InitialEAMContent": {
        "type": "string"
      },
"InitialEAMContentAccessibilityURL": {
        "type": "string"
"format": "uri"
      },
      "AddlEAMURL": {
        "type": "string",
        "format": "uri"
      },
      "AddlEAMPhone": {
        "type": "string",
        "format": "uri"
      },
      "ContactEmail": {
        "type": "string",
        "format": "email"
      },
      "Continuation": {
        "type": "boolean"
      },
    "NewMsg": {
     "type": "boolean"
    },
      "OneTimeMsg": {
      "type": "boolean"
    },
      "PDInfo": {
```

-continued

```
        "type": "object",
        "properties": {
          "PDDevID": {
            "type": "string"
          },
          "PDVersion":{
            "type": "number"
          }
        }
      }
    }
  },
  "required":
["SubscriptionID","InitialEAMContent",
"InitialEAMContentAccesibilityURL","EAMID",
"Timestamp","Continuation","ContentFormat"],
      "additionalProperties": false },
      "maxProperties": 1
    }
  }
```

In one example, the format of this JSON payload may be as follows:

```
{
    "EmergencyAlertMessageNotificationfromPDtoCD": {
        "SubscriptionID": "C034587",
        "EAMID": "EAM1005",
        "Timestamp": "2014-04-04T10:30:54.51Z",
        "ContentFormat": "text/html",
        "InitialEAMContent": "There is an emergency weather advisory issued for zip code 90210.",
        "InitialEAMContentAccessibilityURL":
"http://server/initialweatherinfo/90210/austream/",
        "AddlEAMURL": "http://server/addlweatherinfo/90210/",
        "AddlEAMPhone": "1-555-666-7777",
      "ContactEmail": "email@emailhost.com",
      "Continuation": false
        "NewMsg": true
        "OneTimeMsg": false
    }
}
```

The Timestamp may conform to the semantics as defined in RFC 3339 "Date and Time on the Internet: Timestamps" as defined in http:// http://tools.ietf.org/html/rfc3339, which is incorporated here by reference in its entirety.

In one example, the XML format may be used to carry the notification EAM from the PD to the CD.

In one example, the XML schema for the PD notification of EAM to the CD may be as follows:

```
<?xml version="1.0" encoding="UTF-8"?>
<xs:schema xmlns:xs="http://www.w3.org/2001/XMLSchema" >
  <xs:element name=
```

-continued

```
"EmergencyAlertMessageNotificationfromPDtoCD"
type="EmergencyAlertMessageType" />
  <xs:complexType name="EmergencyAlertMessageType">
    <xs:all>
      <xs:element name="SubscriptionID" type="xs:string"
         minOccurs="1"/>
      <xs:element name="EAMID" type="xs:string" minOccurs="1"/>
   <xs:element name="Timestamp" type="xs:dateTime" minOccurs="1"/>
      <xs:element name="ContentFormat" type="xs:string"
         minOccurs="1"/>
      <xs:element name="InitialEAMContent" type="xs:string"
minOccurs="1"/>
      <xs:element name="InitialEAMContentAccessibilityURL"
type="xs:anyURI" minOccurs="1"/>
      <xs:element name="AddlEAMURL" type="xs:anyURI"
         minOccurs="0"
maxOccurs="1"/>
      <xs:element name="AddlEAMPhone" type="xs:string"
         minOccurs="0"
maxOccurs="1"/>
      <xs:element name="ContactEmail" type="xs:string"
         minOccurs="1"/>
      <xs:element name="Continuation" type="xs:boolean"
         minOccurs="0"
maxOccurs="1"/>
    <xs:element name="NewMsg" type="xs:boolean" minOccurs="0"
maxOccurs="1"/>
    <xs:element name="OneTimeMsg" type="xs:boolean" minOccurs="0"
maxOccurs="1"/>
      <xs:element name="PDInfo" type="CDInfoType" minOccurs="0"
maxOccurs="1"/>
    </xs:all>
  </xs:complexType>
  <xs:complexType name="PDInfoType">
    <xs:all>
      <xs:element name="PDDevID" type="xs:string" minOccurs="0"
maxOccurs="1"/>
      <xs:element name="PDVersion" type="xs:float" minOccurs="0"
maxOccurs="1"/>
    </xs:all>
  </xs:complexType>
</xs:schema>
```

In one example, the REST mechanism may be used for the PD notification of EAM to the CD.

In one example, this may be done by sending a request to a defined end-point on the CD from the PD.

In another example, a HTTP POST request may be sent from the CD to the PD as follows:

```
POST /PD/EAM/initial_eam_PD2CD HTTP/1.1
host: http://192.168.0.100
content-type:application/x-www-form-urlencoded;charset=utf-8
content-length: <content length of request>
{
    "SubscriptionID": "C034587",
    "EAMID" : "EAM1005",
    "Timestamp": "2014-04-04T10:30:54.51Z",
    "ContentFormat": "text/html",
    "InitialEAMContent": "There is an emergency weather advisory
issued for zip code 90210.",
        "InitialEAMContentAccessibilityURL":
"http://server/initialweatherinfo/90210/austream/",
      "AddlEAMURL": "http://server/addlweatherinfo/90210/",
      "AddlEAMPhone": "1-555-666-7777",
    "ContactEmail": "email@emailhost.com",
    "Continuation": false
    "NewMsg": true
    "OneTimeMsg": false
}
```

In one example, a HTTP GET request may be sent from the CD to the PD as follows:
  http://192.168.0.100/PD/EAM/
    initial_earn_PD2CD?SubscriptionID=
    C034587&EAMID=EAM1005&Continuation=
    false&InitialEAMContent=There%20is%20an-
    %20emergency%20weather%20advisory%20issued-
    %20for%20zip%20code%2090210
which can also be represented as
  GET/PD/EAM/
    sub_renew_req_CD2PD?SubscriptionID=
    C034587&EAMID=EAM1005&Continuation=
    false&InitialEAMContent=There%20is%20an%20emer-
    gency%20weather%20advisory%20issued%20for-
    %20zip%20code%2090210 HTTP/1.1
  host: http://192.168.0.100

Figure 25:
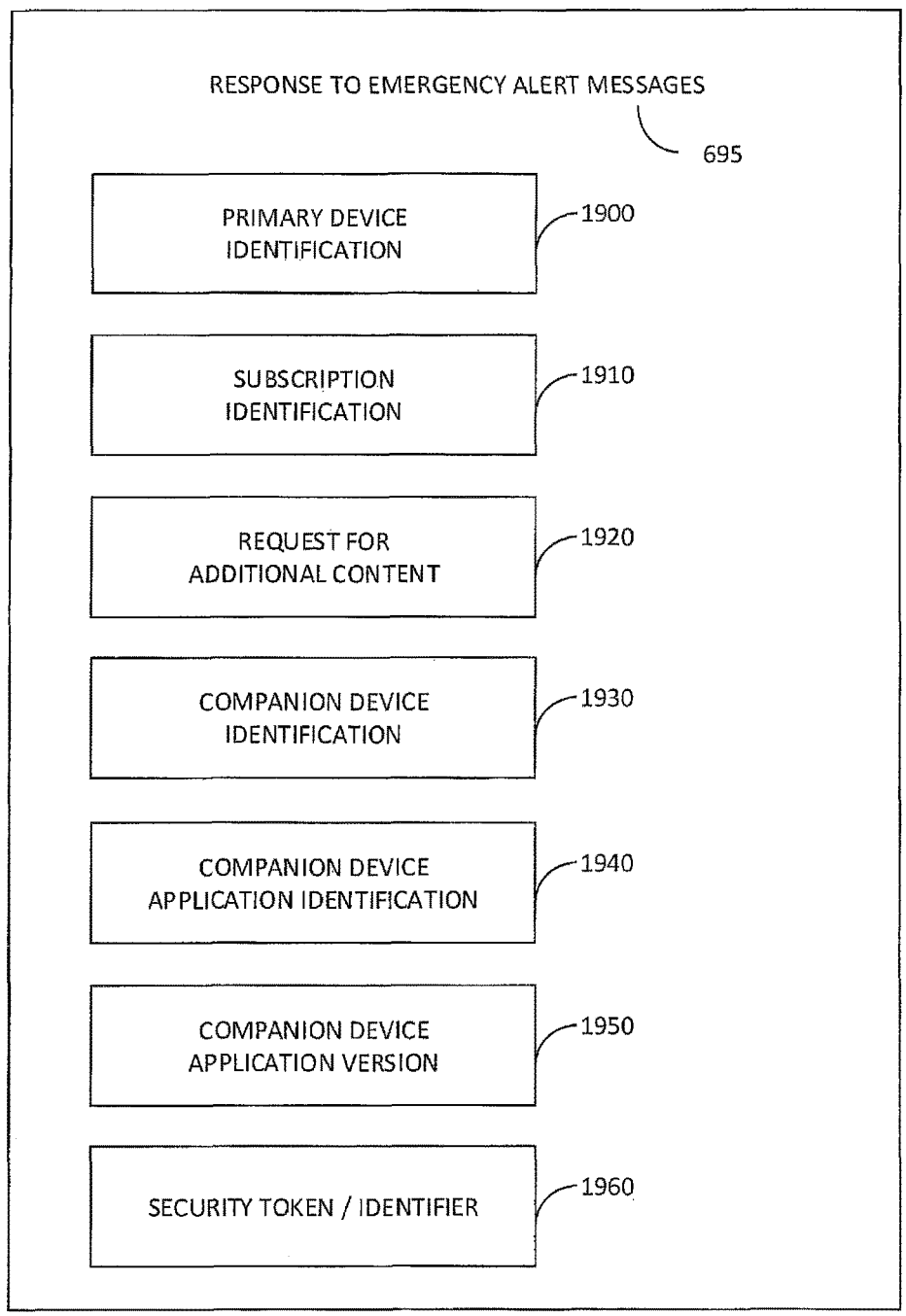
FIG. 25 illustrates a response to emergency alert messages.

Referring to FIG. 25, a response to EAM(s) 695 from the CD 130 to the PD 120 is preferably sent in response to receiving the provided emergency message 660. In this manner, the response to emergency messages may be directed to a particular PD 120 and/or one or more particular EAMs applications on the PD. In some cases, the response to EAM(s) 695 from the CD 130 to the PD 120 may be for all subscriptions of a plurality of current subscriptions of the CD. In this manner, all of the current subscriptions may be effectively confirmed with a reduced amount of data communications and without the need to expressly identify all the current subscriptions.

The response to EAM(s) 695 may be based upon the PD identification 1900 which identifies the PD. For example, the PD identification preferably uses a string identification. In this manner, the CD may distinguish between a plurality of different PDs to which it is, or may be, connected to. In some example the PD identification 1900 may not preferably be included in the response to EAMs 685. The input parameters may include the subscription identification 1910 which identifies a particular subscription to services between the particular PD and the particular CD. For example, the subscription identification may be a unique identification to that particular session so that the emergency message may be tailored for the particular CD. Moreover, the subscription identification 1910 may be used to distinguish among a plurality of PD EAMs applications and/or among a plurality of CD EAMs applications. The input parameters may include a request for additional content 1920 indicating the desire for additional information which the PD may respond to with an additional message. The input parameters may include CD identification 1930 which identifies the CD. For example, the CD identification preferably uses a string identification. The input parameters may include CD application identification 1940. For example, the CD application identification identifies the application, and among a plurality of such applications if present, on the CD used for exchanging emergency messages. The input parameters may include CD application version 1950. For example, the CD application version identifies the attributes and/or capabilities of the particular application. In some examples, no callback information is necessary, since this information is already available to the PD because it may be liked with the subscription information. A security token or identifier 1960 may be included in input parameters. The security token or identifier may have been obtained by the CD by some external means and may help to identify the CD. For example it may establish authentication of security device as a trusted device. The security token or identifier 1960 may be same as security token or identifier 1360. In other examples the security token or identifier 1960 may be different than the security token or identifier 1360.

In one example various elements that may be carried in response to EAM from CD to PD and their description may be as shown in the Table: "Elements of response to the emergency alert message" below.

TABLE

Elements of the response to emergency alert message

| Element Name | Description |
| --- | --- |
| SubscriptionID | The subscription identifier for this EAM subscription. SubscriptionID may be used to uniquely identify this subscription from CD to the PD. |
| EAMID | Identifier of the EAM. The identifier uniquely identifies the EAM. |
| RTimestamp | Date and time when the EAM response was generated |
| AddlContentRequest | If AddlContentRequest is true then this response also indicates request for more information about the EAM with EAMID. If AddlContentRequest is false then this response to EAM is not requesting additional information about this EAM. |
| CDDevID | Device identifier for CD |
| CDAppID | Application identifier of the CD |
| CDAppVersion | Version of the CD |

In one example, JSON may be used to carry the response message from the CD to the PD in response to the emergency device message notification. The JSON schema for the CD response to EAM may be as follows:

```
{
  "id": "http://atsc.org/version/3.0/cd/initial_eam_resp_cd2pd#",
  "$schema": "http://json-schema.org/draft-04/sehema#",
  "title": "ATSC Emergency Alert Message Notification Response from CD toPD",
  "description": "Emergency Alert Message Notification Response from CD to PD Schema as defined in ATSC 3.0 (c) 2014 atsc.org - All rights reserved.",
  "type": "object",
  "properties": {
  "required":
  ["EmergencyAlertMessageNotificationResponsefromPDtoCD"],
  "EmergencyAlertMessageNotificationResponsefromPDtoCD": {
    "type": "object",
    "properties": {
      "SubscriptionID": {
        "type": "string"
      },
      "EAMID": {
        "type": "string"
      },
      "RTimestamp": {
        "format": "date-time",
        "type": "string",
        "description": "Timestamp of EAM response",
      },
      "AddlContentRequest": {
      "enum": [
      "1",
      "0"
      ] },
      "CDInfo": {
      "type": "object",
      "properties": {
        "CDDevID": {
          "type": "string"
        },
        "CDAppID": {
          "type": "string"
        },
        "CDAppVersion":{
          "type": "number"
        }
      }
    }
  },
  "required": ["SubscriptionID","EAMID","AddlContentRequest"],
  "additionalProperties": false },
  "maxProperties": 1
  }
}
```

In one example format of this JSON payload may be as follows:

```
{
  "EmergencyAlertMessageNotificationResponsefromCDtoPD": {
    "SubscriptionID": "C034587",
    "EAMID": "EAM1005",
    "RTimestamp": "2014-04-04T10:35:14.21Z",
    "AddlContentRequest": 1,
    "CDInfo": {
      "CDDevID": "CDDevId01",
      "CDAppID": "ID01",
      "CDAppVersion": 0.9
    }
  }
}
```

In one example, the XML format may be used to carry the response message from the CD to the PD in response to the EAM notification.

In one example, the XML schema for the CD response to EAM may be as follows:

```
<?xml version="1.0" encoding="UTF-8"?>
<!--EAM Notification message response-->
<xs:schema xmlns:xs="http://www.w3.org/2001/XMLSchema" >
  <xs:element name="EmergencyAlertMessageResponsefromCDtoPD"
  type="EmergencyAlertMessageResponseType" />
  <xs:complexType name="EmergencyAlertMessageResponseType">
    <xs:all>
      <xs:element name="SubscriptionID" type="xs:string"
      minOccurs="1"/>
      <xs:element name="EAMID" type="xs:string" minOccurs="1"/>
    <xs:element name="RTimestamp" type="xs:dateTime"
    minOccurs="1"/>
      <xs:element name="AddlContentRequest" type="xs:boolean"
  minOccurs="1"/>
      <xs:element name="CDInfo" type="CDInfoType" minOccurs="0"
  maxOccurs="1"/>
    </xs:all>
  </xs:complexType>
  <xs:complexType name="CDInfoType">
    <xs:all>
      <xs:element name="CDDevID" type="xs:string" minOccurs="0"
  maxOccurs="1"/>
      <xs:element name="CDAppID" type="xs:string" minOccurs="0"
  maxOccurs="1"/>
      <xs:element name="CDAppVersion" type="xs:float"
      minOccurs="0"
  maxOccurs="1"/>
    </xs:all>
  </xs:complexType>
</xs:schema>
```

In one example, the REST mechanism may be used for the CD response EAM from the CD. This may be done in response to HTTP GET or HTTP POST REST EAM notification from the PD to the CD as described previously.

In one example, this may be done by sending a HTTP response to PD.

In another example, a HTTP response may be sent from the CD to the PD as follows:

HTTP/1.1 200 OK

In this case, in another example the HTTP response body may include some data. For example the response may be as follows:

```
HTTP/1.1 200 OK
content-type:application/json
content-length: <content length of response>
{
    "SubscriptionID": "C034587",
    "EAMID": "EAM1005",
"RTimestamp": "2014-04-04T10:35:14.21Z",
    "AddlContentRequest": 1,
    "CDInfo": {
       "CDDevID": "CDDevId01",
          "CDAppID": "ID01",
             "CDAppVersion": 0.9
       }
}
```

JSON data may conform to the JSON schema defined previously. In another example instead of JSON, JSONP data may be used. In another case the HTTP response body may send the same data in another format such as XML, CSV, BNF, ABNF, ENBF, or any other suitable format. For example if XML format is used in HTTP response body then the content may conform to the XML schema for the response defined above.

Additionally for all or some of the Tables described above with element names and their descriptions, a "security token or identifier" element may be added to each of the messages. This may be done as shown in the Table: "Security element for messages" below

TABLE

| Security element for messages | |
|---|---|
| Element Name | Description |
| SecurityToken | The security token or identifier which is used for securing and/or authenticating this session. |

In an example the security token or identifier may be represented as "SecurityToken" code field which may be done in JSON schema as follows:

```
"SecurityToken": {
    "type": "string"
},
```

In an example the security token or identifier may be represented as "SecurityToken" XML element which may be done in XML schema as follows:
  <xs:element name="SecurityToken" type="xs:string" minOccurs="0" maxOccurs="1"/>

The responsive message in addition to the input parameters indicated may indicate a success or failure, if desired. In addition, a subset of the input parameters, additional input parameters, and/or a subset of the input parameters together with additional input parameters may be used.

In one example, the WebSocket mechanism may be used for carrying some or all the messages between the PD(s) and the CD(s). Additionally HbbTV defined mechanisms (e.g. HbbTV 2.0 companion screen mechanisms) may be used for communication. In this case in one example the communication between the PD and the CD may be carried out as "application to application communication" as defined in HbbTV.

In this case one or more of the following may apply:

(1) An app-endpoint is defined for PD to CD communication. This is used in the process of matching the CD to PD connection when exchanging EAM communication related messages which will be relayed over the WebSocket protocol.

(2) In one example the app-endpoint may be selected as "org.atsc.pdcdeas" for PD to CD communication of EAMs. In other examples a common app-endpoint "org.atsc.pdcd" may be selected for all the communication between PD and CD including the EAM communication between PD and CD.

(3) It should be understood that the exact string value used for app-endpoint may be different than the one described. E.g. alternative values of app-endpoint strings include but are not limited to "org.atsc.PDCDEAMS", "org.atsc.cd-com", "org.atsc3.pdcd", "org.atsc3.pdcdeas", "org.atsc.eas", "pdapptocdapp05" etc. In general any alphanumeric or special character string which uniquely identifies the communication between PD and CD for EAMs or for any communication between PD and CD may be used.

Figure 26:
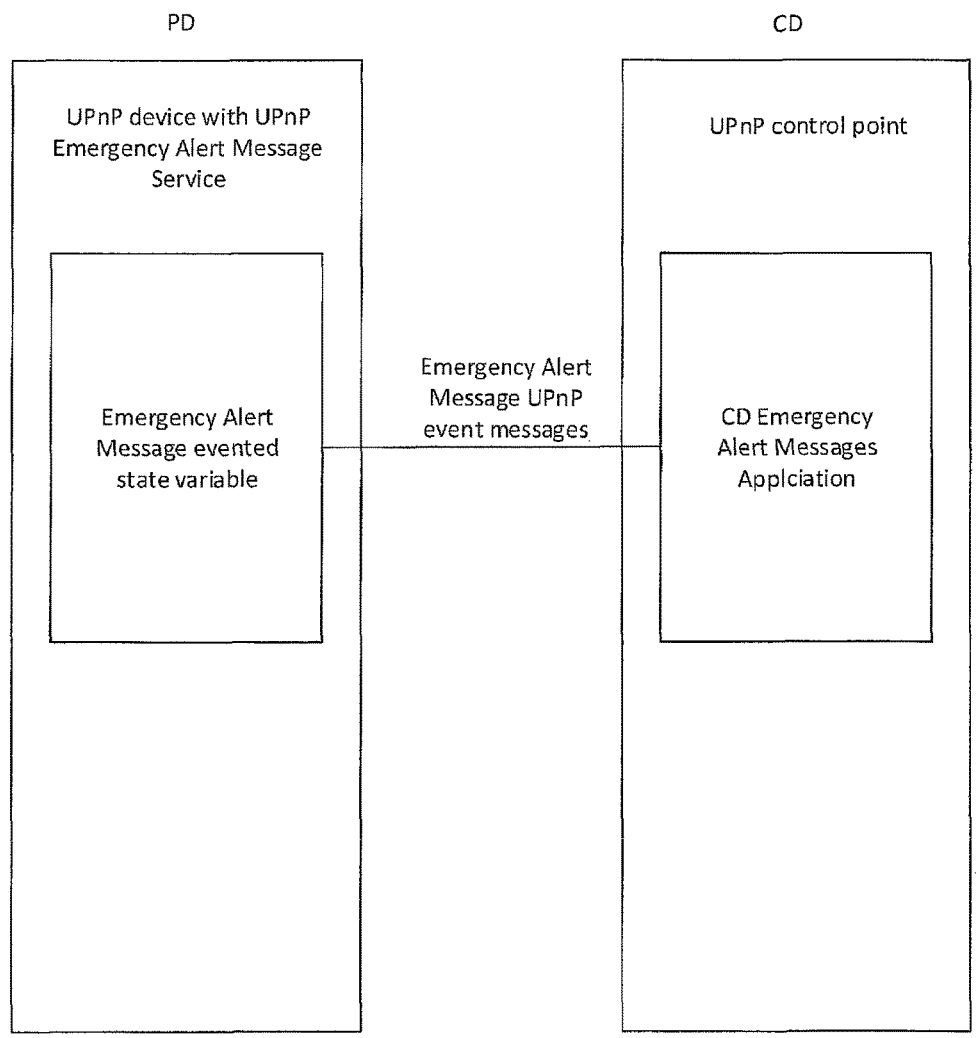
FIG. 26 illustrates a UPnP architecture for emergency alert messages

In one example, an UPnP Service may be defined for some or all of the message exchanges between the PD and the CD. This facilitates any UPnP control point to discover the UPnP EAMs service. Referring to FIG. 26 PD may include an UPnP device with UPnP EAM Service. The UPnP service on PD may include an EAM evented state variable. CD may include a UPnP control point. The UPnP control point functionality may be part of CD EAMs application or it may be separate from the CD EAMs application. The UPnP control point functionality on CD may be used for receiving EAMs sent as UPnP event messages.

The UPnP service may provide the following UPnP actions:

Set EAM filter

Get current EAM

The UPnP service also may define an evented state variable for receiving instant messages, such as EmergencyAlertMessage.

A description of an exemplary UPnP action is provided as follows:

(1) SetEAMFilter. This action takes a filter string as input argument. In one example the filter string may be a geo-location. For example in one case this may be a zip code. In another case it may be a list of zip codes. In this case the EAMs are requested only for the zip codes (geo-location) supplied as input argument. The return string can return a success or error code (e.g. fixed 3 digit codes) followed by an error or success string. Additional input argument can be taken by this action to make it more secure.

(2) GetCurrentEmergencyMessage. This action takes no input argument. In another example this action can take an input argument which is a filter string. This filter string can have same semantics as the input argument filter string for the SetEAMFilter action. Alternatively in some examples an additional input argument can be taken by this action to make it more secure. The return string can return a success indication (e.g. a fixed 3 digit code) followed by the current EAM. In case an input argument filter sting is supplied the EAM will be for the particular filter. If there is no current EAMs, a "null" value may be returned. If there is an error the return string can return an error code (e.g. fixed 3 digit codes) followed by an error reason string. In some example a timestamp indicating the timestamp of the EAM may be additionally returned. For example this may be an output argument or embedded in the return string, maybe as a prefix to the EAM.

In one example, one or both of the above actions may not be supported by the UPnP service. An evented state variable described below, namely EmergencyAlertMessage, may be provided for obtaining EAMs.

In one example the CD acts as a control point and the PD acts as a UPnP device and provides an EAMs UPnP service. In this case the PD's UPnP EAMs service provides a state variable EmergencyAlertMessages. In one example the state variable EmergencyAlertMessages is evented. In one example the state variable EmergencyAlertMessages is not evented. This may be the case if EAMs are expected to be large in size. In this case the state variable EmergencyAlertMessages's value can be polled by the CD by querying it as a state variable. In one case this may be done using QueryStatevariable UPnP action.

The PD publishes an update when the state variable EmergencyAlertMessages changes. For example this happens when there is a new EAM. Or this may happen when a previous EAM is to be repeated. The CD is subscribed to receive this information.

In one case, EmergencyAlertMessages state variable may be a required element. In another case EmergencyAlertMessages state variable may be an optional element.

Additionally, for the subscription of EAMs the CD and the PD may exchange messages using UPnP eventing architecture. The UPnP eventing architecture may be as described in UPnP device architecture 1.0 document, which is incorporated, herein by reference. This may include one or more of following message exchanges:

(1) The CD obtains information about eventing URL for PD EAMs by obtaining the UPnP device description.
(2) The CD subscribes to eventing for UPnP EAM service by sending a request with method SUBSCRIBE with NT and CALLBACK headers. This subscription request may include the following:
 Subscription callback URL on the CD in the CALLBACK header.
 Requested subscription duration in seconds in the TIMEOUT header.
 An example subscription request is shown as follows:
 SUBSCRIBE <eventSubURL path> HTTP/1.1
 HOST: <PD Host:PD port>
 CALLBACK: <Subscription callback URL>
 NT: upnp:event
 TIMEOUT: <requested subscription duration in Second>
 A special value of "Infinite" can be indicated in the TIMEOUT header to request an indefinite subscription (until it is cancelled). In other examples other special values (e.g. −1 or 0) could be signaled in TIMEOUT header to request indefinite subscription.
(3) The PD may accept the subscription from the CD for EAMs. In this case, it may assign a unique ID for this subscription (e.g., Subscription ID (SID)), and duration for the subscription (e.g., Confirmed Subscription duration) and may send a response to the CD.
 This subscription response from PD to CD may include the following:
  (a) Subscription ID for uniquely identifying the subscription in SID header.
  (b) Confirmed actual subscription duration in seconds in the TIMEOUT header.

An example subscription response may be as follows:
HTTP/1.1 200 OK
DATE: <response generation date>
SERVER: <PD Host ID, PD port>
uuid:<Subscription ID>
TIMEOUT: <confirmed subscription duration in Second>
 It may be a requirement that the subscription response be sent from PD to the CD within a specified time limit. For example it may be required that the subscription response be sent from the PD to the CD within 30 seconds from the time it receives the subscription request from the CD.
 Additionally PD may send a first or initial event message containing the EAM to CD. This may be done similar to how emergency messages are sent via evented state variables.
(4) The CD may send a renew subscription message to the PD to renew subscription to EAMs. This subscription renewal request may include the following:
 (a) Subscription ID which uniquely identifies this subscription in the SID header
 (b) Requested subscription duration in seconds in the TIMEOUT header
 An example subscription request may be as follows:
 SUBSCRIBE <eventSubURL path> HTTP/1.1
 HOST: <PD Host:PD port>
 SID: uuid:<Subscription ID>
 TIMEOUT: <requested subscription duration for renewal of subscription in Second>
(5) The PD may accept the subscription renewal request from the CD for EAMs. In this case it may assign a duration for the subscription (e.g., Confirmed Subscription duration) and may send a response to the CD.
 This subscription response from the PD to the CD may include the following:
  (a) Subscription ID for uniquely identifying the subscription in SID header.
  (b) Confirmed actual subscription duration in seconds in the TIMEOUT header.
 An example subscription renewal response is shown below:
 HTTP/1.1 200 OK
 DATE: <response generation date>
 SERVER: <PD Host ID, PD port>
 SID: uuid:<Subscription ID>
 TIMEOUT: <confirmed subscription duration in Second>
 It may be a requirement that the subscription renewal response be sent from the PD to the CD within a specified time limit. For example it may be required that the subscription renewal response be sent from the PD to the CD within 30 seconds from the time it receives the subscription request from CD.
 Also the PD may not send a new "initial" or first EAM at this time similar to the one that is sent when sending the response from the PD to the CD when subscription request is received from CD for the first time.
(6) The CD may send a cancel subscription message by sending a request with method UNSUBSCRIBE to the PD to cancel subscription to EAMs. This subscription cancel request may include the following:
 Subscription ID which uniquely identifies this subscription in the SID header.
 Requested subscription duration in seconds will not be needed in the TIMEOUT header. However in some example a value of 0 may be signaled in the TIMEOUT header. Alternatively a special value (e.g. −1) or any other value may be signaled in TIMEOUT header. This value may be ignored by the PD.

An example subscription cancel request is as follows:
UN-SUBSCRIBE <eventSubURL path> HTTP/1.1
HOST: <PD Host:PD port>
SID: uuid:<Subscription ID>

(7) The PD may accept the subscription cancellation request from the CD for EAMs. In this case it may send a response with success or failure code.

An example subscription cancel request is as follows:
HTTP/1.1 200 OK

It may be a requirement that the subscription cancel response be sent from the PD to the CD within a specified time limit. For example it may be required that the subscription cancel response be sent from the PD to the CD within 30 seconds from the time it receives the subscription request from CD.

(8) The PD may send EAMs to a subscribed CD as event messages. This may be sent in response to the changes to the state variable. This state variable may be EmergencyAlertMessage state variable previously described.

An example subscription renewal response where the EAM is sent as JSON formatted data is shown as follows. Where the value signaled in the 'EmergencyAlertMessage' state variable conforms to the JSON schema defined above with respect to the PD notification of EAMs.

```
NOTIFY <Subscription callback URL> HTTP/1.1
HOST: <PD Host:PD port>
CONTENT-TYPE: text/xml
CONTENT-LENGTH: <Body length in bytes>
NT: upnp:event
NTS: upnp:propchange
SID: uuid:<subscription ID>
SEQ: <event key>
<?xml version="1.0"?>
<e:propertyset xmlns:e="urn:schemas-upnp-org:event-1-0">
<e:property>
<EmergeneyAlertMessage>{
    "EmergencyAlertMessageNotificationfromPDtoCD": {
      "SubscriptionID": "C034587",
      "EAMID" : "EAM1005",
    "Timestamp": "2014-04-04T10:30:54.51Z",
      "ContentFormat": "text/html",
    "InitialEAMContent": "There is an emergency weather advisory issued for zip code 90210.",
    "InitialEAMContentAccessibilityURL":
"http://server/initialweatherinfo/90210/austream/",
      "AddlEAMURL": "http://server/addlweatherinfo/90210/",
      "AddlEAMPhone": "1-555-666-7777",
    "ContactEmail": "email@emailhost.com",
    "Continuation": false
"NewMsg": true
"OneTimeMsg": false
    }
</EmergencyAlertMessage>
</e:property>
</e:propertyset>
```

An example subscription renewal response where the EAM is sent as XML formatted data is as shown below:

```
NOTIFY <Subscription callback URL> HTTP/1.1
HOST: <PD Host:PD port>
CONTENT-TYPE: text/xml
CONTENT-LENGTH: <Body length in bytes>
NT: upnp:event
NTS: upnp:propchange
SID: uuid:<subscription ID>
SEQ: <event key>
<?xml version="1.0"?>
<e:propertyset xmlns:e="urn:schemas-upnp-org:event-1-0">
<e:property>
<EmergencyAlertMessage>
    <SubscriptionID>C034587</SubscriptionID>
    <EAMID>EAM1005</EAMID>
 <Timestamp>2014-04-04T10:30:54.51Z</Timestamp>
    <ContentFormat>text/html</ContentFormat>,
    <InitialEAMContent>"There is an emergency weather advisory issued for zip code 90210." <InitialEAMContent>
 <InitialEAMContentAccessibilityURL>http://server/initialweatherinfo/
90210/austream/<InitialEAMContentAccessibilityURL >
 <AddlEAMURL>http://server/addlweatherinfo/90210/</
AddlEAMURL>
    <AddlEAMPhone>1-555-666-7777</AddlEAMPhone>
    <ContactEmail>email@emailhost.com</ContactEmail>
    <Continuation>false</Continuation>
<NewMsg>true</NewMsg>
<OneTimeMsg>false</OneTimeMsg>
    </EmergencyAlertMessage>
</e:property>
</e:propertyset>
```

In some examples <'event key'> sent in SEQ header may be initialized to 0 in the first event notification message may be incremented for subsequent event notification messages.

The contents of EAMs (inside <'EmergencyAlertMessage'> . . . </'EmergencyAlertMessage'> field) may be encoded in UTF-8.

In one example the UPnP EAM Service XML description is given below:

```
<?xml version="1.0" ?>
<scpd xmlns="urn:schemas-upnp-org:service-1-0">
<specVersion>
  <major>1</major>
  <minor>0</minor>
</specVersion>
<actionList>
<action>
  <name>SetEAMFilter</name>
<argumentList>
<argument>
  <name>setStatus</name>
  <relatedStateVariable>SetStatus</relatedStateVariable>
  <direction>out</direction>
</argument>
<argument>
  <name>filter</name>
  <relatedStateVariable>Filter</relatedStateVariable>
  <direction>in</direction>
</argument>
</argumentList>
</action>
<action>
  <name>GetCurrentEmergencyMessage</name>
<argumentList>
<argument>
  <name>message</name>
  <relatedStateVariable>Message</relatedStateVariable>
  <direction>out</direction>
</argument>
<argument>
  <name>filter</name>
  <relatedStateVariable>Filter</relatedStateVariable>
  <direction>in</direction>
</argument>
</argumentList>
</action>
</actionList>
<serviceStateTable>
<stateVariable sendEvents="no">
  <name>Filter</name>
  <dataType>string</dataType>
  <defaultValue>null</defaultValue>
</stateVariable>
```

-continued

```
        - <stateVariable sendEvents="no">
          <name>SetStatus</name>
          <dataType>string</dataType>
          <defaultValue>null</defaultValue>
          </stateVariable>
        - <stateVariable sendEvents="no">
          <name>Message</name>
          <dataType>string</dataType>
          <defaultValue>null</defaultValue>
          </stateVariable>
        - <stateVariable sendEvents="yes">
          <name>EmergencyAlertMessage</name>
          <dataType>string</dataType>
          <defaultValue>null</defaultValue>
          </stateVariable>
          </serviceStateTable>
          </scpd>
```

In one example the proposed device description for the device providing UPnP EAM Service is as follows:

```
UPnP EAM Service Device Description XML:
<?xml version="1.0" ?>
- <root xmlns="urn:schemas-upnp-org:device-1-0">
- <specVersion>
  <major>1</major>
  <minor>0</minor>
  </specVersion>
  <URLBase>http://192.168.0.100:5002/EAMservicedevice
  </URLBase>
- <device>
  <deviceType>urn:schemas-upnp-org:device:EAMservicedevice:
  1</deviceType>
  <friendlyName>ATSC EAM Service Device</friendlyName>
  <manufacturer>Sharp Inc.</manufacturer>
  <manufacturerURL>/manufacturer.html</manufacturerURL>
  <modelDescription>An Emergency Alert Message Service
Device</modelDescription>
  <modelName>EAMSVC V1</modelName>
  <modelNumber>0.1</modelNumber>
  <modelURL>/model.html</modelURL>
  <serialNumber>11242014</serialNiimber>
  <UDN>uuid: EAMservicedevice </UDN>
  <UPC>11242014</UPC>
- <iconList>
- <icon>
  <mimetype>image/gif</mimetype>
  <width>30</width>
  <height>30</height>
  <depth>8</depth>
  <url>icon.gif</url>
  </icon>
  </iconList>
- <serviceList>
- <service>
  <serviceType>urn:schemas-upnp-org:service:EAMSvc:
  1</serviceType>
  <serviceId>urn:schemas-upnp-org:serviceId: EAMSvc:
  1</serviceId>
  <SCPDURL>/EAMservicedevice/urn_schemas-upnp-
org_serviceId_EAMSvc_1/description.xml</SCPDURL>
  <controlURL>/EAMservicedevice/urn_schemas-upnp-
org_serviceId_EAMSvc_1/control</controlURL>
  <eventSubURL>/EAMservicedevice/urn_schemas-upnp-
org_serviceId_IEAMSvc_1/eventSub</eventSubURL>
  </service>
  </serviceList>
  <presentationURL>http ://192.168.0.100:5002/
EAMservicedevice/presentation.html</presentationURL>
  </device>
  </root>
```

In some examples instead of JSON, JSONP data may be used.

In another example, the HTTP response body may send the same data in another format such as XML, CSV, BNF, ABNF, ENBF, or any other suitable format.

Additionally, when a failure occurs an error code and a descriptive error string is communicated, if desired. For example if CD sends a message which does not conform to the schema defined by the protocol an error may be indicated by the PD with an error code and error string. Similarly if the PD sends a message which does not conform to the schema defined by the protocol and error may be indicated by the CD with an error code and error string. Other error codes and/or error strings may be exchanged when server is unavailable or unreachable or if there is a network error.

In another example, the REST mechanism may be used for exchanging messages between PD and CD. Example examples for this have been described above for each of the messages that are exchanged between PD and CD.

Figure 27:
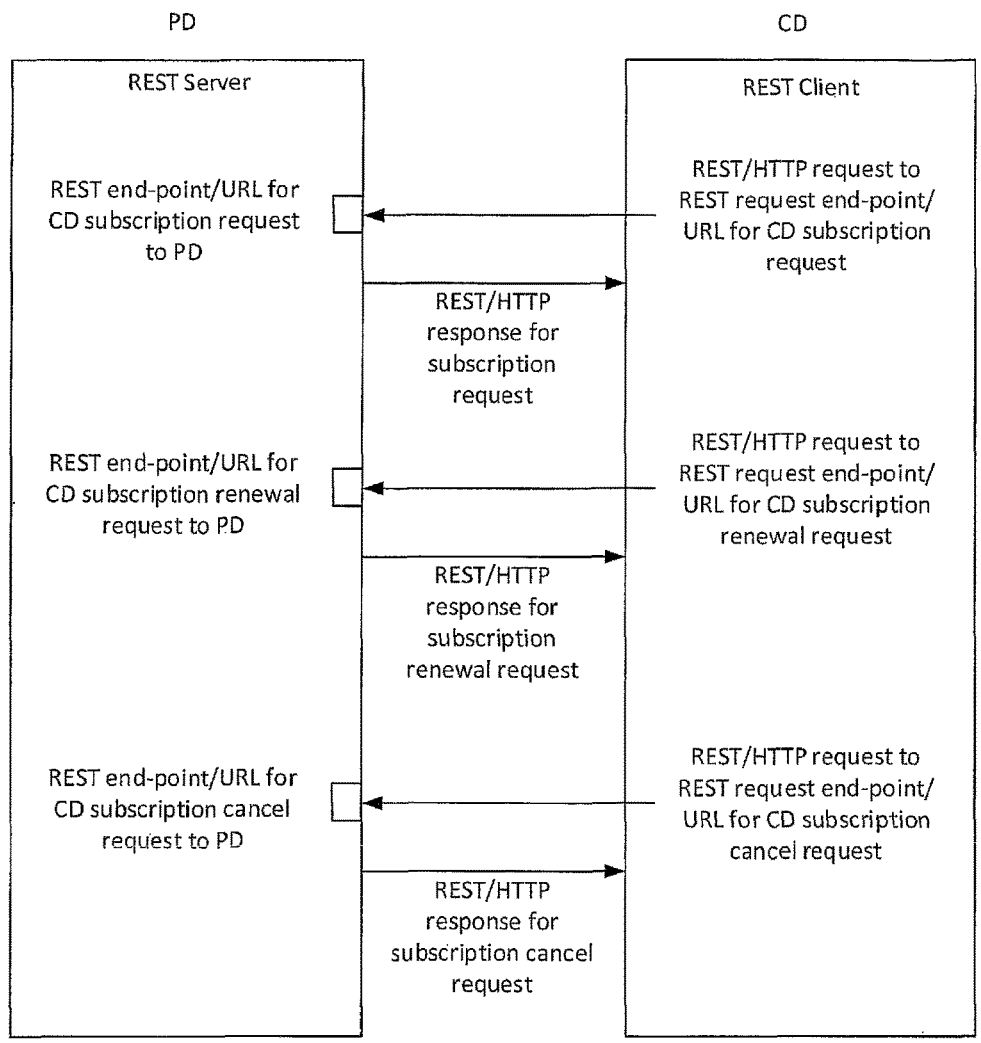
FIG. 27 illustrates a Representational State Transfer (REST) architecture for message exchanges

Referring to FIG. 27 PD may include REST server with various REST URLs and/or end-points that can receive REST requests. The CD may include REST client which can send REST and/or HTTP requests to various REST URLs and/or end-points. In particular following REST request, responses are shown in FIG. 27.

REST server on PD may include a REST end-point and/or URL for CD subscription request to PD. When REST client on CD sends a REST and/or HTTP subscription request to this end-point, the PD may send a REST and/or HTTP response for this subscription request.

REST server on PD may include a REST end-point and/or URL for CD subscription renewal request to PD. When REST client on CD sends a REST and/or HTTP subscription renewal request to this end-point, the PD may send a REST and/or HTTP response for this subscription renewal request.

REST server on PD may include a REST end-point and/or URL for CD subscription cancel request to PD. When REST client on CD sends a REST and/or HTTP subscription renewal request to this end-point, the PD may send a REST and/or HTTP response for this subscription cancel request.

Figure 28:
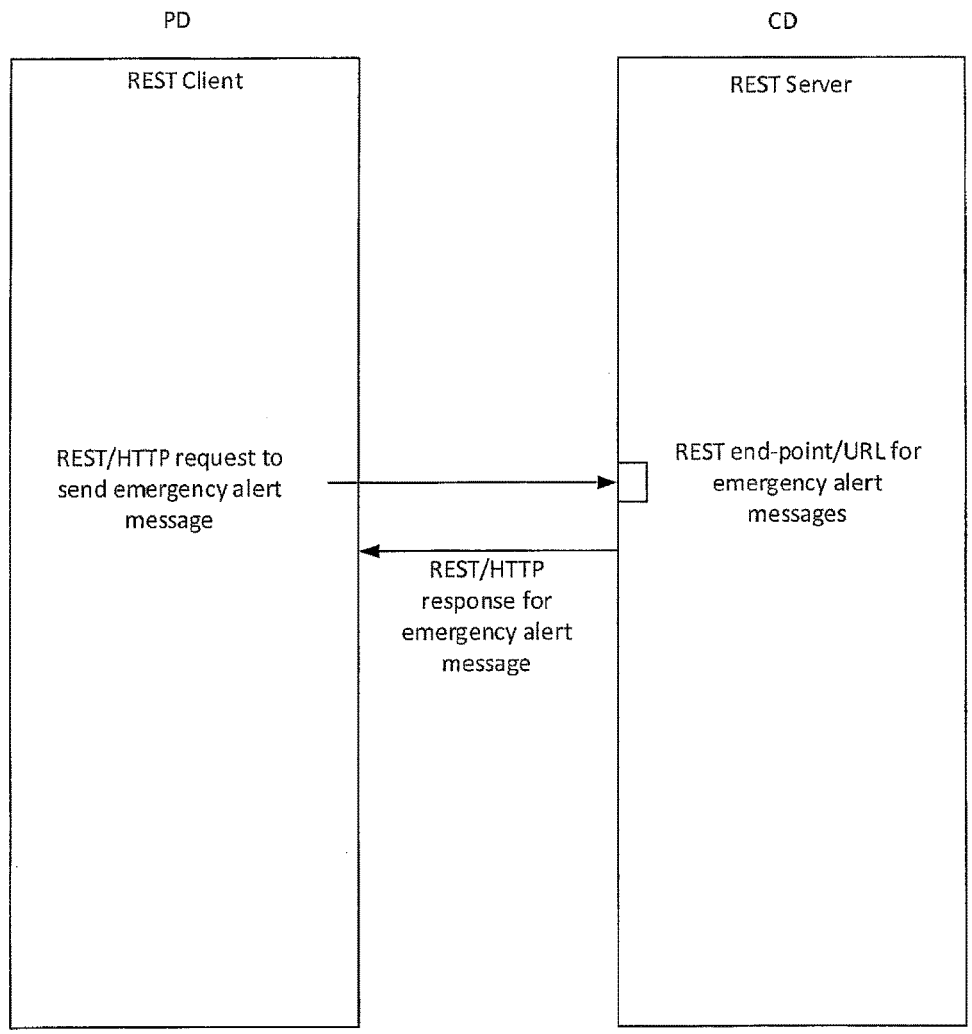
FIG. 28 illustrates a Representational State Transfer architecture for emergency alert messages

Referring to FIG. 28 CD may include REST server with REST URLs and/or end-points that can receive REST requests. The PD may include REST client which can send REST and/or HTTP requests to various REST URLs and/or end-points. In particular following REST request, responses are shown in FIG. 27.

REST server on CD may include a REST end-point and/or URL for EAMs from PD. When REST client on PD sends a REST and/or HTTP subscription request to this end-point including EAMs, the PD may send a REST and/or HTTP response for this EAM.

In yet another example, a Simple Object Access Protocol (SOAP) may be used for exchanging messages between PD and CD.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for a companion device to receive current service information from a primary device comprising:

(a) said companion device receiving from said primary device an emergency alert message including at least one of:

(i) an identifier of said emergency alert message that uniquely identifies said emergency alert message;
(ii) a date when said emergency alert message was generated together with a time when said emergency alert message was generated;
(iii) a content format defining a content type of an initial said emergency alert message;
(iv) a content of said emergency alert message received given by initial content element;
(v) a Uniform Resource Locator (URL) which provides initial emergency alert message content for accessibility;
(vi) an additional URL which provides additional information about said emergency alert message;
(vii) a phone number for obtaining additional information about said emergency alert message;
(viii) an e-mail address for obtaining additional information about said emergency alert message;
(ix) a received additional emergency alert containing a continuation of another said emergency alert message;
(x) a received one of a new or a repeat said emergency alert message;
(xi) a received said emergency alert message that is not repeated;
(xii) an identifier of said primary device;
(xiii) a version of said primary device,
said emergency alert message being sent from said primary device to said companion device after said primary device receiving a subscription to emergency message from said companion device,
said emergency alert message including subscription duration, and
said companion device referring to the subscription duration included in said emergency alert message received, and receiving said emergency alert message for a period of time indicated by the subscription duration.

2. The method of claim 1 wherein said subscription to emergency message includes emergency message filtering criteria.

3. A method for a primary device to provide current service information to a companion device comprising:
(a) said primary device providing from said primary device an emergency alert message to said companion device including at least one of:
(i) an identifier of said emergency alert message that uniquely identifies said emergency alert message;
(ii) a date when said emergency alert message was generated together with a time when said emergency alert message was generated;
(iii) a content format defining a content type of an initial said emergency alert message;
(iv) a content of said emergency alert message received given by initial content element;
(v) a Uniform Resource Locator (URL) which provides initial emergency alert message content for accessibility;
(vi) an additional URL which provides additional information about said emergency alert message;
(vii) a phone number for obtaining additional information about said emergency alert message;
(viii) an e-mail address for obtaining additional information about said emergency alert message;
(ix) an additional emergency alert containing a continuation of another said emergency alert message;
(x) a one of a new or a repeat said emergency alert message;
(xi) a said emergency alert message that is not repeated;
(xii) an identifier of said primary device;
(xiii) a version of said primary device,
said emergency alert message being sent from said primary device to said companion device after said primary device receiving a subscription to emergency message from said companion device,
said emergency alert message including subscription duration, and
said companion device referring to the subscription duration included in said emergency alert message received, and receiving said emergency alert message for a period of time indicated by the subscription duration.

4. The method of claim 3 wherein said emergency alert message including said identifier of said emergency alert message said uniquely identifies said emergency alert message.

5. The method of claim 3 wherein said emergency alert message including said date when said emergency alert message was generated together with said time when said emergency alert message was generated.

6. The method of claim 3 wherein said emergency alert message including said content format defining said content type of said initial said emergency alert message.

7. The method of claim 3 wherein said emergency alert message including said content of said emergency alert message received in said manner given by said content format.

8. The method of claim 3 wherein said emergency alert message including said URL which provides said initial emergency alert message content for accessibility.

9. The method of claim 8 wherein said URL which provides said initial emergency alert message content for accessibility may point to a secondary audio stream which facilitates the provision of emergency alert information.

10. The method of claim 3 wherein said emergency alert message including said additional URL which provides additional information about said emergency alert message.

11. The method of claim 3 wherein said emergency alert message including said phone number for obtaining said additional information about said emergency alert message.

12. The method of claim 3 wherein said emergency alert message including said e-mail address for obtaining said additional information about said emergency alert message.

13. The method of claim 3 wherein said emergency alert message including said additional emergency alert containing said continuation of said another said emergency alert message.

14. The method of claim 3 wherein said emergency alert message including said one of said new or said repeat said emergency alert message.

15. The method of claim 3 wherein said emergency alert message including said emergency alert message that is said not repeated.

16. The method of claim 3 wherein said emergency alert message including said identifier of said primary device.

17. The method of claim 3 wherein said emergency alert message including said version of said primary device.

18. The method of claim 3 wherein said subscription to emergency message includes emergency message filtering criteria.

19. A method for a primary device to provide current service information to a companion device comprising:
(a) said primary device receiving from said companion device a response to an emergency alert message including at least one of:
(i) an identifier of said emergency alert message that uniquely identifies said emergency alert message;

(ii) a date when said emergency alert message response was generated together with a time when said emergency alert message response was generated;

(iii) an additional content request indicating a request for more information about said emergency alert message, said emergency alert message being sent from said primary device to said companion device after said primary device receiving a subscription to emergency message from said companion device, said emergency alert message including subscription duration, and said companion device referring to the subscription duration included in said emergency alert message received, and receiving said emergency alert message for a period of time indicated by the subscription duration.

20. The method of claim 19 wherein said subscription to emergency message includes emergency message filtering criteria.

* * * * *